(12) United States Patent
Chang et al.

(10) Patent No.: US 10,746,973 B2
(45) Date of Patent: *Aug. 18, 2020

(54) OPTICAL IMAGE CAPTURING SYSTEM HAVING SIX LENSES, VISIBLE LIGHT IMAGE PLANE, AND INFRARED LIGHT IMAGE PLANE

(71) Applicant: Ability Opto-Electronics Technology Co. Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 334 days.

This patent is subject to a terminal disclaimer.

(21) Appl. No.: 15/808,273

(22) Filed: Nov. 9, 2017

(65) Prior Publication Data

US 2019/0033559 A1    Jan. 31, 2019

(30) Foreign Application Priority Data

Jul. 26, 2017   (TW) .............................. 106125175 A

(51) Int. Cl.
| G02B 13/00 | (2006.01) |
| G02B 13/18 | (2006.01) |
| G02B 13/14 | (2006.01) |
| G02B 9/64 | (2006.01) |

(52) U.S. Cl.
CPC ............. *G02B 13/008* (2013.01); *G02B 9/64* (2013.01); *G02B 13/0045* (2013.01); *G02B 13/146* (2013.01); *G02B 13/18* (2013.01)

(58) Field of Classification Search
CPC .... G02B 9/64; G02B 13/0045; G02B 13/008; G02B 13/14; G02B 13/146; G02B 13/18; G02B 27/0012
USPC ......... 359/355–357, 435, 722, 723, 755–762
See application file for complete search history.

(56) References Cited

U.S. PATENT DOCUMENTS

| 10,203,485 B2 * | 2/2019 | Chang .................... G02B 5/005 |
| 10,469,720 B2 * | 11/2019 | Chang ................ G02B 13/0045 |
| 10,495,860 B2 * | 12/2019 | Liu ....................... G02B 15/142 |

FOREIGN PATENT DOCUMENTS

TW          201508313 A      3/2015

* cited by examiner

*Primary Examiner* — Ryan S Dunning
(74) *Attorney, Agent, or Firm* — Muncy, Geissler, Olds & Lowe, P.C.

(57) ABSTRACT

The invention discloses a six-piece optical lens for capturing image and a six-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; and at least one of the image side and object side of each of the six lenses is aspheric. The optical lens can increase aperture value and improve the imagining quality for use in compact cameras.

25 Claims, 30 Drawing Sheets

OPTICAL IMAGE CAPTURING SYSTEM HAVING SIX LENSES, VISIBLE LIGHT IMAGE PLANE, AND INFRARED LIGHT IMAGE PLANE

CROSS-REFERENCE TO RELATED APPLICATION

This application claims priority from Taiwan Patent Application No. 106125175, filed on Jul. 26, 2017, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical image capturing systems. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel area by degrees. Therefore, it increases daily the demand of the quality of the image.

Conventional optical systems of portable electronic devices usually adopt four lenses or five lenses structure as main structure. However, since the resolution of the portable electronic devices is continuously raising, and more end-users are demanding for cameras having large aperture, which is equipped with functionalities such as low light mode or night mode. The conventional optical image capturing systems may not be sufficient to meet those advanced photography requirements.

Therefore, it is an important issue about how to effectively increase the amount of light admitted into the optical image capturing system and further elevate the image quality thereof.

SUMMARY OF THE INVENTION

The aspect of embodiment of the present disclosure directs to an optical image capturing system and an optical image capturing lens which use combination of refractive powers, convex and concave surfaces of six lenses (the convex surface or concave surface in the present invention is the change of geometrical shape of an object side or an image side of each lens at different heights from an optical axis in principle) to increase the amount of light admitted into the optical image capturing system, and to elevate quality of image formation, so that the optical image capturing system can be applied to the minimized electronic products.

Furthermore, in the certain application of optical imaging, there will be a need to conduct the image formation for the light of the visible wavelength and the infrared wavelength, for example, IP video surveillance camera. IP video surveillance camera may need to be equipped with the Day & Night function. The main reason is that the visible spectrum for human vision is in the wavelength range from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can prevent the infrared light and color shift at the daytime; which can also allow the infrared light coming at night to elevate luminance. Nevertheless, the elements of the ICR occupy a significant amount of space and are expensive, which impede to the design and manufacture of miniaturized surveillance cameras in the future.

One aspect of embodiment of the present disclosure directs to an optical image capturing system and an optical image capturing camera lens, which are able to utilize the combination of refractive powers, convex surfaces and concave surfaces of six lenses, as well as the selection of materials thereof, to reduce the difference between the imaging focal length of visible light and imaging focal length of infrared light, that is, to achieve the near "confocal" effect without the ICR.

The terms and their definition for the lens parameters in the embodiment of the present invention are shown as below for further reference.

The Lens Parameters Related to the Magnification of the Optical Image Capturing System The optical image capturing system and the optical image capturing camera lens may be designed for the application of the biometric characteristics identification, for example, facial recognition. When the embodiment of the present invention is configured to capture image for facial recognition, the infrared light may be selected as the operation wavelength. At the same time a face of about 15 centimeters (cm) wide at a distance of 25-30 cm, at least 30 horizontal pixels can be formed in the horizontal direction of an photosensitive element (pixel size of 1.4 micrometers (μm)). The linear magnification of the infrared light of the image plane is LM, which meets the following conditions: LM=(30 horizontal pixels)*(1.4 μm pixel size)/(15 cm, width of the photographed object); LM≥0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers (μm)).

The Lens Parameter Related to a Length or a Height

For visible light spectrum, the present invention may select the wavelength of 555 nm as the primary reference wavelength and the basis for the measurement of focus shift. For infrared light spectrum (700 nm-1300 nm), the present invention may select the wavelength of 850 nm as the primary reference wavelength and the basis for the measurement of focus shift.

The optical image capturing system may have a first image plane and a second image plane. The first image plane which is perpendicular to the optical axis is an image plane specifically for the visible light, and the through focus modulation transfer rate (value of MTF) at the first spatial frequency has a maximum value at the central field of view of the first image plane; and the second image plane which is perpendicular to the optical axis is an image plane specifically for the infrared light, and the through focus modulation transfer rate (value of MTF) at the first spatial frequency has a maximum value at the central of field of view of the second image plane. The optical image capturing system may further have a first average image plane and a second average image plane. The first average image plane which is perpendicular to the optical axis is an image plane specifically for the visible light. And the first average image plane may be disposed at the average position of the defocusing positions, where the values of MTF of the visible light at the central field of view, 0.3 field of view, and the 0.7 field of view of the optical image capturing system are at their respective maximum at the first spatial frequency. The second average image plane which is perpendicular to the optical axis is an image plane specifically for the infrared light. The second average image plane is disposed at the average position of the defocusing positions, where the values of MTF of the infrared light at the central field of view, 0.3 field of view, and the 0.7 field of view of the optical image capturing system are at their respective maximum at the first spatial frequency.

The aforementioned first spatial frequency is set to be an half spatial frequency (half frequency) of a photosensitive element (sensor) used in the present invention. For example, the photosensitive element having the pixel size of 1.12 μm or less, of which the one eighth spatial frequency, the quarter spatial frequency, half spatial frequency (half frequency) and full spatial frequency (full frequency) in the characteristic diagram of modulation transfer function are respectively at least 55 cycles/mm, 110 cycles/mm, 220 cycles/mm and 440 cycles/mm. Rays of any field of view can be further divided into sagittal ray and tangential ray.

The focus shifts, where the through focus MTF values of the visible sagittal ray at the central field of view, 0.3 field of view, and 0.7 field of view of the optical image capturing system are at their respective maxima, are respectively expressed as VSFS0, VSFS3, and VSFS7 (unit of measurement: mm). The maximum values of the through focus MTF of the visible sagittal ray at the central field of view, 0.3 field of view, and 0.7 field of view are respectively expressed as VSMTF0, VSMTF3, and VSMTF7. The focus shifts, where the through focus MTF values of the visible tangential ray at the central field of view, 0.3 field of view, and 0.7 field of view of the optical image capturing system are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both the aforementioned focus shifts of the visible sagittal my at three fields of view and focus shifts of the visible tangential ray at three fields of view is expressed as AVFS (unit of measurement: mm), which meets the absolute value |(VSFS0 VSFS3+ VSFS7+ VTFS0+ VTFS3+ VTFS7)/6|.

The focus shifts where the through focus MTF values of the infrared sagittal ray at the central field of view, 0.3 field of view, and 0.7 field of view of the optical image capturing system are at their respective maxima are respectively expressed as ISFS0, ISFS3, and ISFS7. The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are respectively expressed as ISMTF0, ISMTF3, and ISMTF7. The focus shifts where the through focus MTF values of the infrared tangential ray at the central field of view, 0.3 field of view, and 0.7 field of view of the optical image capturing system are at their respective maxima are respectively expressed as ITFS0, ITFS3, and ITFS7 (unit of measurement: mm). The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of |(ISFS0+ ISFS3+ ISFS7+ ITFS0+ ITFS3+ ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) is expressed as FS, which meets the absolute value |(VSFS0+ VTFS0)/2− (ISFS0+ ITFS0)/2|. The difference (focus shift) between the average focus shift of the visible light in the three fields of view and the average focus shift of the infrared light in the three fields of view (RGB/IR) of the entire optical image capturing system is expressed as AFS (i.e. wavelength of 850 nm versus wavelength of 555 nm, unit of measurement: mm), which meets the absolute value of |AIFS− AVFS|.

The maximum height of an image of the optical image capturing system is expressed as HOI. The height of the optical image capturing system is expressed as HOS. The distance from the object side of the first lens of the optical image capturing system to the image side of the sixth lens of the optical image capturing system is expressed as InTL. The distance from a fixed aperture (stop) of the optical image capturing system to the first image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); a refractive index of the first lens is expressed as Nd1 (example).

The Lens Parameter Related to the Angle of View

An angle of view is expressed as AF. A half angle of view is expressed as HAF. An angle of a chief ray is expressed as MRA.

The Lens Parameter Related to Exit/Entrance Pupil

An entrance pupil diameter of the optical image capturing system is expressed as HEP. The exit pupil of the optical image capturing system means that the ray at the aperture passes through the lens set which is on the rear side of the aperture and forms an image on the first image plane. The exit pupil diameter of the optical image capturing system is expressed as HXP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens is expressed as EHD11. The maximum effective half diameter of the image side of the first lens is expressed as EHD12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Surface Depth of the Lens

The distance paralleling an optical axis, which is measured from the intersection point where the object side of the sixth lens crosses the optical axis to the terminal point of the maximum effective half diameter outline curve on the object side of the sixth lens is expressed as InRS61 (depth of the EHD). The distance paralleling an optical axis, which is measured from the intersection point where the image side of the sixth lens crosses the optical axis to the terminal point of the maximum effective half diameter outline curve on the image side of the sixth lens is expressed as InRS62 (depth of the EHD). The depths of the EHD (sinkage values) on the object side or the image side of other lens are expressed in similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, for example, the perpendicular distance between the critical point C51 on the object side of the fifth lens and the optical axis is HVT51 (example), the perpendicular distance between a critical point C52 on the image side of the fifth lens and the optical axis is HVT52 (example), the perpendicular distance between the critical point C61 on the object side of the sixth lens and the optical axis is HVT61 (example) and the perpendicular distance between a critical point C62 on the image side of the sixth lens and the optical axis is HVT62 (example). The perpendicular distances between the critical point on the image side or object side of other lens and the optical axis are expressed in similar way.

The inflection point on the object side of the sixth lens that is nearest to the optical axis is expressed as IF611, and the sinkage value of that inflection point IF611 is expressed as SGI611 (example). That is, the sinkage value SGI611 is a horizontal distance paralleling the optical axis, which is measured from the intersection point crossing the optical axis on the object side of the sixth lens to the inflection point nearest to the optical axis on the object side of the sixth lens. The perpendicular distance between the inflection point IF611 and the optical axis is HIF611 (example). The inflection point on the image side of the sixth lens that is nearest to the optical axis is expressed as IF621, and the sinkage value of the inflection point IF621 is expressed as SGI621 (example). That is, the sinkage value SGI621 is a horizontal distance paralleling the optical axis, which is measured from the intersection point crossing the optical axis on the image side of the sixth lens to the inflection point nearest to the optical axis on the image side of the sixth lens. The perpendicular distance between the inflection point IF621 and the optical axis is HIF621 (example).

The inflection point on object side of the sixth lens that is second nearest to the optical axis is expressed as IF612, and the sinkage value of the inflection point IF612 is expressed as SGI612 (example). That is, the sinkage value SGI612 is a horizontal distance paralleling the optical axis, which is measured from the intersection point crossing the optical axis on the object side of the sixth lens to the inflection point second nearest to the optical axis on the object side of the sixth lens. The perpendicular distance between the inflection point IF612 and the optical axis is HIF612 (example). The inflection point on the image side of the sixth lens that is second nearest to the optical axis is expressed as IF622, and the sinkage value of the inflection point IF622 is expressed as SGI622 (example). That is, the sinkage value SGI622 is a horizontal distance paralleling the optical axis, which is measured from the intersection point crossing the optical axis on the image side of the sixth lens to the inflection point second nearest to the optical axis on the image side of the sixth lens. The perpendicular distance between the inflection point IF622 and the optical axis is HIF622 (example).

The inflection point on the object side of the sixth lens that is third nearest to the optical axis is expressed as IF613, and the sinkage value of the inflection point IF613 is expressed as SGI613 (example). That is, the sinkage value SGI613 is a horizontal distance paralleling the optical axis, which is measured from the intersection point crossing the optical axis on the object side of the sixth lens to the inflection point third nearest to the optical axis on the object side of the sixth lens. The perpendicular distance between the inflection point IF613 and the optical axis is HIF613 (example). The inflection point on image side of the sixth lens that is third nearest to the optical axis is expressed as IF623, and the sinkage value of the inflection point IF623 is expressed as SGI623 (example). That is, the sinkage value SGI623 is a horizontal distance paralleling the optical axis, which is measured from the intersection point crossing the optical axis on the image side of the sixth lens to the inflection point third nearest to the optical axis on the image side of the sixth lens. The perpendicular distance between the inflection point IF623 and the optical axis is HIF623 (example).

The inflection point on object side of the sixth lens that is fourth nearest to the optical axis is expressed as IF614, and the sinkage value of the inflection point IF614 is expressed as SGI614 (example). That is, the sinkage value SGI614 is a horizontal distance paralleling the optical axis, which is measured from the intersection point crossing the optical axis on the object side of the sixth lens to the inflection point fourth nearest to the optical axis on the object side of the sixth lens. The perpendicular distance between the inflection point IF614 and the optical axis is HIF614 (example). The inflection point on the image side of the sixth lens that is fourth nearest to the optical axis is expressed as IF624, and the sinkage value of the inflection point IF624 is expressed as SGI624 (example). That is, the sinkage value SGI624 is a horizontal distance paralleling the optical axis, which is measured from the intersection point crossing the optical axis on the image side of the sixth lens to the inflection point fourth nearest to the optical axis on the image side of the sixth lens. The perpendicular distance between the inflection point IF624 and the optical axis is HIF624 (example).

The inflection points on the object side or the image side of the other lens and the perpendicular distances between them and the optical axis, or the sinkage values thereof are expressed in the similar way described above.

The Lens Element Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the formed image. The offset of the spherical aberration is expressed as DFS. The offset of the coma aberration is expressed as DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (values are from 0 to 1). The horizontal coordinate axis indicates a spatial frequency (cycles/mm; 1 p/mm; line pairs per mm). Theoretically, an ideal image capturing system can 100% show the line contrast of a photographed object. However, the values of the contrast transfer rate at the vertical coordinate axis are smaller than 1 in the actual optical image capturing system. In addition, the edge region of the image is generally more difficult to achieve a fine degree of recovery than the central region of the image. The contrast transfer rates (MTF values) with spatial frequencies of 55 cycles/mm at the optical axis, 0.3 field of view and 0.7 field of view of visible light spectrum on the first image plane are respectively expressed as MTFE0, MTFE3 and MTFE3. The contrast transfer rates (MTF values) with spatial frequencies of 110 cycles/mm at the optical axis, 0.3 field of view and 0.7 field of view of visible light spectrum on the first image plane are respectively expressed as MTFQ0, MTFQ3 and MTFQ7. The contrast transfer rates (MTh values) with spatial frequencies of 220 cycles/mm at the optical axis, 0.3 field of view and 0.7 field of view of visible light spectrum on the first image plane are respectively expressed as MTFH0, MTFH3 and MTFH7. The contrast transfer rates (MTF values) with spatial frequencies of 440 cycles/mm at the optical axis, 0.3 field of view and 0.7 field of view of visible light spectrum on the first image plane are respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy with the images of infrared spectrum and visible spectrum simultaneously, such as the requirement for night vision with lower light source, the used wavelength may be 850 nm or 800 nm. Because the main function is to recognize shape of an object formed in black-and-white environment, the high resolution is unnecessary and the spatial frequency which is less than 110 cycles/mm is used to evaluate the performance of the specific optical image capturing system on the infrared light spectrum. When the foregoing wavelength 850 nm focuses on the second image plane, the contrast transfer rates (MTF values) with a spatial frequency of 55 cycles/mm where the images are at the optical axis, 0.3 field of view and 0.7 field of view are respectively expressed as MTFI0, MTFI3 and MTFI7. However, because the difference between the infrared wavelength of 850 nm or 800 nm and the general visible light wavelength is large, the optical image capturing system which not only has to focus at the visible light and the infrared light (dual-mode) but also achieves a certain function on the visible light and the infrared light respectively has a significant difficulty in design.

The present invention provides an optical image capturing system. The object side or the image side of the sixth lens of the optical image capturing system may be disposed with the inflection points, such that the angle of incidence from each field of view to the sixth lens can be adjusted effectively and the optical distortion and the TV distortion can be corrected as well. Besides, the surfaces of the sixth lens may be endowed with better capability to adjust the optical path to elevate the image quality.

An optical image capturing system is provided in accordance with the present invention. In the order from an object side to an image side, the optical image capturing system includes a first lens, a second lens, a third lens, a fourth lens, a fifth lens, a sixth lens, a first image plane and a second image plane. The first image plane is an image plane specifically for visible light and perpendicular to an optical axis, and a through focus modulation transfer rate (MTF) of central field of view of the first image plane has a maximum value at a first spatial frequency. The second image plane is an image plane specifically for infrared light and perpendicular to the optical axis, and a through focus modulation transfer rate (MTF) of central of field of view of the second image plane has a maximum value at the first spatial frequency. The first lens to the fifth lens all have refractive powers. Focal lengths of the six lenses are respectively f1, f2, f3, f4, f5 and f6. A focal length of the optical image capturing system is f. An entrance pupil diameter of the optical image capturing system is HEP. There is a distance HOS on the optical axis from the object side of the first lens to the first image plane. A half maximum angle of view of the optical image capturing system is HAF. The optical image capturing system has a maximum image height HOI on the first image plane that is perpendicular to the optical axis. A distance on the optical axis between the first image plane and the second image plane is FS. Thicknesses of the first lens through the sixth lens at a height of ½ HEP and in parallel with the optical axis are respectively ETP1, ETP2, ETP3, ETP4, ETP5 and ETP6. A sum of ETP1 to ETP6 is SETP. Thicknesses of the first lens through the sixth lens on the optical axis are respectively TP1, TP2, TP3, TP4, TP5 and TP6. A sum of TP1 to TP6 is STP. The optical image capturing system meets the following conditions: $1.0 \leq f/HEP \leq 10.0$; $0 \text{ deg} < HAF \leq 150 \text{ deg}$; $0.5 \leq SETP/STP < 1$; $|FS| \leq 60 \text{ }\mu m$ and $1 \leq HOS/HOI \leq 15$.

Another optical image capturing system is further provided in accordance with the present invention. In the order from an object side to an image side, the optical image capturing system includes a first lens, a second lens, a third lens, a fourth lens, a fifth lens, a sixth lens, a first image plane and a second image plane. The first image plane is an image plane specifically for visible light and perpendicular to the optical axis, and a through focus modulation transfer rate (MTF) of central field of view of the first image plane has a maximum value at a first spatial frequency. The second image plane is an image plane specifically for infrared light and perpendicular to the optical axis, and a through focus modulation transfer rate (MTF) of central of field of view of the second image plane has a maximum value at the first spatial frequency. The first lens has refractive power and the object side of the first lens near the optical axis is a convex surface. The second lens has refractive power. The third lens has refractive power. The fourth lens has refractive power. The fifth lens has refractive power. The sixth lens has refractive power. The optical image capturing system has a maximum image height HOI on the first image plane that is perpendicular to the optical axis. There is at least one lens made of glass among the first lens to the sixth lens. There is at least one lens having positive refractive power among the first lens to the sixth lens. Focal lengths of the six lenses are respectively f1, f2, f3, f4, f5 and f6. A focal length of the optical image capturing system is f. An entrance pupil diameter of the optical image capturing system is HEP. There is a distance HOS on the optical axis from the object side of the first lens to the first image plane. A half maximum angle of view of the optical image capturing system is HAF. A distance on the optical axis between the first image plane and the second image plane is FS. The distance parallel to the optical axis between a coordinate point at a height of ½ HEP on the object side of the first lens and the first image plane is ETL. The distance parallel to the optical axis between a first coordinate point at a height of ½ HEP on the image side of the sixth lens and the coordinate point at a height of ½ HEP on the object side of the first lens is EIN. The optical image capturing system meets the following conditions: 1≤f/HEP≤10; 0 deg<HAF≤150 deg; 0.2≤EIN/ETL<1; |FS|≤30 μm and 1≤HOS/HOI≤15.

Yet another optical image capturing, system is further provided in accordance with the present invention. In the order from an object side to an image side, the optical image capturing system includes a first lens, a second lens, a third lens, a fourth lens, a first average image plane and a second average image plane. The first average image plane is an image plane specifically for visible light and perpendicular to an optical axis. And the first average image plane is disposed at the average position of the defocusing positions, where through focus modulation transfer rates (values of MTF) of the visible light at central field of view, 0.3 field of view, and 0.7 field of view of the optical image capturing system are at their respective maximum at a first spatial frequency. The second average image plane is an image plane specifically for infrared light and perpendicular to the optical axis. And the second average image plane is disposed at the average position of the defocusing positions, where through focus modulation transfer rates (values of MTF) of the infrared light at central field of view, 0.3 field of view, and 0.7 field of view of the optical image capturing system are at their respective maximum at the first spatial frequency. The optical image capturing system has six lenses with refractive powers. The optical image capturing system has a maximum image height HOI on the first image plane that is perpendicular to the optical axis. There is at least one lens made of glass among the first lens to the sixth lens. The first lens has refractive power. The second lens has refractive power. The third lens has refractive power. The fourth lens has refractive power. The fifth lens has refractive power. The sixth lens has refractive power. Focal lengths of the six lenses are respectively f1, f2, f3, f4, f5 and f6. A focal length of the optical image capturing system is f. An entrance pupil diameter of the optical image capturing system is HEP. There is a distance HOS on the optical axis from the object side of the first lens to the first average image plane. A half maximum angle of view of the optical image capturing system is HAF. The optical image capturing system has a maximum image height HOI on the first average image plane that is perpendicular to the optical axis. With a point on the any surface of any one of the six lenses which crosses the optical axis defined as a starting point, a length of an outline curve from the starting point to a coordinate point of vertical height with a distance from the optical axis to the half entrance pupil diameter on the surface along the outline of the surface is ARE. The distance between the first average image plane and the second average image plane is expressed as AFS. Thicknesses of the first lens through the sixth lens at a height of ½ HEP and in parallel with the optical axis are respectively ETP1, ETP2, ETP3, ETP4, ETP5 and ETP6. A sum of ETP1 to ETP6 is SETP. Thicknesses of the first lens through the sixth lens on the optical axis are respectively TP1, TP2, TP3, TP4, TP5 and TP6. A sum of TP1 to TP6 is SW. The optical image capturing system meets the following conditions: 1.0≤f/HEP≤10.0; 0 deg<HAF≤150 deg; 0.2≤SETP/STP<1; |AFS|≤30 μm and 1≤HOS/HOI≤10.

A thickness of a single lens at a height of ½ entrance pupil diameter (HEP) particularly affects the corrected aberration of common area of each field of view of light and the capability of correcting the optical path difference between each field of view of light in the scope of ½ entrance pupil diameter (HEP). The capability of aberration correction is enhanced if the thickness becomes greater, but the difficulty for manufacturing is also increased at the same time. Therefore, it is necessary to control the thickness of a single lens at the height of ½ entrance pupil diameter (HEP), in particular to control the ratio relation (ETP/TP) between the thickness (ETP) of the lens at height of ½ entrance pupil diameter (HEP) and the thickness (TP) of the lens to which the surface belongs on the optical axis. For example, the thickness of the first lens at a height of ½ entrance pupil diameter (HEP) is, expressed as ETP1. The thickness of the second lens at a height of ½ entrance pupil diameter (HEP) is expressed as ETP2. The thicknesses of other lens at a height of ½ entrance pupil diameter (HEP) are expressed in the similar way. A sum of ETP1 to ETP6 described above is SETP. The embodiments of the present invention may satisfy the following relation: 0.3≤SETP/EIN<1.

In order to enhance the capability of aberration correction and reduce the difficulty for manufacturing at the same time, it is particularly necessary to control the ratio relation (ETP/TP) between the thickness (ETP) of the lens at the height of ½ entrance pupil diameter (HEP) and the thickness (TP) of the lens to which the surface belongs on the optical axis. For example, the thickness of the first lens at the height of ½ entrance pupil diameter (HEP) is expressed as ETP1. The thickness of the first lens on the optical axis is TP1. The ratio between ETP1 and TP1 is ETP1/TP1. The thickness of the second lens at the height of ½ entrance pupil diameter (HEP) is expressed as ETP2. The thickness of the second lens on the optical axis is TP2. The ratio between ETP2 and TP2 is ETP2/TP2. The ratio relations between the thicknesses of other lens in the optical image capturing system at height of ½ entrance pupil diameter (HEP) and the thicknesses (TP) of the lens on the optical axis lens are expressed in the similar way. The embodiments of the present invention may satisfy the following relation: 0.2≤ETP/TP≤3.

A horizontal distance between two adjacent lens at the height of ½ entrance pupil diameter (HEP) is expressed as ED. The horizontal distance (ED) described above is in parallel with the optical axis of the optical image capturing system and particularly affects the corrected aberration of common area of each field of view of light and the capability of correcting the optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Therefore, it is essential to control the horizontal distance (ED) between two specific adjacent lens at the height of ½ entrance pupil diameter (HEP).

In order to enhance the capability of aberration correction and reduce the difficulty for 'miniaturization' to the length of the optical image capturing system at the same time, it is particularly necessary to control the ratio relation (ED/IN) of the horizontal distance (ED) between the two adjacent lens at a height of ½ entrance pupil diameter (HEP) to the horizontal distance (IN) between the two adjacent lens on the optical axis. For example, the horizontal distance between the first lens and the second lens at a height of ½ entrance pupil diameter (HEP) is expressed as ED12. The horizontal distance between the first lens and the second lens on the optical axis is IN12. The ratio between ED12 and IN12 is ED12/IN12. The horizontal distance between the second lens and the third lens at a height of ½ entrance pupil diameter (HEP) is expressed as ED23. The horizontal distance between the second lens and the third lens on the optical axis is IN23. The ratio between ED23 and IN23 is ED23/IN23. The ratio relations of the horizontal distances between other two adjacent lens in the optical image capturing system at the height of ½ entrance pupil diameter (HEP) to the horizontal distances between other two adjacent lens in the optical image capturing system on the optical axis are expressed in the similar way.

A horizontal distance in parallel with the optical axis from a coordinate point on the image side of the sixth lens at height ½ HEP to the first image plane is EBL. A horizontal distance in parallel with the optical axis from an intersection point on the image side of the sixth lens crossing the optical axis to the first image plane is BL. The embodiments of the present invention enhance the capability of aberration correction and reserve space for accommodating other optical elements. The following relation may be satisfied: 0.2≤EBL/BL<1.1. The optical image capturing system may further include a light filtering element. The light filtering element is located between the sixth lens and the first image plane. A distance in parallel with the optical axis from a coordinate point on the image side of the sixth lens at height ½ HEP to the light filtering element is FIR. A distance in parallel with the optical axis from an intersection point on the image side of the sixth lens crossing the optical axis to the light filtering element is PIR. The embodiments of the present invention may meet the following relation: 0.1≤EIR/PIR≤1.1.

The height of optical system (HOS) may be shortened to achieve the minimization of the optical image capturing system when the absolute value of f1 is larger than f6 (|f1|≥|f6|).

When |f2|+|f3|+|f4|+|f5| and |f1|+|f6| meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to fifth lens has the weak positive refractive power, the positive refractive power of the first lens can be shared by it, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side of the six lens may be a concave surface. With this configuration, the back focal length of the optical image capturing system may be shortened to keep the miniaturization of the system. Moreover, at least one surface of the sixth lens may possess at least one inflection point which is capable of effectively reducing the incident angle of the off-axis rays and may further correct the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present invention as follows.

DESCRIPTION OF THE PREFERRED EMBODIMENTS

Figure 1A:
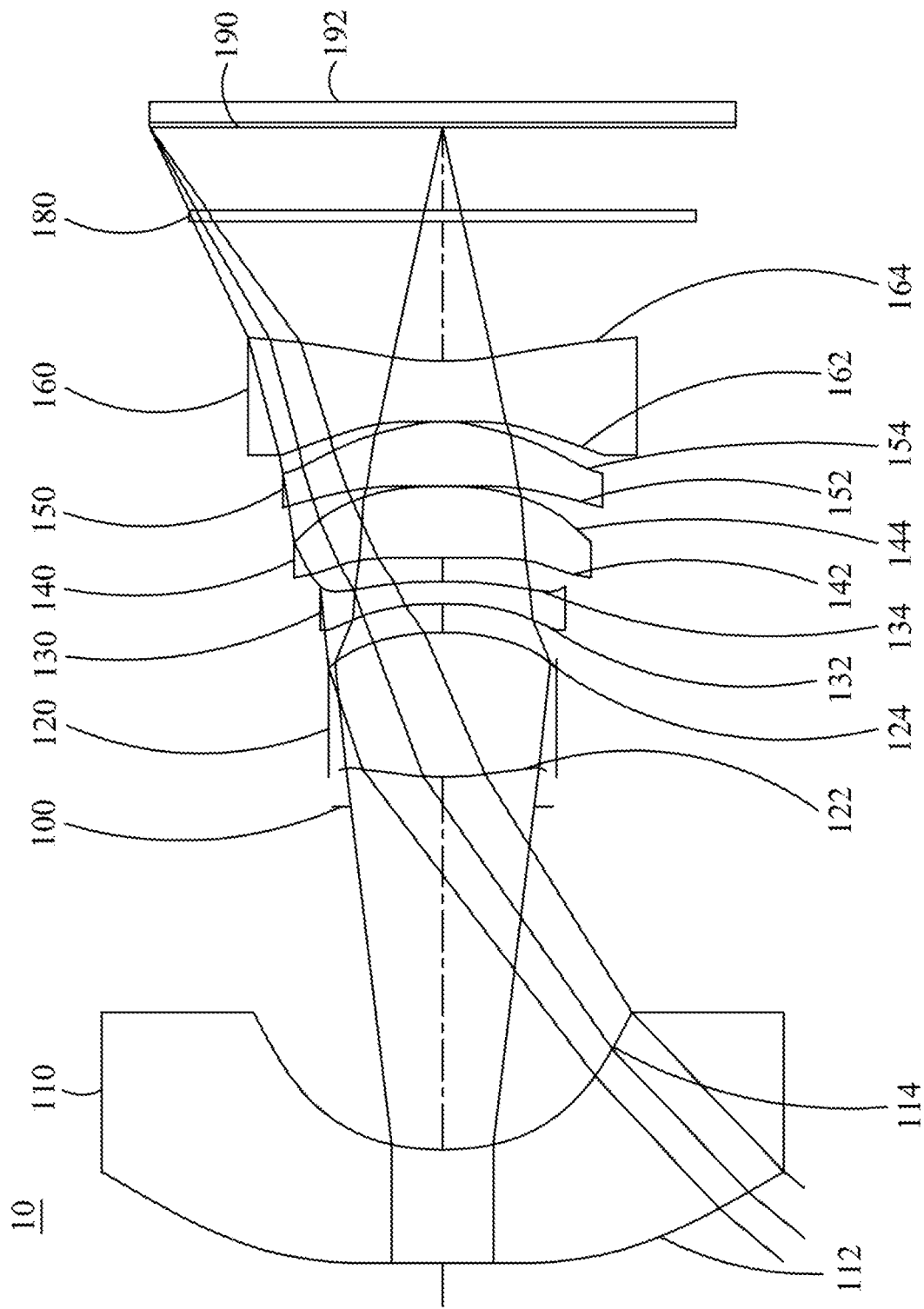
FIG. 1A is a schematic view of the optical image capturing system according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system is provided, which includes, in the order from an object side to an image side, a first lens, a second lens, a third lens, a fourth lens, a fifth lens, and sixth lens with refractive power, an first image plane and an second image plane. The optical image capturing system may further include an image sensing device, which is disposed on the first image plane.

The optical image capturing system may use three sets of operation wavelengths, which are 486.1 nm, 587.5 nm and 656.2 nm, respectively, and 587.5 nm is served as the primary reference wavelength and the primary reference wavelength to obtain technical features of the optical system. The optical image capturing system may also use five sets of wavelengths which are 470 nm, 510 nm, 555 nm, 610 nm and 650 nm, respectively, and 555 nm is served as the primary reference wavelength and the primary reference wavelength to obtain technical features of the optical system.

The ratio between the focal length f of the optical image capturing system and a focal length fp of each lens with positive refractive power is PPR. The ratio between the focal length f of the optical image capturing system and a focal length fn of each lens with negative refractive power is NPR. The sum of the PPR of all lenses with positive refractive powers is ΣPPR. The sum of the NPR of all lenses with negative refractive powers is ΣNPR. This configuration is helpful to control the total refractive power and the total length of the optical image capturing system when meeting following conditions: $0.5 \leq \Sigma PPR/|\Sigma NPR| \leq 15$. Preferably, the following condition may be satisfied: $1 \leq \Sigma PPR/|\Sigma NPR| \leq 3.0$.

The optical image capturing system may further include the image sensing device which is disposed on the first image plane. Half of a diagonal of the effective detection field of the image sensing device (that is, imaging height or the maximum image height of the optical image capturing system) is HOI. The distance on the optical axis from the object side of the first lens to the first image plane is HOS. The following conditions are met: $HOS/HOI \leq 50$ and $0.5 \leq HOS/f \leq 150$. Preferably, the following conditions may be met: $1 \leq HOS/HOI \leq 40$ and $1 \leq HOS/f \leq 140$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light. This configuration is helpful to elevate the image quality.

In the optical image capturing system of the present invention, the aperture may be a front or middle aperture. Wherein, the front aperture is the aperture between a photographed object and the first lens, while the middle aperture is the aperture between the first lens and the first image plane. In the case that the aperture is the front aperture, this configuration can make the optical image capturing system generate a longer distance between the exit pupil the optical image capturing system and the first image plane of the optical image capturing system, such that the optical image capturing system can accommodate more optical elements and the efficiency of the image sensing device in receiving image can be increased; In the case that the aperture is the middle aperture, this configuration can expand the angle of view of the optical image capturing system, such that the optical image capturing system has an advantage of the wide angle camera lens. The distance from the foregoing aperture to the first image plane is InS. The following condition is met: $0.1 \leq InS/HOS \leq 1.1$. Therefore, the optical image capturing system can be kept miniaturization with the character of wide angle of view at the same time.

In the optical image capturing system of the present invention, the distance from the object side of the first lens to the image side of the sixth lens is InTL. The sum of thicknesses of all lenses with refractive power on the optical axis is ETP. The following condition is met: $0.1 \leq \Sigma TP/InTL \leq 0.9$. Therefore, this configuration can keep the contrast ratio of the optical image capturing system and the yield rate about manufacturing lens at the same time, and provide the proper back focal length to accommodate other elements.

The curvature radius of the object side of the first lens is R1. The curvature radius of the image side of the first lens is R2. The following condition is met: $0.001 \leq |R1/R2| \leq 25$. Therefore, the first lens may have a suitable magnitude of positive refractive power, so as to prevent the spherical aberration from increasing too fast. Preferably, the following condition may be satisfied: $0.01 \leq |R1/R2| < 12$.

The curvature radius of the object side of the sixth lens is R11. The curvature radius of the image side of the sixth lens is R12. The following condition is met: $-7 < (R11-R12)/(R11+R12) < 50$. Hereby, this configuration is beneficial to the correction of the astigmatism generated by the optical image capturing system.

The distance between the first lens and the second lens on the optical axis is IN12. The following condition is met: $IN12/f \leq 60$. Thereby, this configuration is helpful to improve the chromatic aberration of the lens in order to elevate their performance.

The distance between the fifth lens and the sixth lens on the optical axis is IN56. The following condition is met: $IN56/h \leq 3.0$. Therefore, this configuration is, helpful to improve the chromatic aberration of the lens in order to elevate their performance.

The thicknesses of the first lens and the second lens on the optical axis are TP1 and TP2, respectively. The following condition is meet: $0.1 \leq (TP1+IN12)/TP2 \leq 10$. Therefore, this configuration is helpful to control the sensitivity of the optical image capturing system and elevate their performance.

The thicknesses of the fifth lens and the sixth lens on the optical axis are TP5 and TP6, respectively, and the distance on the optical axis between the fifth lens and the sixth lens is IN56. The following condition is met: $0.1 \leq (TP6+IN56)/TP5 \leq 15$. Therefore, this configuration is helpful to control the sensitivity of the optical image capturing system, and decrease the total height of the optical image capturing system.

The thicknesses of the second, third and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object side of the first lens and the image side of the sixth lens is InTL. The following condition is met: $0.1 \leq TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C61 on the object side of the sixth lens and the optical axis is HVT61. A perpendicular distance between a critical point C62 on the image side of the sixth lens and the optical axis is HVT62. A distance in parallel with the optical axis from an intersection point on the object side of the sixth lens crossing the optical axis to the critical point C61 is SGC61. A distance in parallel with the optical axis from an intersection point on the image side of the sixth lens crossing the optical axis to the critical point C62 is SGC62. The following conditions may be met: $0 \text{ mm} \leq HVT61 \leq 3 \text{ mm}$; $0 \text{ mm} < HVT62 \leq 6 \text{ mm}$; $0 \leq HVT61/HVT62$; $0 \text{ mm} \leq |SGC61| \leq 0.5 \text{ mm}$; $0 \text{ mm} < |SGC62| \leq 2 \text{ mm}$ and $0 < |SGC62|/(|SGC62|+TP6) \leq 0.9$. Therefore, this configuration may correct the off-axis aberration effectively.

The optical image capturing system of the present invention meets the following condition: $0.2 \leq HVT62/HOI \leq 0.9$. Preferably, the following condition may be met: $0.3 \leq HVT62/HOI \leq 0.8$. Therefore, this configuration is helpful to correct the aberration of surrounding field of view for the optical image capturing system.

The optical image capturing system of the present invention may meet the following condition: $0 \leq HVT62/HOS \leq 0.5$. Preferably, the following condition may be met: $0.2 \leq HVT62/HOS \leq 0.45$. Therefore, this configuration is helpful to correct the aberration of surrounding field of view for the optical image capturing system.

In the optical image capturing system of the present invention, the distance in parallel with the optical axis from an inflection point on the object side of the sixth lens that is nearest to the optical axis to an intersection point on the object side of the sixth lens crossing the optical axis is expressed as SGI611. The distance in parallel with an optical axis from an inflection point on the image side of the sixth lens that is nearest to the optical axis to an intersection point on the image side of the sixth lens crossing the optical axis is expressed as SGI621. The following conditions are met: $0 < SGI611/(SGI611+TP6) \leq 0.9$ and $0 < SGI621/(SGI621+TP6) \leq 0.9$. Preferably, the following conditions may be met: $0.1 \leq SGI611/(SGI611+TP6) \leq 0.6$ and $0.1 \leq SGI621/(SGI621+TP6) \leq 0.6$.

The distance in parallel with the optical axis from an inflection point on the object side of the sixth lens that is second nearest to the optical axis to an intersection point on the object side of the sixth lens crossing the optical axis is expressed as SGI612. The distance in parallel with the optical axis from an inflection point on the image side of the sixth lens that is second nearest to the optical axis to an intersection point on the image side of the sixth lens crossing the optical axis is expressed as SGI622. The following conditions are met: $0 < SGI612/(SGI612+TP6) \leq 0.9$ and $0 < SGI622/(SGI622+TP6) \leq 0.9$. Preferably, the following conditions may be satisfied: $0.1 \leq SGI612/(SGI612+TP6) \leq 0.6$ and $0.1 \leq SGI622/(SGI622+TP6) \leq 0.6$.

The perpendicular distance between the inflection point on the object side of the sixth lens that is the nearest to the optical axis and the optical axis is expressed as HIF611. The perpendicular distance between an intersection point on the image side of the sixth lens crossing the optical axis and an inflection point on the image side of the sixth lens that is the nearest to the optical axis is expressed as HIF621. The following conditions are met: $0.001 \text{ mm} \leq |HIF611| \leq 5 \text{ m}$ and $0.001 \text{ mm} \leq |HIF621| \leq 5 \text{ mm}$. Preferably, the following conditions may be satisfied: $0.1 \text{ mm} \leq |HIF611| \leq 3.5 \text{ mm}$ and $1.5 \text{ mm} \leq |HIF621| \leq 3.5 \text{ mm}$.

The perpendicular distance between the inflection point on the object side of the sixth lens that is second nearest to the optical axis and the optical axis is expressed as HIF612. The distance perpendicular to the optical axis between the intersection point on the image side of the sixth lens crossing the optical axis and the inflection point on the image side of the sixth lens that is second nearest to the optical axis is expressed as HIF622. The following conditions are met: $0.001 \text{ mm} \leq |HIF612| \leq 5 \text{ mm}$ and $0.001 \text{ mm} \leq |HIF622| \leq 5 \text{ mm}$. Preferably, the following conditions may be satisfied: $0.1 \text{ mm} \leq |HIF622| \leq 3.5 \text{ mm}$ and $0.1 \text{ mm} \leq |HIF612| \leq 33.5 \text{ mm}$.

The perpendicular distance between the inflection point on the object side of the sixth lens that is third nearest to the optical axis and the optical axis is expressed as HIF613. The distance perpendicular to the optical axis between the intersection point on the image side of the sixth lens crossing the optical axis and an inflection point on the image side of the sixth lens that is third nearest to the optical axis is expressed as HIF623. The following conditions are met: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The perpendicular distance between an inflection point on the object side of the sixth lens that is fourth nearest to the optical axis and the optical axis is expressed as HIF614. The distance perpendicular to the optical axis between the intersection point on the image side of the sixth lens crossing the optical axis and an inflection point on the image side of the sixth lens that is fourth nearest to the optical axis is expressed as HIF624. The following conditions are met: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and the lens with low coefficient of dispersion in an interlaced manner.

The equation for the aforementioned aspheric surface is:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \ldots \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of glass or plastic material. If the lens is made of the plastic material, this configuration can reduce the cost of manufacturing as well as the weight of the lens effectively. If lens is made of glass, this configuration can control the heat effect and increase the design space of the configuration of the lens with refractive powers in the optical image capturing system. Besides, the object side and the image side of the first lens through sixth lens may be aspheric, which can gain more control variables and even reduce the number of the used lens in contrast to the use of the traditional glass lens in addition to the use of reducing the aberration. Thus, the total height of the optical image capturing system can be reduced effectively.

Furthermore, in the optical image capturing system provided by the present invention, when the surface of lens is a convex surface, the surface of that lens is a convex surface in the vicinity of the optical axis in principle. When the surface of lens is a concave surface, the surface of that lens is a concave surface in the vicinity of the optical axis in principle.

The optical image capturing system of the present invention can be applied to the optical image capturing system with automatic focus based on the demand further and have characters of the good aberration correction and the good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the occurrence frequency which lead to the out focus due to the vibration of the camera lens in the process of the photographing.

In the optical image capturing system of the present invention, at least one lens element among the first lens, second lens, third lens, fourth lens, fifth lens and sixth lens may further be a light filtering element for the light wavelength of less than 500 nm based on the design requirements. The light filtering element may be reached by coating films on at least one surface of that lens with certain filtering function, or forming, that lens with material that can filter light with short wavelength.

The first image plane or the second image plane of the optical image capturing system of the present invention may be selected for a plane or a curved surface based on the requirement further. When the first image plane or the second image plane is a curved surface (e.g. a spherical surface with curvature radius), this configuration is helpful to decrease the required incident angle that make the rays focus on the image plane. In addition to the aid of the miniaturization of the length of the optical image capturing system (TTL), this configuration is helpful to elevate the relative illumination at the same time.

According to the above embodiments, the specific embodiments with figures are presented in detail as below.

The First Embodiment

Figure 1B:
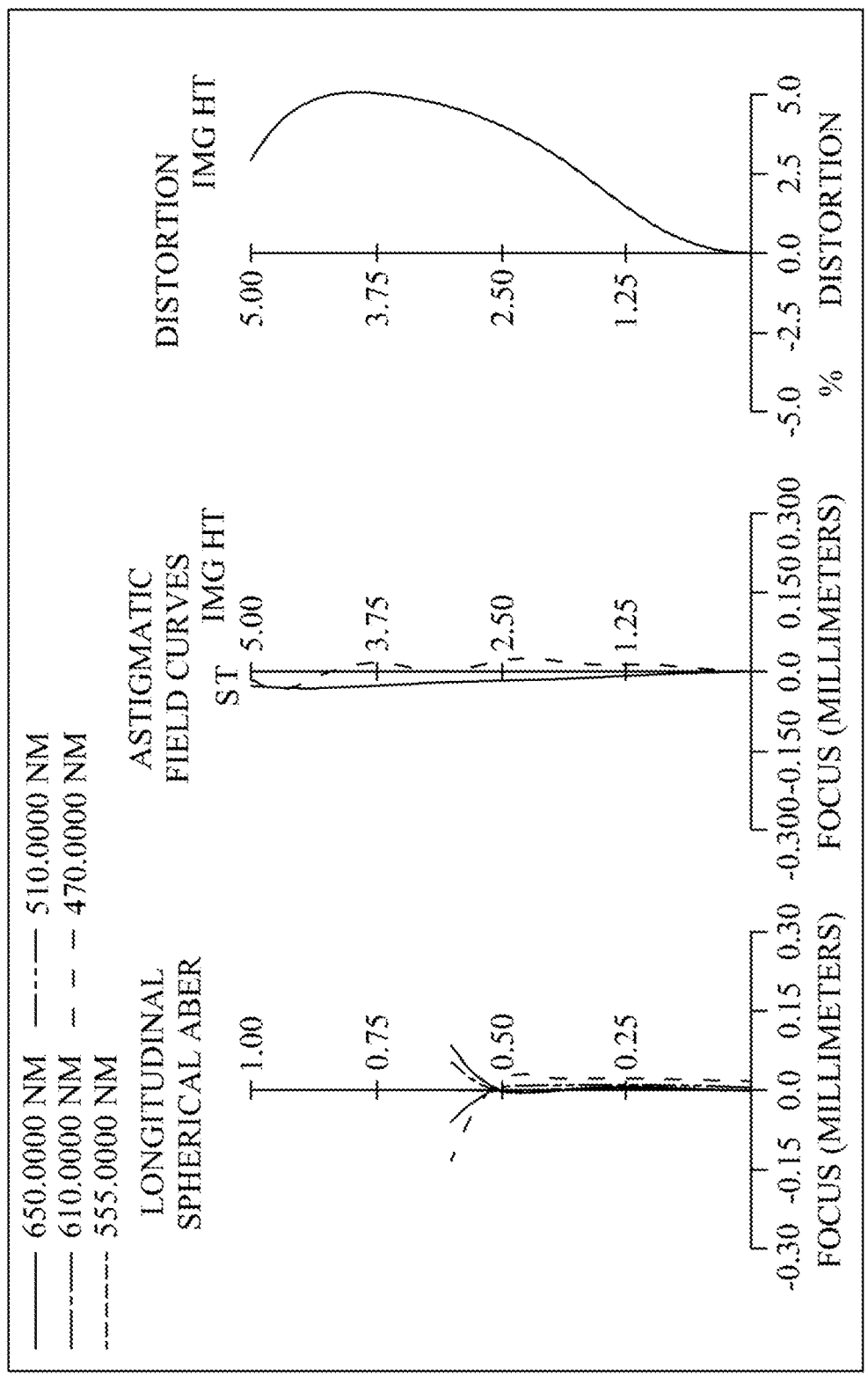
FIG. 1B shows the longitudinal spherical aberration curves, astigmatic field curves, and optical distortion curve of the optical image capturing system in the order from left to right according to the first embodiment of the present invention.
Figure 1C:
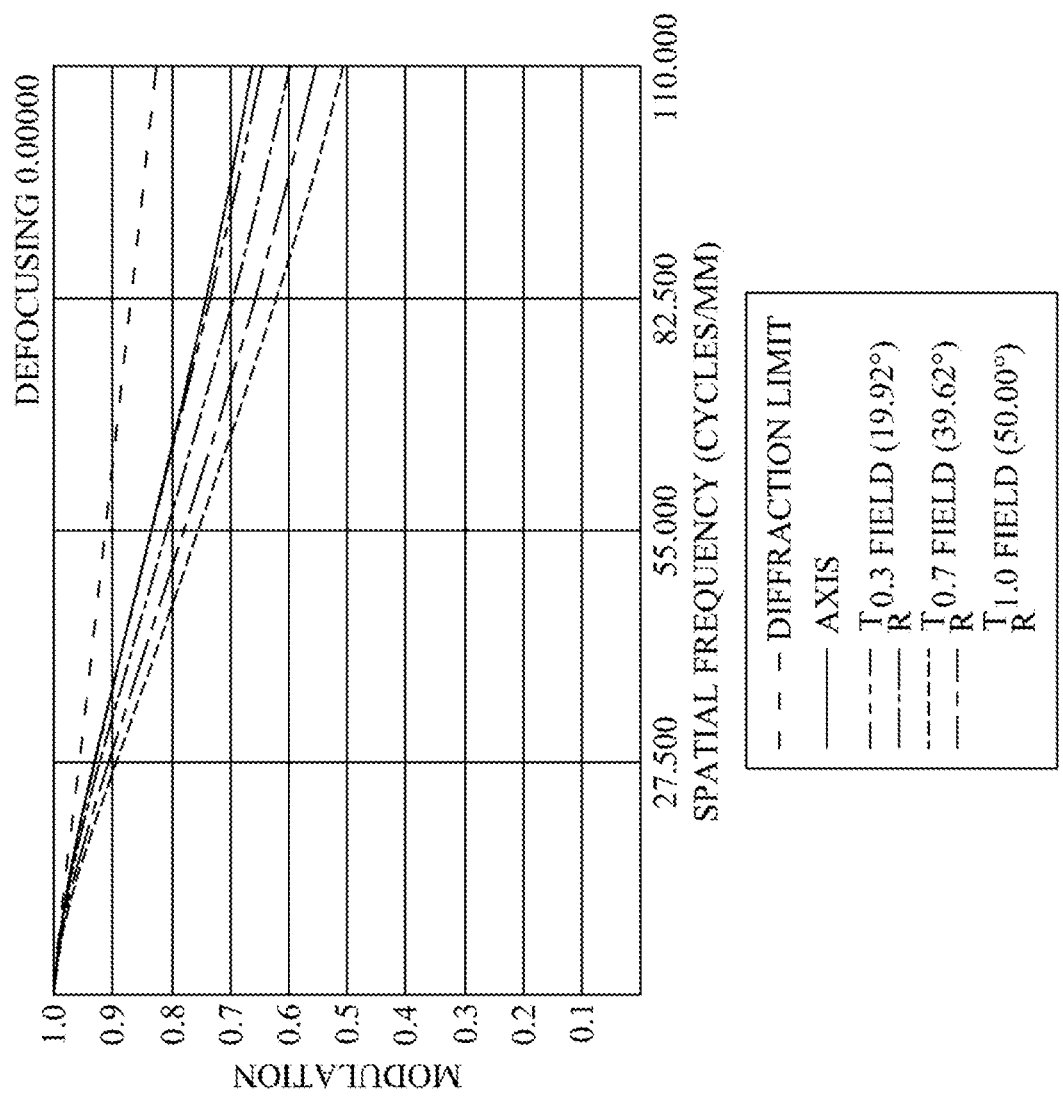
FIG. 1C is a characteristic diagram of modulation transfer of the visible light spectrum according to the first embodiment of the present invention.
Figure 1D:
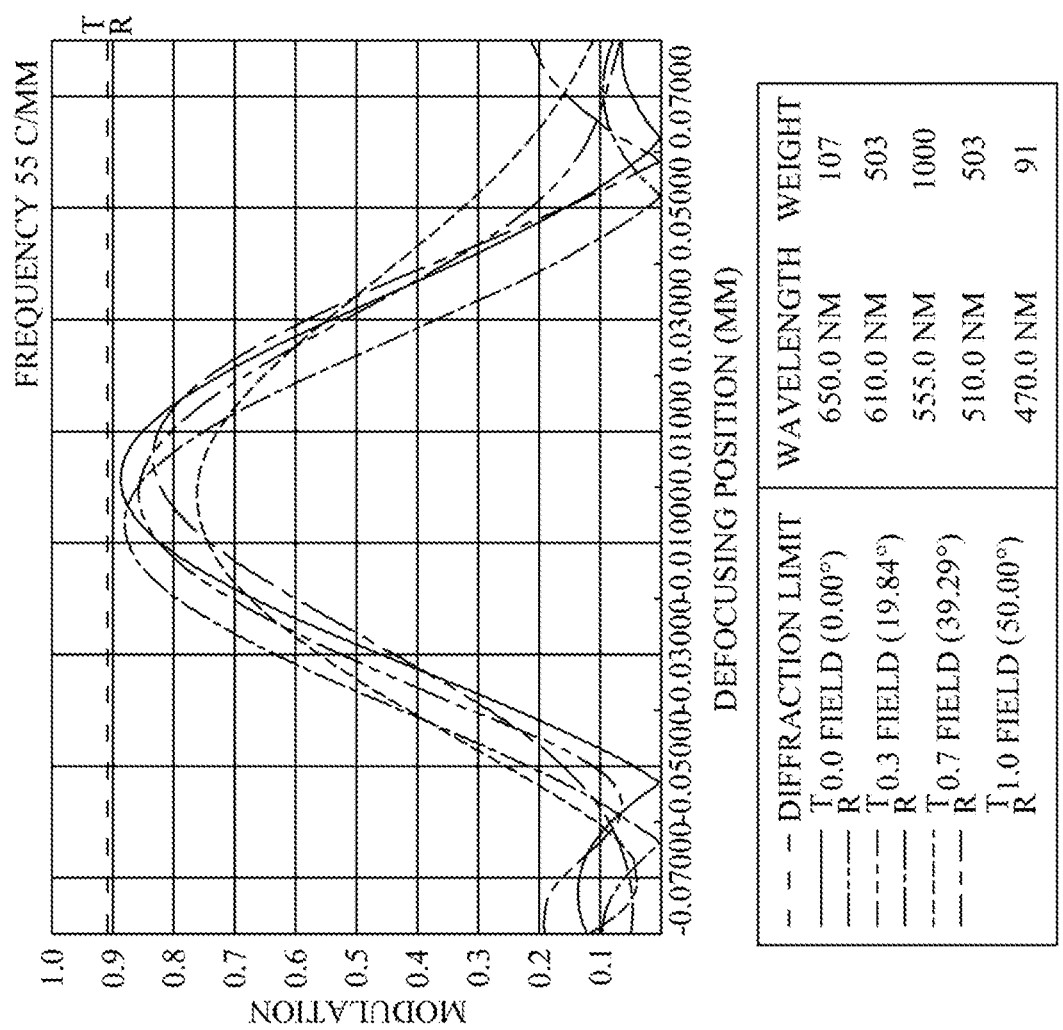
FIG. 1D is a diagram showing the through focus MTF values (Through Focus MTF) of the visible light spectrum at the central field of view, 0.3 field of view, and 0.7 field of view of the first embodiment of the present invention.
Figure 1E:
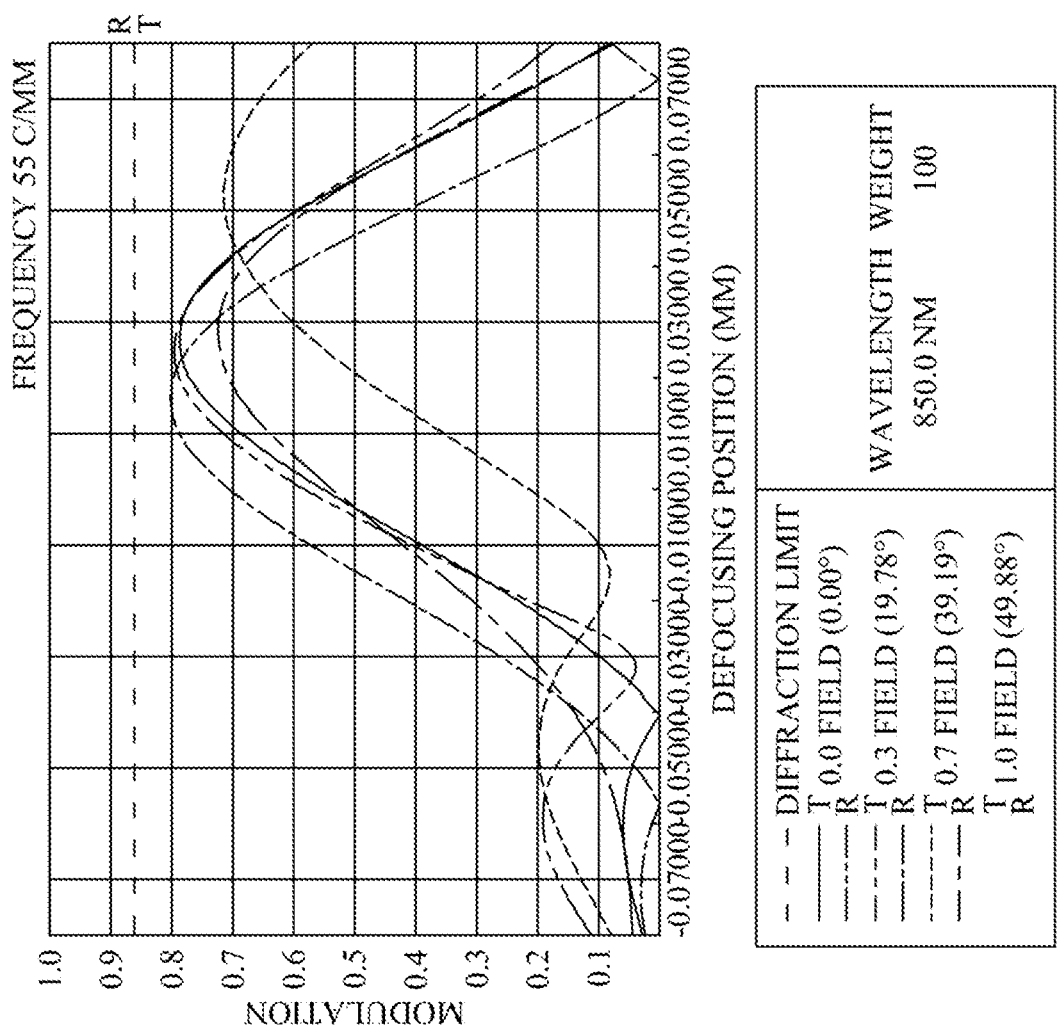
FIG. 1E is a diagram showing the through focus MTF values of the infrared light spectrum at the central field of view, 0.3 field of view, and 0.7 field of view of the first embodiment of the present invention.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a characteristic diagram of modulation transfer of the visible light spectrum according to the first embodiment of the present invention. FIG. 1D is a diagram showing the through focus MTF values (Through Focus MTF) of the visible light spectrum at the central field of view, 0.3 field of view, and 0.7 field of view of the first embodiment of the present invention. FIG. 1E is a diagram showing the through focus MIT values of the infrared light spectrum at the central field of view, 0.3 field of view, and 0.7 field of view of the first embodiment of the present invention.

As shown in FIG. 1A, in the order from the object side to the image side, the optical image capturing system includes a first lens 110, an aperture 100, a second lens 120, a third lens 130, a fourth lens 140, a fifth lens 150, a sixth lens 160, an IR-bandstop filter 180, a first image plane 190, a second image plane and an image sensing device 192. In the first embodiment of the present invention, the rays of any field of view can be further divided into sagittal ray and tangential ray, and the spatial frequency of 55 cycles/mm serves as the benchmark for evaluating the focus shifts and the MTF values. The first embodiment of the present invention takes 850 nm as the infrared light wavelength.

The first lens 110 has negative refractive power and is made of plastic material. The object side 112 of the first lens 110 is a concave surface and the image side 114 of the first lens 110 is a concave surface, and the object side 112 and the image side 114 of the first lens 110 are both aspheric. The object side 112 of the first lens 110 has two inflection points. The thickness of the first lens on the optical axis is TP1. The thickness of the first lens at height of ½ entrance pupil diameter (HEP) is expressed as ETP1.

The horizontal distance paralleling the optical axis from an inflection point on the object side of the first lens which is nearest to the optical axis to an intersection point on the object side of the first lens crossing the optical axis is expressed as SGI111. The horizontal distance paralleling the optical axis from an inflection point on the image side of the first lens which is nearest to the optical axis to an intersection point on the image side of the first lens crossing the optical axis is expressed as SGI121. The following conditions are met: SGI111=−0.0031 mm, and |SGI111|/(|SGI111|+TP1)=0.0016.

The horizontal distance in parallel with the optical axis from an inflection point on the object side of the first lens that is second nearest to the optical axis to the intersection point on the object side of the first lens crossing the optical axis is expressed as SGI112. The horizontal distance in parallel with the optical axis from an inflection point on the image side of the first lens that is second nearest to the optical axis to the intersection point on the image side of the first lens crossing the optical axis is expressed as SGI122. The following conditions are met: SGI112=1.3178 mm and |SGI112|/(|SGI112|+TP1)=0.4052.

The perpendicular distance from the inflection point on the object side of the first lens that is nearest to the optical axis to the optical axis is expressed as HIF111. The distance perpendicular to the optical axis from the inflection point on the image side of the first lens that is nearest to the optical axis to the intersection point on the image side of the first lens crossing the optical axis is expressed as HIF121. The following conditions are met: HIF111=0.5557 mm and HIF111/HOI=0.1111.

The perpendicular distance from the inflection point on the object side of the first lens that is second nearest to the optical axis to the optical axis is expressed as HIF112. The distance perpendicular to the optical axis from the inflection point on the image side of the first lens that is second nearest to the optical axis to the intersection point on the image side of the first lens crossing the optical axis is expressed as HIF122. The following conditions are met: HIF112=5.3732 mm and HIF112/HOI=1.0746.

The second lens 120 has positive refractive power and is made of plastic material. An object side 122 of the second lens 120 is a convex surface and an image side 124 of the second lens 120 is a convex surface, and the object side 122 and the image side 124 of the second lens 120 are both aspheric. The object side 122 of the second lens 120 has one inflection point. The thickness of the second lens on the optical axis is TP2. The thickness of the second lens at height of ½ entrance pupil diameter (HEP) is expressed as ETP2.

The horizontal distance in parallel with the optical axis from an inflection point on the object side of the second lens that is nearest to the optical axis to an intersection point on the object side of the second lens crossing the optical axis is expressed as SGI211. The horizontal distance in parallel with the optical axis from an inflection point on the image side of the second lens that is nearest to the optical axis to an intersection point on the image side of the second lens crossing the optical axis is expressed as SGI221. The following conditions are met: SGI211=0.1069 mm, |SGI211|/(|SGI211|+TP2)=0.0412, SGI221=0 mm and |SGI221|/(|SGI221|+TP2)=0.

The perpendicular distance from the inflection point on the object side of the second lens that is nearest to the optical axis to the optical axis is expressed as HIF211. The distance perpendicular to the optical axis from the inflection point on the image side of the second lens that is nearest to the optical axis to the intersection point on the image side of the second lens crossing the optical axis is expressed as HIF221. The following conditions are met: HIF211=1.1264 mm, HIF211/HOI=0.2253, HIF221=0 mm and HIF221/HOI=0.

The third lens 130 has negative refractive power and is made of plastic material. An object side 132 of the third lens 130 is a concave surface and an image side 134 of the third lens 130 is a convex surface, and the object side 132 and the image side 134 of the third lens 130 are both aspheric. The object side 132 and the image side 134 of the third lens 130 both have one inflection point. The thickness of the third lens on the optical axis is TP3. The thickness of the third lens at height of ½ entrance pupil diameter (HEP) is expressed as ETP3.

The horizontal distance in parallel with the optical axis from an inflection point on the object side of the third lens that is nearest to the optical axis to an intersection point on the object side of the third lens crossing the optical axis is expressed as SGI311. The distance in parallel with the optical axis from an inflection point on the image side of the third lens that is nearest to the optical axis to an intersection point on the image side of the third lens crossing the optical axis is expressed as SGI321. The following conditions are met: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object side of the third lens that is nearest to the optical axis and the optical axis is expressed as HIF311. The distance perpendicular to the optical axis between the inflection point on the image side of the third lens that is nearest to the optical axis and the intersection point on the image side of the third lens crossing the optical axis is expressed as HIF321. The following conditions are met: HIF311=1.5907 mm, HIF311/HOI=0.3181, HIF321=1.3380 mm and HIF321/HOI=0.2676.

The fourth lens 140 has positive refractive power and is made of plastic material. An object side 142 of the fourth lens 140 is a convex surface and an image side 144 of the fourth lens 140 is a concave surface, and the object side 142 and the image side 144 of the fourth lens 140 are both aspheric. The object side 142 of the fourth lens 140 has two inflection points, and the image side 144 of the fourth lens 140 has one inflection point. The thickness of the fourth lens on the optical axis is TP4. The thickness of the fourth lens at height of ½ entrance pupil diameter (HEP) is expressed as ETP4.

The horizontal distance in parallel with the optical axis from an inflection point on the object side of the fourth lens that is nearest to the optical axis to an intersection point on the object side of the fourth lens crossing the optical axis is expressed as SGI411. The horizontal distance in parallel with the optical axis from an inflection point on the image side of the fourth lens that is nearest to the optical axis to an intersection point on the image side of the fourth lens crossing the optical axis is expressed as SGI421. The following conditions are met: SGI411=0.0070 mm, |SGI411|/(|SGI411|+TP4)=0.0056, SGI421=0.0006 mm and |SGI421|/(|SGI421|+TP4)=0.0005.

The horizontal distance in parallel with the optical axis from an inflection point on the object side of the fourth lens that is second nearest to the optical axis to the intersection point on the object side of the fourth lens crossing the optical axis is expressed as SGI412. The horizontal distance in parallel with the optical axis from an inflection point on the image side of the fourth lens that is second nearest to the optical axis to the intersection point on the image side of the fourth lens crossing the optical axis is expressed as SGI422. The following conditions are met: SGI412=−0.2078 mm and |SGI412|/(|SGI412|+TP4)=0.1439.

The perpendicular distance between the inflection point on the object side of the fourth lens that is nearest to the optical axis and the optical axis is expressed as HIF411. The distance perpendicular to the optical axis between the inflection point on the image side of the fourth lens that is nearest to the optical axis and the intersection point on the image side of the fourth lens crossing the optical axis is expressed as HIF421. The following conditions are met: HIF411=0.4706 mm, HIF411/HOI=0.0941, HIF421=0.1721 mm and HIF421/HOI=0.0344.

The perpendicular distance between the inflection point on the object side of the fourth lens that is second nearest to the optical axis and the optical axis is expressed as HIF412. The distance perpendicular to the optical axis between the inflection point on the image side of the fourth lens that is second nearest to the optical axis and the intersection point on the image side of the fourth lens crossing the optical axis is expressed as HIF422. The following conditions are met: HIF412=2.0421 mm and HIF412/HOI=0.4084.

The fifth lens 150 has positive refractive power and is made of plastic material. An object side 152 of the fifth lens 150 is a convex surface and an image side 154 of the fifth lens 150 is a convex surface, and the object side 152 and the image side 154 of the fifth lens 150 are both aspheric. The object side 152 of the fifth lens 150 has two inflection points and the image side 154 of the fifth lens 150 has one inflection point. The thickness of the fifth lens on the optical axis is TP5. The thickness of the fifth lens at height of ½ entrance pupil diameter (HEP) is expressed as ETP5.

The horizontal distance in parallel with the optical axis from an inflection point on the object side of the fifth lens that is nearest to the optical axis to an intersection point on the object side of the fifth lens crossing the optical axis is expressed as SGI511. The horizontal distance in parallel with the optical axis from an inflection point on the image side of the fifth lens that is nearest to the optical axis to an intersection point on the image side of the fifth lens crossing the optical axis is expressed as SGI521. The following conditions are met: SGI511=0.00364 mm, |SGI511|/(|SGI511|+TP5)=0.00338, SGI521=−0.63365 mm and |SGI521|/(|SGI521|+TP5)=0.37154.

The horizontal distance in parallel with the optical axis from an inflection point on the object side of the fifth lens that is second nearest to the optical axis to the intersection point on the object side of the fifth lens crossing the optical axis is expressed as SGI512. The horizontal distance in parallel with the optical axis from an inflection point on the image side of the fifth lens that is second nearest to the optical axis to the intersection point on the image side of the fifth lens crossing the optical axis is expressed as SGI522. The following conditions are met: SGI512=−0.32032 mm and |SGI512|/(|SGI512|+TP5)=0.23009.

The horizontal distance in parallel with the optical axis from an inflection point on the object side of the fifth lens that is third nearest to the optical axis to the intersection point on the object side of the fifth lens crossing the optical axis is expressed as SGI513. The horizontal distance in parallel with the optical axis from an inflection point on the image side of the fifth lens that is third nearest to the optical axis to the intersection point on the image side of the fifth lens crossing the optical axis is expressed as SGI523. The following conditions are met: SGI513=0 mm, |SGI513|/(|SGI513|+TP5)=0, SGI523 mm and |SGI523|/(|SGI523|+TP5)=0.

The horizontal distance in parallel with the optical axis from an inflection point on the object side of the fifth lens that is fourth nearest to the optical axis to the intersection point on the object side of the fifth lens crossing the optical axis is expressed as SGI514. The horizontal distance in parallel with the optical axis from an inflection point on the image side of the fifth lens that is fourth nearest to the optical axis to the intersection point on the image side of the fifth lens crossing the optical axis is expressed as SGI524. The following conditions are met: SGI514 mm, |SGI514|/(|SGI514|+TP5)=0, SGI524=0 mm and |SGI524|/(|SGI524|+TP5)=0.

The perpendicular distance between the optical axis and the inflection point on the object side of the fifth lens that is nearest to the optical axis is expressed as HIF511. The perpendicular distance between the optical axis and the inflection point on the image side of the fifth lens that is nearest to the optical axis is expressed as HIF521. The following conditions are met: HIF511=0.28212 mm, HIF511/HOI=0.05642, HIF521=2.13850 mm and HIF521/HOI=0.42770.

The perpendicular distance between the inflection point on the object side of the fifth lens that is second nearest to the optical axis and the optical axis is expressed as HIF512. The perpendicular distance between the inflection point on the image side of the fifth lens that is second nearest to the optical axis and the optical axis is expressed as HIF522. The following conditions are met: HIF512=2.51384 mm and HIF512/HOI=0.50277.

The perpendicular distance between the inflection point on the object side of the fifth lens that is third nearest to the optical axis and the optical axis is expressed as HIF513. The perpendicular distance between the inflection point on the image side of the fifth lens that is third nearest to the optical axis and the optical axis is expressed as HIF523. The following conditions are met: HIF513=0 mm, HIF513/HOI=0, HIF523=0 mm and HIF523/HOI=0.

The perpendicular distance between the inflection point on the object side of the fifth lens that is fourth nearest to the optical axis and the optical axis is expressed as HIF514. The perpendicular distance between the inflection point on the image side of the fifth lens that is fourth nearest to the optical axis and the optical axis is expressed as HIF524. The following conditions are met: HIF514=0 mm, HIF514/HOI=0, mm and HIF524/HOI=0.

The sixth lens 160 has negative refractive power and is made of plastic material. An object side 162 of the sixth lens 160 is a concave surface and an image side 164 of the sixth lens 160 is a concave surface, and the object side 162 of the sixth lens 160 has two inflection points and the image side 164 of the sixth lens 160 has one inflection point. Therefore, the incident angle of each field of view on the sixth lens can be effectively adjusted and the spherical aberration can be improved. The thickness of the sixth lens on the optical axis is TP6. The thickness of the sixth lens at height of ½ entrance pupil diameter (HEP) is expressed as ETP6.

The horizontal distance in parallel with the optical axis from an inflection point on the object side of the sixth lens that is nearest to the optical axis to the intersection point on the object side of the sixth lens crossing the optical axis is expressed as SGI611. The horizontal distance in parallel with the optical axis from an inflection point on the image side of the sixth lens that is nearest to the optical axis to the intersection point on the image side of the sixth lens crossing the optical axis is expressed as SGI621. The following conditions are met: SGI611=−0.38558 mm, |SGI611|/(|SGI611|+TP6)=0.27212, SGI621=0.12386 mm and |SGI621|/(|SGI621|+TP6)=0.10722.

The distance in parallel with the optical axis from an inflection point on the object side of the sixth lens that is second nearest to the optical axis to the intersection point on the object side of the sixth lens crossing the optical axis is expressed as SGI612. The distance in parallel with the optical axis from an inflection point on the image side of the sixth lens that is second nearest to the optical axis to the intersection point on the image side of the sixth lens crossing the optical axis is expressed as SGI622. The following conditions are met: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object side of the sixth lens that is nearest to the optical axis and the optical axis is expressed as HIF611. The perpendicular distance between the inflection point on the image side of the sixth lens that is nearest to the optical axis and the optical axis is expressed as HIF621. The following conditions are met: HIF611=2.24283 mm, HIF611/HOI=0.44857, HIF621=1.07376 mm and HIF621/HOI=0.21475.

The perpendicular distance between the inflection point on the object side of the sixth lens that is second nearest to the optical axis and the optical axis is expressed as HIF612. The perpendicular distance between the inflection point on the image side of the sixth lens that is second nearest to the optical axis and the optical axis is expressed as HIF622. The following conditions are met: HIF612=2.48895 mm and HIF612/HOI=0.49779.

The perpendicular distance between the inflection point on the object side of the sixth lens that is third nearest to the optical axis and the optical axis is expressed as HIF613. The perpendicular distance between the inflection point on the image side of the sixth lens that is third nearest to the optical axis and the optical axis is expressed HIF623. The following conditions are met: HIF613=0 mm, HIF613/HOI=0, HIF623=0 mm and HIF623/HOI=0.

The perpendicular distance between the inflection point on the object side of the sixth lens that is fourth nearest to the optical axis and the optical axis is expressed as HIF614. The perpendicular distance between the inflection point on the image side of the sixth lens that is fourth nearest to the optical axis and the optical axis is expressed as HIF624. The following conditions are met: HIF614=0 mm, HIF614/HOI=0, HIF624=0 mm and HIF624/HOI=0.

In the first embodiment, a distance in parallel with the optical axis between the coordinate point of the object side of the first lens at a height of ½ HEP and the first image plane is ETL. A distance in parallel with the optical axis between the coordinate point of the object side of the first lens at a height of ½ HEP and the coordinate point of the image side of the sixth lens at a height of ½ HEP is EIN. The following conditions are met: ETL=19.304 mm, EIN=15.733 mm and EIN/ETL=0.815.

The first embodiment meets the following conditions: ETP1=2.371 mm; ETP2=2.134 mm; ETP3=3.497 mm; ETP4=1.111 mm; ETP5=1.783 mm; ETP6=1.404 mm. A sum of ETP1 to ETP6 described above SETP=9.300 mm. TP1=2.064 mm; TP2=2.500 mm; TP3=0.380 mm; TP4=1.186 mm; TP5=2.184 mm; TP6=1.105 mm. A sum of TP1 to TP6 described above STP=9.419 mm. SETP/STP=0.987. SETP/EIN=0.5911.

The first embodiment particularly controls the ratio relation (ETP/TP) between the thickness (ETP) of each lens at a height of ½ entrance pupil diameter (HEP) and the thickness (TP) of the lens to which the surface belongs on the optical axis in order to achieve a balance between manufacturability and capability of aberration correction. The following relations are satisfied: ETP1/TP1=1.149, ETP2/TP2=0.854, ETP3/TP3=1.308, ETP4/TP4=0.936, ETP5/TP5=0.817 and ETP6/TP6=1.271.

The first embodiment controls a horizontal distance between each two adjacent lens at a height of ½ entrance pupil diameter (HEP) to achieve a balance between the degree of miniaturization for the length of the optical image capturing system HOS, the manufacturability and the capability of aberration correction. The ratio relation (ED/IN) of the horizontal distance (ED) between the two adjacent lens at the height of ½ entrance pupil diameter (HEP) to the horizontal distance (IN) between the two adjacent lens on the optical axis is particularly controlled. The following relations are satisfied: a horizontal distance in parallel with the optical axis between the first lens and the second lens at a height of ½ entrance pupil diameter (HEP) ED12=5.285 mm; a horizontal distance in parallel with the optical axis between the second lens and the third lens at a height of ½ entrance pupil diameter (HEP) ED23=0.283 mm; a horizontal distance in parallel with the optical axis between the third lens and the fourth lens at a height of ½ entrance pupil diameter (HEP) ED34≤330 mm; a horizontal distance in parallel with the optical axis between the fourth lens and the fifth lens at a height of ½ entrance pupil diameter (HEP) ED45=0.348 mm; a horizontal distance in parallel with the optical axis between the fifth lens and the sixth lens at a height of ½ entrance pupil diameter (HEP) ED56=0.187 mm. A sum of ED12 to ED56 described above is expressed as SED and SED=6.433 mm.

The horizontal distance between the first lens and the second lens on the optical axis IN12=5.470 mm and ED12/IN12=0.966. The horizontal distance between the second lens and the third lens on the optical axis IN23.178 mm and ED23/IN23=1.590. The horizontal distance between the third lens and the fourth lens on the optical axis IN34=0.259 mm and ED34/IN34=1.273. The horizontal distance between the fourth lens and the fifth lens on the optical axis IN45=0.209 mm and ED45/IN45=1.664. The horizontal distance between the fifth lens and the sixth lens on the optical axis IN56=0.034 mm and ED56/IN56=5.557. A sum of IN12 to IN56 described above is expressed as SIN and SIN=6.150 mm. SED/SIN=1.046. The following conditions are satisfied: (IN34+IN45)≤TP3; (IN34+IN45)≤TP4 and (IN34+IN45)≤TP5.

The first embodiment also meets the following relations: ED12/ED23=18.685, ED23/ED34=0.857, ED34/ED45=0.947, ED45/ED56=1.859, IN12/IN23-30.746, IN23/IN34=0.686, IN34/IN45=1.239 and IN45/IN56=6.207.

A horizontal distance in parallel with the optical axis between a coordinate point on the image side of the sixth lens at the height of ½ HEP and the first image plane EBL=3.570 mm. A horizontal distance in parallel with the optical axis between an intersection point on the image side of the sixth lens crossing the optical axis and the first image plane BL=4.032 mm. The embodiment of the present invention may meet the following relation: EBL/BL=0.8854. In the first embodiment, a distance in parallel with the optical axis between the coordinate point on the image side of the sixth lens at the height of ½ HEP and the IR-bandstop filter is EIR=1.950 mm. A distance in parallel with the optical axis between an intersection point on the image side of the sixth lens crossing the optical axis and the IR-bandstop filter PIR=2.121 mm. The following relation is satisfied: EIR/PIR=0.920.

The IR-bandstop filter 180 is made of glass. The IR-bandstop filter 180 is disposed between the sixth lens 160 and the first image plane 190, and it does not affect the focal length of the optical image capturing system.

In the optical image capturing system of the first embodiment, a focal length of the optical image capturing system is f, an entrance pupil diameter of the optical image capturing system is HEP, and a half maximum angle of view of the optical image capturing system is HAF. The values of the foregoing parameters are shown as below: 4.075 mm, f/HEP=1.4, HAF=50.001° and tan(HAF)=1.1918.

In the optical image capturing system of the first embodiment, a focal length of the first lens 110 is f1 and a focal length of the sixth lens 160 is f6. The following conditions are satisfied: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each lens with positive refractive power is PPR. The ratio of the focal length f of the optical image capturing system to a focal length fn of each lens with negative refractive power is NPR. In the optical image capturing system of the first embodiment, a sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305 and ΣPPR/|ΣNPR|=1.07921. The following conditions are also satisfied: |f/f2|=0.69101, |f/f3|=0.15834, |f/f4|=0.06883, |f/f5|=0.87305 and |f6|=0.83412.

In the optical image capturing system of the first embodiment, the distance from the object side 112 of the first lens to the image side 164 of the sixth lens is InTL. The distance from the object side of the first lens to the first image plane 190 is HOS. The distance from the aperture 100 to the first image plane 190 is InS. A half of diagonal of the effective detection field of the image sensing device 192 is HOI. The distance from the image side 164 of the sixth lens to the first image plane 190 is BFL. The following conditions are satisfied: InTL+ BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is STP. The following condition is met: STP=8.13899 mm and STP/InTL=0.52477. Therefore, this configuration can keep the contrast ratio of the optical image capturing system and the yield rate about manufacturing lens, and provide the proper back focal length to accommodate other elements.

In the optical image capturing system of the first embodiment, the curvature radius of the object side 112 of the first lens is R1. The curvature radius of the image side 114 of the first lens is R2. The following condition is satisfied: |R1/R2|=8.99987. Therefore, the first lens may have a suitable magnitude of positive refractive power, so as to prevent the longitudinal spherical aberration from increasing too fast.

In the optical image capturing system of the first embodiment, the curvature radius of the object side 162 of the sixth lens is R11. The curvature radius of the image side 164 of the sixth lens is R12. The following condition is satisfied: (R11−R12)/(R11+R12)=1.27780. Therefore, this configuration is beneficial to correct the astigmatism generated by the optical image capturing system.

In the optical image capturing system of the first embodiment, the sum of focal lengths of all lenses with positive refractive power is ΣPP. The following conditions are met: ΣPP=f2+f4+f5=69.770 mm and f5/(f2+f4+f5)=0.067. Hereby, this configuration is helpful to distribute the positive refractive power of the single lens to other lens with positive refractive powers in an appropriate way, so as to suppress the generation of noticeable aberrations in the propagating process of the incident light in the optical image capturing system.

In the optical image capturing system of the first embodiment, the sum of focal lengths of all lenses with negative refractive power is ΣNP. The following conditions are met: ΣNP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. The following conditions are met: IN12=6.418 mm and IN12/f=1.57491. Therefore, this configuration is helpful to improve the chromatic aberration of the lens in order to elevate their performance.

In the optical image capturing system of the first embodiment, a distance between the fifth lens 150 and the sixth lens 160 on the optical axis is IN56. The following conditions are met: IN56=0.025 mm and IN56/f=0.00613. Therefore, this configuration is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are met: TP1=1.934 mm, TP2=2.486 mm and (TP1+IN12)/TP2=3.36005. Therefore, this configuration is helpful to control the sensitivity generated by the optical image capturing system and elevate their performance.

In the optical image capturing system of the first embodiment, the thicknesses of the fifth lens 150 and the sixth lens 160 on the optical axis are TP5 and TP6, respectively. The distance between the fifth lens 150 and the sixth lens 160 on the optical axis is IN56. The following conditions are met: TP5=1.072 mm, TP6=1.031 mm and (TP6+IN56)/TP5=0.98555. Therefore, this configuration is helpful to control the sensitivity generated by the optical image capturing system and reduce the total height of the optical image capturing system.

In the optical image capturing system of the first embodiment, a distance between the third lens 130 and the fourth lens 140 on the optical axis is IN34. The distance between the fourth lens 140 and the fifth lens 150 on the optical axis is IN45. The following conditions are met: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a distance in parallel with the optical axis from a maximum effective half diameter position on the object side 152 of the fifth lens to the intersection point on the object side 152 of the fifth lens crossing the optical axis is InRS51. The distance in parallel with the optical axis from a maximum effective half diameter position on the image side 154 of the fifth lens to the intersection point on the image side 154 of the fifth lens crossing the optical axis is InRS52. The thickness of the fifth lens on the optical axis 150 is TP5. The following conditions are met: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeps the miniaturization of the optical image capturing system effectively.

In the optical image capturing, system of the first embodiment, the perpendicular distance between a critical point C51 on the object side 152 of the fifth lens and the optical axis is HVT51. The perpendicular distance between a critical point C52 on the image side 154 of the fifth lens and the optical axis is HVT52. The following conditions are met: HVT51=0.515349 mm and HVT52=0 mm.

In the optical image capturing system of the first embodiment, a distance in parallel with the optical axis from a maximum effective half diameter position on the object side 162 of the sixth lens to the intersection point on the object side 162 of the sixth lens crossing the optical axis is InRS61. A distance in parallel with the optical axis from a maximum effective half diameter position on the image side 164 of the sixth lens to the intersection point on the image side 164 of the sixth lens crossing the optical axis is InRS62. The thickness of the sixth lens 160 on the optical axis is TP6. The following conditions are met: InRS61=−0.58390 mm, InRS62=0.41976 mm, |InRS61|/TP6.56616 and |InRS62|/TP6=0.40700. Hereby, this configuration is favorable to the manufacturing and forming of lens and keeps the miniaturization of the optical image capturing system effectively.

In the optical image capturing system of the first embodiment, the perpendicular distance between a critical point C61 on the object side 162 of the sixth lens and the optical axis is HVT61. The perpendicular distance between a critical point C62 on the image side 164 of the sixth lens and the optical axis is HVT62. The following conditions are met: HVT61=0 mm and HVT62=0 mm.

In the optical image capturing system of the first embodiment, the following condition may be satisfied: HVT51/HOI=0.1031. Therefore, this configuration is helpful to correct the aberration of surrounding field of view of the optical image capturing system.

In the optical image capturing system of the first embodiment, the following condition may be satisfied: HVT51/HOS=0.02634. Therefore, this configuration is helpful to correct the aberration of surrounding field of view of the optical image capturing system.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens is NA6. The following condition is met: NA6/NA2≤1. Therefore, this configuration is helpful to correct the chromatic aberration of the optical image capturing system.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

In the first embodiment of the present invention, the rays of any field of view can be further divided into sagittal ray and tangential ray, and the spatial frequency of 55 cycles/mm serves as the benchmark for evaluating the focus shifts and the values of MTF. The focus shifts where the through focus MTF values of the visible sagittal ray at the central field of view, 0.3 field of view, and 0.7 field of view of the optical image capturing system are at their respective maxima are expressed as VSFS0, VSFS3, and VSFS7 (unit of measurement: mm), respectively. The values of VSFS0, VSFS3, and VSFS7 equal to 0.000 mm, −0.005 mm, and 0.005 mm, respectively. The maximum values of the through focus MTF of the visible sagittal ray at the central field of view, 0.3 field of view, and 0.7 field of view are expressed as VSMTF0, VSMTF3, and VSMTF7, respectively. The values of VSMTF0, VSMTF3, and VSMTF7 equal to 0.886; 0.880, and 0.834, respectively. The focus shifts where the through focus MTF values of the visible tangential ray at the central field of view, 0.3 field of view, and 0.7 field of view of the optical image capturing system are at their respective maxima are expressed as VTFS0, VTFS3, and VTFS7 (unit of measurement: mm), respectively. The values of VTFS0, VTFS3, and VTFS7 equal to 0.000 mm, 0.000 mm, and 0.000 mm, respectively. The maximum values of the through focus MTF of the visible tangential ray at the central field of view, 0.3 field of view, and 0.7 field of view are expressed as VTMTF0, VTMTF3, and VTMTF7, respectively. The values of VTMTF0, VTMTF3, and VTMTF7 equal to 0.886, 0.857, and 0.761, respectively. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+ VSFS3+ VSFS7+ VTFS0+ VTFS3+ VTFS7)/6|=|0.000 mm|.

The focus shifts, where the through focus MTF values of the infrared sagittal ray at the central field of view, 0.3 field of view, and 0.7 field of view of the optical image capturing system are at their respective maxima, are expressed as ISFS0, ISFS3, and ISFS7 (unit of measurement: mm), respectively. The values of ISFS0, ISFS3, and ISFS7 equal to 0.025 mm, 0.015 mm, and 0.030 mm, respectively. The average focus shift (position) of the aforementioned focus shifts of the infrared sagittal ray at three fields of view is expressed as AISFS. The maximum values of the through focus MTF of the infrared sagittal ray at the central field of view, 0.3 field of view, and 0.7 field of view are expressed as ISMTF0, ISMTF3, and ISMTF7, respectively. The values of ISMTF0, ISMTF3, and ISMTF7 equal to 0.787, 0.802, and 0.726, respectively. The focus shifts where the through focus MTF values of the infrared tangential ray at the central field of view, 0.3 field of view, and 0.7 field of view of the optical image capturing system are at their respective maxima are expressed as ITFS0, ITFS3, and ITFS7 (unit of measurement: mm), respectively. The values of ITFS0, ITFS3, and ITFS7 equal to 0:025, 0.025, and 0.050, respectively. The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are expressed as ITMTF0, ITMTF3, and ITMTF7, respectively. The values of ITMTF0, ITMTF3, and ITMTF7 equal to 0.787, 0.797, and 0.715, respectively. The average focus shift (position) of both of the aforementioned focus shifts of the infrared sagittal ray at the three fields of view and focus shifts of the infrared tangential ray at the three fields of view is expressed as AIFS (unit of measurement: mm), which equals to the absolute value of |(ISFS0+ ISFS3+ ISFS7+ ITFS0+ ITFS3+ ITFS7)/6|=0.028 mm|.

The focus shift (difference) of the focal points of the visible light and the focus shift (difference) of the focal points of the infrared light at their respective central fields of view (RGB/IR) of the entire optical image capturing system (i.e. wavelength of 850 nm versus wavelength of 555 nm, unit of measurement: mm) is expressed as FS, which meets the absolute value |(VSFS0+ VTFS0)/2−(ISFS0+ ITFS0)/2|=10.025 mm|; The difference (focus shift) between the average focus shift of the visible light in the three fields of view and the average focus shift of the infrared light in the three fields of view (RGB/IR) of the entire optical image capturing system is expressed as AFS (i.e. wavelength of 850 nm versus wavelength of 555 nm, unit of measurement: mm), which may meet the absolute value of |AIFS−AVFS|=10.028 mm|.

In the optical image capturing system of the first embodiment, contrast transfer rates of modulation transfer with the spatial frequency of 55 cycles/mm of visible light at the optical axis, 0.3 HOI and 0.7 HOI on the first image plane are respectively expressed as MTFE0, MTFE3 and MTFE7. The following relations are satisfied: MTFE0 is about 0.84, MTFE3 is about 0.84 and MTFE7 is about 0.75. The contrast transfer rates of modulation transfer with the spatial frequency of 110 cycles/mm of visible light at the optical axis, 0.3 HOI and 0.7 HOI on the first image plane are respectively expressed as MTFQ0, MTFQ3 and MTFQ7. The following relations are satisfied: MTFQ0 is about 0.66, MTFQ3 is about 0.65 and MTFQ7 is about 0.51. The contrast transfer rates of modulation transfer (MTF values) with the spatial frequencies of 220 cycles/mm at the optical axis, 0.3 HOI and 0.7 HOI on the image plane are respectively expressed as MTFH0, MTFH3 and MTFH7. The following relations are satisfied: MTFH0 is about 0.17, MTFH3 is about 0.07 and MTFH7 is about 0.14.

In the optical image capturing system of the first embodiment, when the infrared light at wavelength 850 nm focus on the second image plane, contrast transfer rates of modulation transfer with a spatial frequency (55 cycles/mm) (MTF values) of the image at the optical axis, 0.3 HOI and 0.7 HOI on the second image plane are respectively expressed as MTFI0, MTFI3 and MTFI7. The following relations are satisfied: MTFI0 is about 0.81, MTFI3 is about 0.8 and MTFI7 is about 0.15.

Table 1 and Table 2 below should be incorporated into the reference of the present embodiment.

TABLE 1

Lens Parameter for the First Embodiment
f (focal length) = 4.075 mm; f/HEP = 1.4; HAF (half angle of view) = 50.000 deg

| Surface No | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | First Lens | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Second Lens | 5.333427366 | 2.486 | Plastic | 1.544 | 55.96 | 5.897 |
| 5 | | −6.781659971 | 0.502 | | | | |
| 6 | Third Lens | −5.697794287 | 0.380 | Plastic | 1.642 | 22.46 | −25.738 |
| 7 | | −8.883957518 | 0.401 | | | | |
| 8 | Fourth Lens | 13.19225664 | 1.236 | Plastic | 1.544 | 55.96 | 59.205 |
| 9 | | 21.55681832 | 0.025 | | | | |
| 10 | Fifth Lens | 8.987806345 | 1.072 | Plastic | 1.515 | 56.55 | 4.668 |
| 11 | | −3.158875374 | 0.025 | | | | |
| 12 | Sixth Lens | −29.46491425 | 1.031 | Plastic | 1.642 | 22.46 | −4.886 |
| 13 | | 3.593484273 | 2.412 | | | | |
| 14 | IR-bandstop Filter | Plane | 0.200 | | 1.517 | 64.13 | |
| 15 | | Plane | 1.420 | | | | |
| 16 | First Image Plane | Plane | | | | | |

Reference Wavelength = 555 nm; Shield Position: the 1st surface with effective aperture radius = 5.800 mm; the 3rd surface with effective aperture radius = 1.570 mm; the 5th surface with the effective aperture radius = 1.950 mm

TABLE 2

Aspheric Coefficients of the First Embodiment
Table 2: Aspheric Coefficients

| | Surface No | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| | Surface No | | | | |
|---|---|---|---|---|---|
| | 9 | 10 | 11 | 12 | 13 |
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

Table 1 is the detailed structural data for the first embodiment in FIG. 1A, wherein the unit for the curvature radius, the thickness, the distance, and the focal length is millimeters (mm). Surfaces 0-16 illustrate die surfaces from the object side to the image side in the optical image capturing system. Table 2 shows the aspheric coefficients of the first embodiment, where k is the conic coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
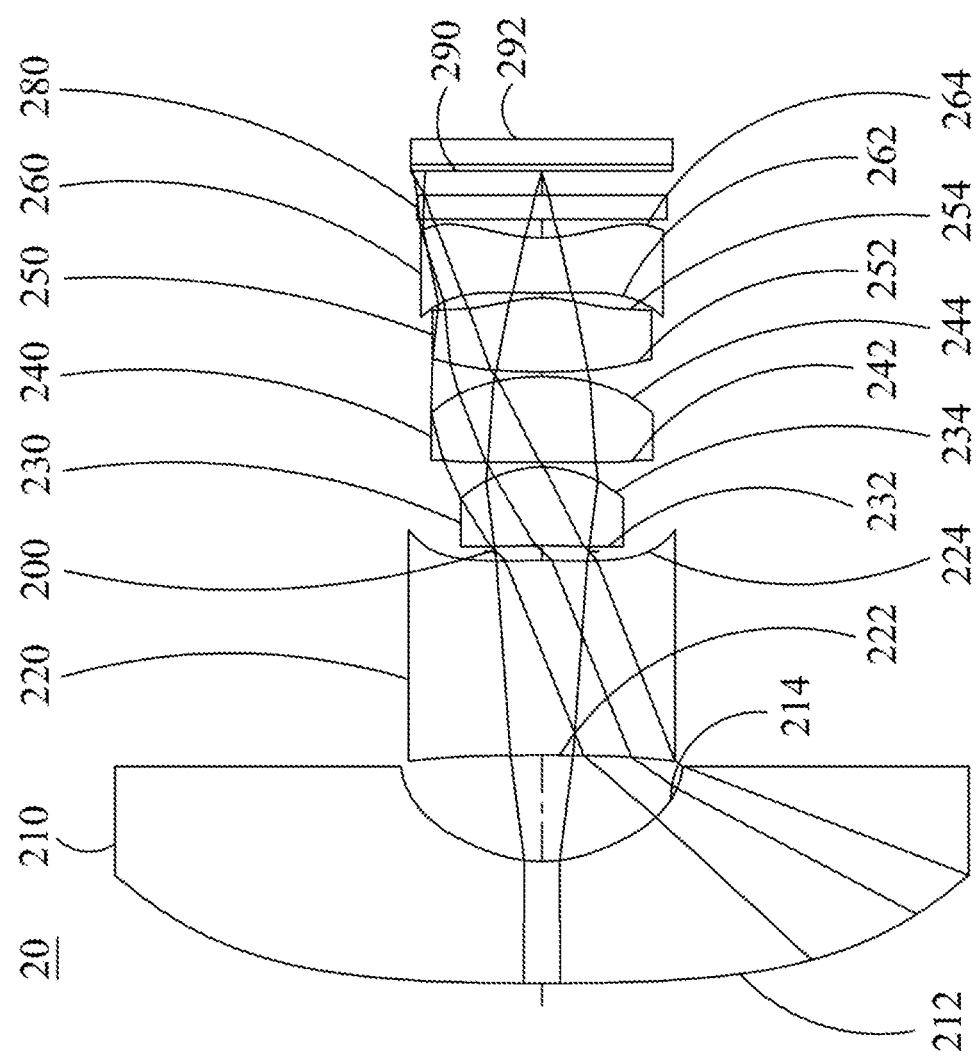
FIG. 2A is a schematic view of the optical image capturing system according to the second embodiment of the present invention.
Figure 2B:
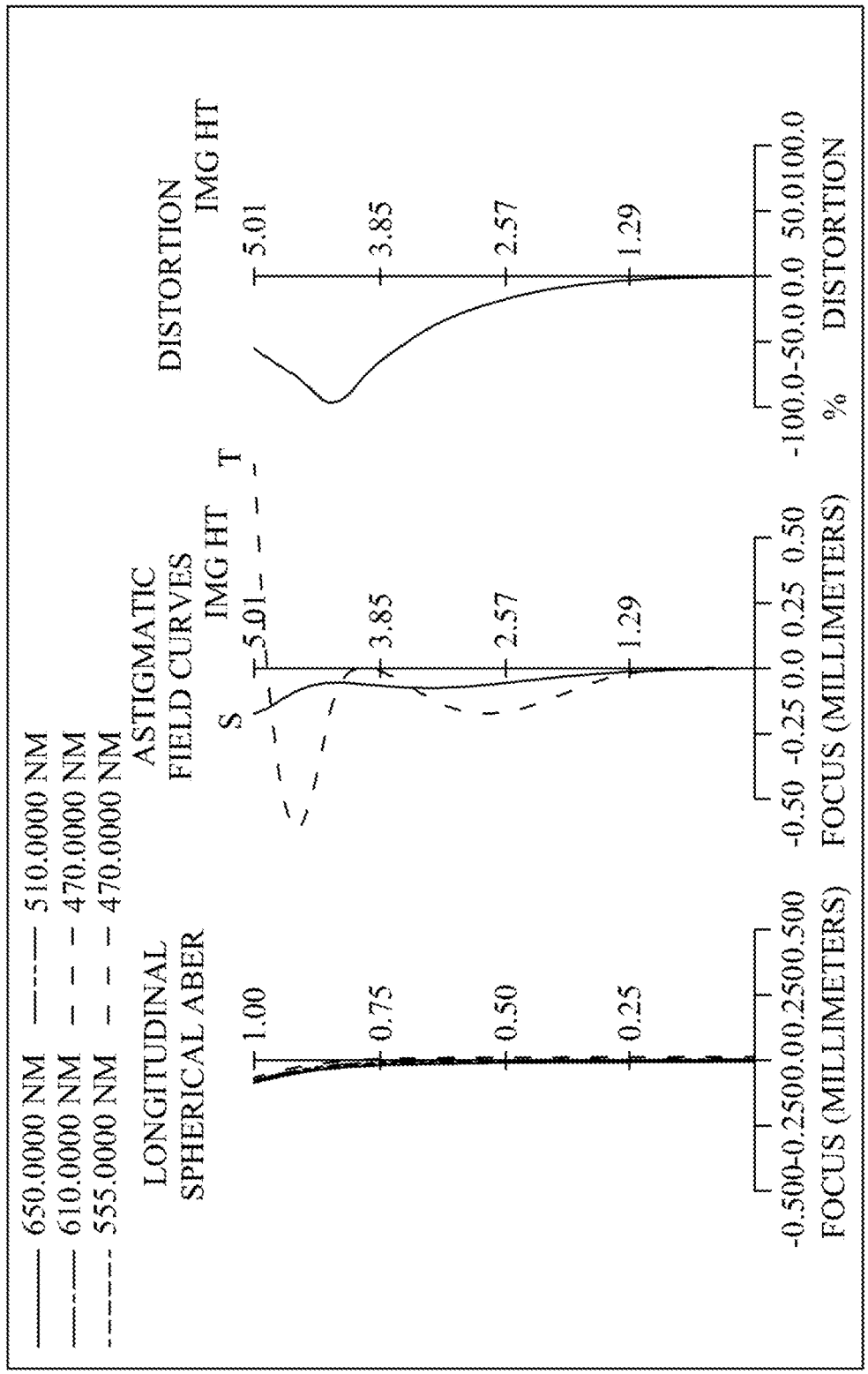
FIG. 2B shows the longitudinal spherical aberration curves, astigmatic field curves, and optical distortion curve of the optical image capturing system in the order from left to right according to the second embodiment of the present invention.
Figure 2C:
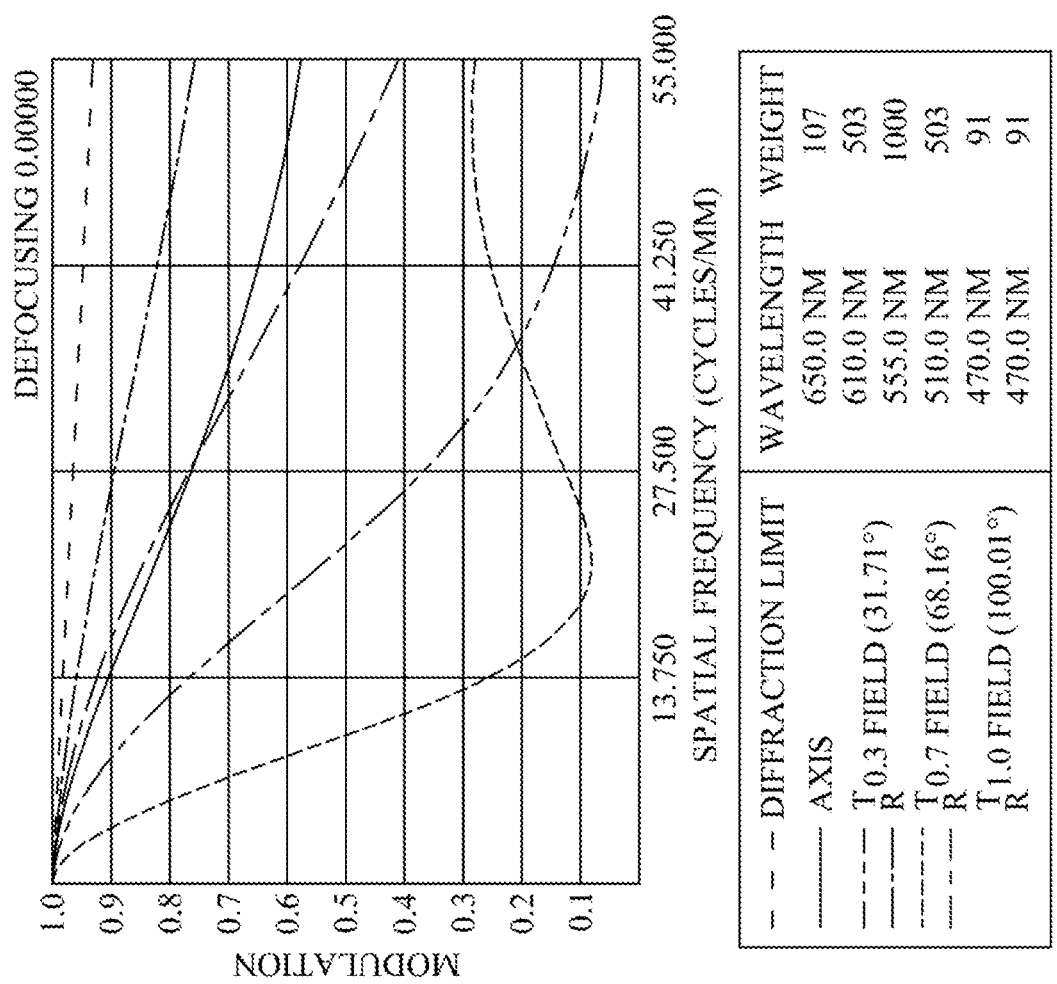
FIG. 2C is a characteristic diagram of modulation transfer of the visible light spectrum according to the second embodiment of the present invention.
Figure 2D:
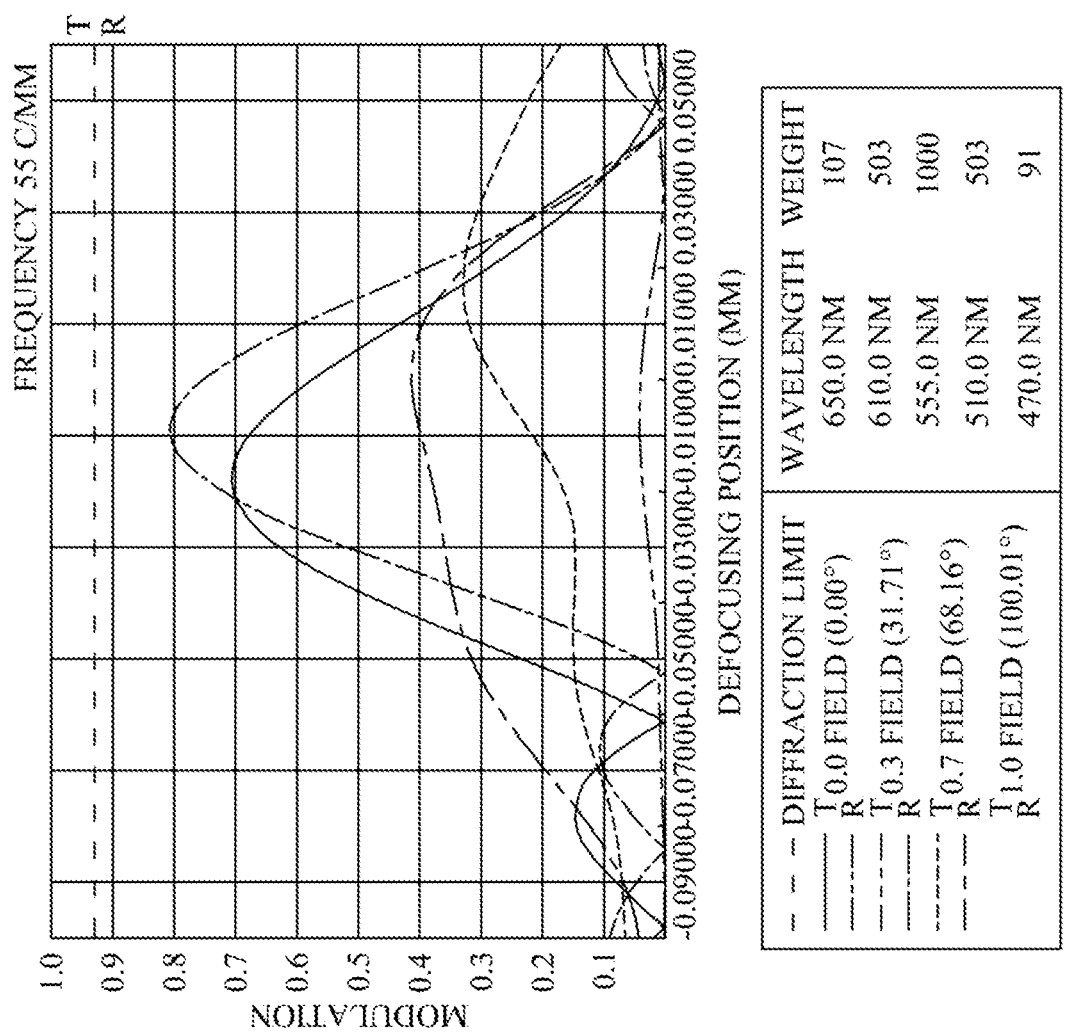
FIG. 2D is a diagram showing the through focus MTF values (Through Focus MTF) of the visible light spectrum at the central field of view, 0.3 field of view, and 0.7 field of view of the second embodiment of the present invention.
Figure 2E:
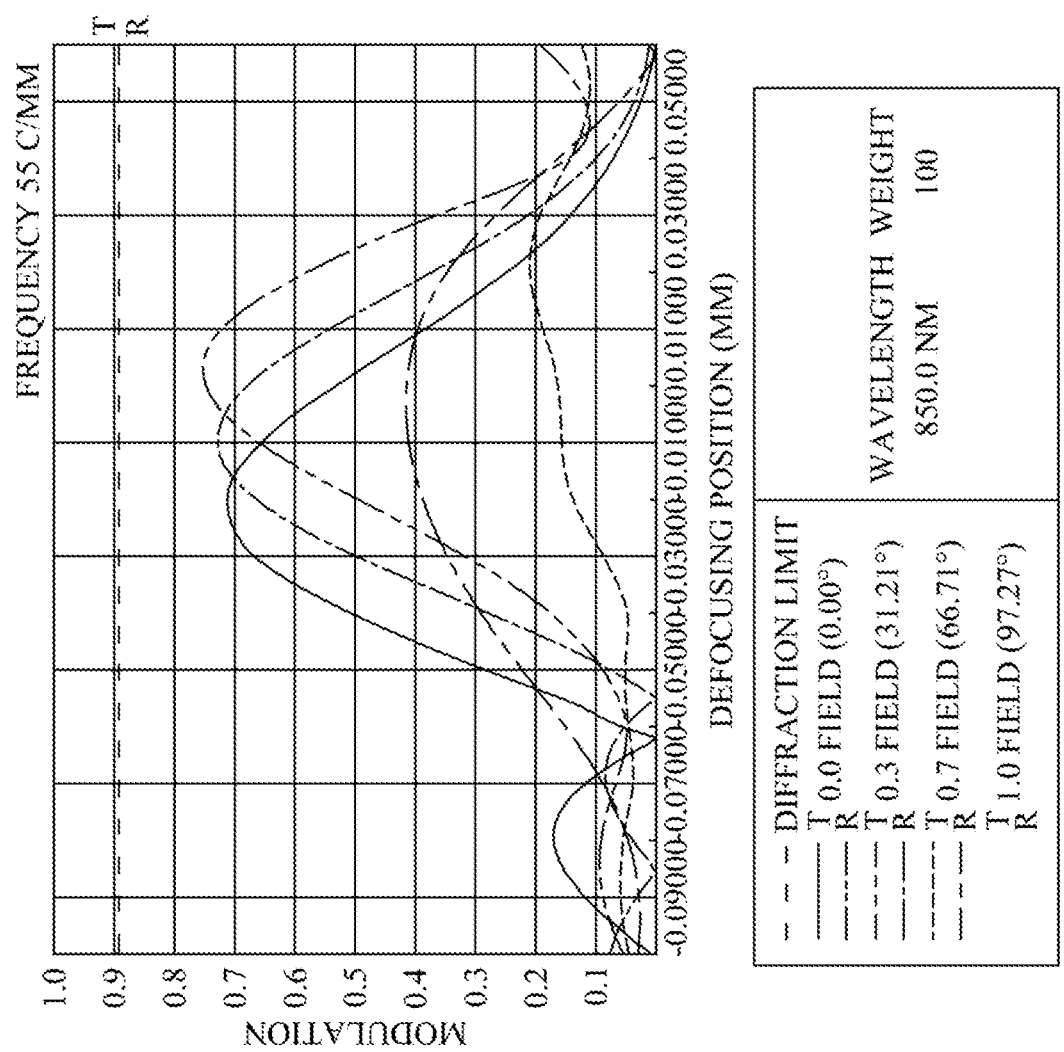
FIG. 2E is a diagram showing the through focus MTF values of the infrared light spectrum at the central field of view, 0.3 field of view, and 0.7 field of view of the second embodiment of the present invention.

Please refer to FIG. 2A and FIG. 2B. FIG. 2A is a schematic view of the optical image capturing system according to the second embodiment of the present invention. FIG. 2B shows the longitudinal spherical aberration curves, astigmatic field curves, and optical distortion curve of the optical image capturing system of the second embodiment, in the order from left to right. FIG. 2C is a characteristic diagram of modulation transfer of the visible light spectrum according to the second embodiment of the present invention. FIG. 2D is a diagram showing the through focus MTF values (Through Focus MTF) of the visible, light spectrum at the central field of view, 0.3 field of view, and 0.7 field of view of the second embodiment of the present invention. FIG. 2E is a diagram showing the through focus MTF values of the infrared light spectrum at the central field of view, 0.3 field of view, and 0.7 field of view of the second embodiment of the present invention.

As shown in FIG. 2A, in the order from the object side to the image side, the optical image capturing system includes a first lens 210, a second lens 220, an aperture 200, a third lens 230, a fourth lens 240, a fifth lens 250, a sixth lens 260, an IR-bandstop filter 280, a first image plane 290, a second image plane and an image sensing device 292. In the second embodiment of the present invention, the rays of any field of view can be further divided into sagittal ray and tangential my, and the spatial frequency of 55 cycles/mm serves as the benchmark for evaluating the focus shifts and the MTF values. The second embodiment of the present invention takes 850 nm as the infrared light wavelength.

The first lens 210 has negative refractive power and is made of glass. The object side 212 of the first lens 210 is a convex surface and the image side 214 of the first lens 210 is a concave surface, and the object side 212 and the image side 214 of the first lens 210 are both aspheric.

The second lens 220 has positive refractive power and is made of glass. The object side 222 of the second lens 220 is a concave surface and the image side 224 of the second lens 220 is a convex surface, and the object side 222 and the image side 224 of the second lens 220 are both aspheric. And the object side 222 and the image side 224 of the second lens 220 both have one inflection point.

The third lens 230 has positive refractive power and is made of glass. The object side 232 of the third lens 230 is a concave surface and the image side 234 of the third lens 230 is a convex surface, and the object side 232 and an image side 234 of the third lens 230 are both aspheric. The object side 232 of the third lens 230 each has one inflection point.

The fourth lens 240 has positive refractive power and is made of glass. The object side 242 of the fourth lens 240 is a concave surface and the image side 244 of the fourth lens 240 is a convex surface, and the object side 242 and the image side 244 of the fourth lens 240 are both aspheric. The object side 242 of the fourth lens 240 has one inflection point.

The fifth lens 250 has positive refractive power and is made of glass. The object side 252 of the fifth lens 250 is a convex surface and the image side 254 of the fifth lens 250 is a convex surface, and the object side 252 and the image side 254 of the fifth lens 250 are both aspheric. The object side 252 of the fifth lens 250 has one inflection point. The image side 254 of the fifth lens 250 has two inflection points.

The sixth lens 260 has negative refractive power and is made of glass. The object side 262 of the sixth lens 260 is a convex surface and the image side 264 of the sixth lens 260 is a concave surface, and the object side 262 and an image side 264 of the sixth lens 260 are both aspheric. And the image side 264 and the object side 262 of the sixth lens 260 all have one inflection point. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 280 is made of glass and is disposed between the sixth lens 260 and the first image plane 290. The IR-bandstop filter 280 does not affect the focal length of the optical image capturing system.

Table 3 and Table 4 below should be incorporated into the reference of the present embodiment

TABLE 3

Lens Parameters for the Second Embodiment
f(focal length) = 2.530 mm; f/HEP = 1.8; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 128.3992126 | 5.031 | Glass | 2.001 | 29.13 | −5.82118 |
| 2 | | 5.496816331 | 4.365 | | | | |
| 3 | Second Lens | −90.56838621 | 8.000 | Glass | 2.002 | 19.32 | 434.857 |
| 4 | | −78.43219208 | 0.367 | | | | |
| 5 | Aperture | 1E+18 | 0.252 | | | | |
| 6 | Third Lens | −148.6875885 | 3.224 | Glass | 1.497 | 81.56 | 8.15151 |
| 7 | | −3.981801275 | 0.200 | | | | |
| 8 | Fourth Lens | −198.1229131 | 3.515 | Glass | 1.497 | 81.56 | 20.8239 |
| 9 | | −9.91686171 | 0.200 | | | | |
| 10 | Fifth Lens | 46.02872933 | 3.038 | Glass | 1.497 | 81.56 | 9.10834 |
| 11 | | −4.923844385 | 0.200 | | | | |
| 12 | Sixth Lens | 31.97529834 | 2.266 | Glass | 2.002 | 19.32 | −7.15458 |
| 13 | | 5.688582611 | 0.759 | | | | |
| 14 | IR-bandstop Filter | 1E+18 | 1.000 | BK_7 | 1.517 | 64.13 | |
| 15 | | 1E+18 | 0.999 | | | | |
| 16 | First Image Plane | 1E+18 | 0.000 | | | | |

Reference Wavelength = 555 nm; Shield Position: The 10th surface with effective aperture radius = 4.244 mm

TABLE 4

The Aspheric Coefficients of the Second Embodiment
Table 4: Aspheric Coefficients

| Surface No | 1 | 2 | 3 | 4 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 4.554632E−05 | −1.116511E−03 | −3.281717E−04 | 1.013007E−03 | −2.319147E−03 | 2.551578E−03 | 5.494284E−04 |
| A6 | 0.000000E+00 | 0.000000E+00 | 7.431375E−06 | 3.569700E−05 | −2.312258E−05 | −3.432703E−06 | −4.447697E−06 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| A4 | −2.215066E−03 | 2.071182E−03 | 7.920742E−03 | −2.865030E−03 | −2.215066E−03 |
| A6 | 4.178355E−05 | −5.813936E−05 | −1.125644E−04 | 6.567843E−06 | 4.178355E−05 |
| A8 | 0.000000E+00 | 0.000000E+00 | 0.000000E+00 | −5.897881E−09 | 0.000000E+00 |
| A10 | 0.000000E+00 | 0.000000E+00 | 0.000000E+00 | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditions can be obtained from the data in Table 3 and Table 4.

| Second Embodiment (Primary Reference Wavelength = 555 nm) | | | | | |
|---|---|---|---|---|---|
| MTFE0 | | MTFE3 | | MTFE7 | |
| 0.58 | | 0.06 | | 0.28 | |
| ETP1 | ETP2 | ETP3 | ETP4 | ETP5 | ETP6 |
| 5.073 | 8.000 | 3.165 | 3.491 | 2.983 | 2.301 |
| ETP1/TP1 | ETP2/TP2 | ETP3/TP3 | ETP4/TP4 | ETP5/TP5 | ETP6/TP6 |
| 1.009 | 1.000 | 0.982 | 0.993 | 0.982 | 1.016 |
| ETL | EBL | EIN | EIR | PIR | EIN/ETL |
| 33.413 | 2.715 | 30.698 | 0.716 | 0.759 | 0.919 |
| SETP/EIN | EIR/PIR | SETP | STP | SETP/STP | BL |
| 0.815 | 0.944 | 25.014 | 25.074 | 0.998 | 2.757 |
| ED12 | ED23 | ED34 | ED45 | ED56 | EBL/BL |
| 4.317 | 0.619 | 0.261 | 0.231 | 0.256 | 1.0155 |
| SED | SIN | SED/SIN | ED12/ED23 | ED23/ED34 | ED34/ED45 |
| 5.685 | 5.584 | 1.018 | 6.970 | 2.375 | 1.127 |
| ED12/IN12 | ED23/IN23 | ED34/IN34 | ED45/IN45 | ED56/IN56 | ED45/ED56 |
| 0.989 | 1.001 | 1.304 | 1.157 | 1.278 | 0.905 |
| \| f/f1 \| | \| f/f2 \| | \| f/f3 \| | \| f/f4 \| | \| f/f5 \| | \| f/f6 \| |
| 0.43455 | 0.00582 | 0.31032 | 0.12148 | 0.27772 | 0.35356 |
| ΣPPR | ΣNPR | ΣPPR/\|ΣNPR\| | IN12/f | IN56/f | TP4/(IN34 + TP4 + IN45) |
| 0.78536 | 0.71809 | 1.09368 | 1.72562 | 0.07906 | 0.89784 |
| \| f1/f2 \| | \| f2/f3 \| | (TP1 + IN12)/TP2 | | (TP6 + IN56)/TP5 | |
| 0.01339 | 53.34680 | 1.17446 | | 0.81174 | |
| HOS | InTL | HOS/HOI | InS/HOS | ODT % | TDT % |
| 33.41460 | 30.65750 | 6.68292 | 0.46842 | −134.90400 | 108.07900 |
| HVT51 | HVT52 | HVT61 | HVT62 | HVT62/HOI | HVT62/HOS |
| 0 | 0 | 1.66090 | 3.58499 | 0.71700 | 0.10729 |
| TP2/TP3 | TP3/TP4 | InRS61 | InRS62 | \| InRS61 \|/TP6 | \| InRS62 \|/TP6 |
| 2.48116 | 0.91719 | −0.46140 | 0.31416 | 0.20364 | 0.13865 |
| VSFS0 | VSFS3 | VSFS7 | VTFS0 | VTFS3 | VTFS7 |
| −0.020 | −0.010 | −0.000 | −0.020 | −0.010 | 0.015 |
| VSMTF0 | VSMTF3 | VSMTF7 | VTMTF0 | VTMTF3 | VTMTF7 |
| 0.704 | 0.805 | 0.413 | 0.704 | 0.042 | 0.328 |
| ISFS0 | ISFS3 | ISFS7 | ITFS0 | ITFS3 | ITFS7 |
| −0.020 | −0.010 | −0.005 | −0.020 | 0.005 | 0.020 |
| ISMTF0 | ISMTF3 | ISMTF7 | ITMTF0 | ITMTF3 | ITMTF7 |

-continued

| Second Embodiment (Primary Reference Wavelength = 555 nm) | | | | | |
|---|---|---|---|---|---|
| 0.712 | 0.728 | 0.416 | 0.712 | 0.751 | 0.211 |

| FS | AIFS | AVFS | AFS |
|---|---|---|---|
| 0.000 | −0.005 | −0.008 | 0.003 |

The following values for the conditional expressions can be obtained from the data in Table 3 and Table 4.

| Values Related to Inflection Point of Second Embodiment (Primary Reference Wavelength = 555 nm) | | | | | | | |
|---|---|---|---|---|---|---|---|
| HIF211 | 4.4871 | HIF211/HOI | 0.8974 | SGI211 | −0.1836 | \| SGI211 \|/(\| SGI211 \| + TP2) | 0.0224 |
| HIF221 | 0.9832 | HIF221/HOI | 0.1966 | SGI221 | −0.0052 | \| SGI221 \|/(\| SGI221 \| + TP2) | 0.0006 |
| HIF411 | 0.8818 | HIF411/HOI | 0.1764 | SGI411 | −0.0016 | \| SGI411 \|/(\| SGI411 \| + TP4) | 0.0005 |
| HIF511 | 3.8839 | HIF511/HOI | 0.7768 | SGI511 | 0.4359 | \| SGI511 \|/(\| SGI511 \| + TP5) | 0.1255 |
| HIF521 | 1.6958 | HIF521/HOI | 0.3392 | SGI521 | −0.2384 | \| SGI521 \|/(\| SGI521 \| + TP5) | 0.0728 |
| HIF522 | 3.6424 | HIF522/HOI | 0.7285 | SGI522 | −0.4794 | \| SGI522 \|/(\| SGI522 \| + TP5) | 0.1363 |
| HIF611 | 0.9570 | HIF611/HOI | 0.1914 | SGI611 | 0.0119 | \| SGI611 \|/(\| SGI611 \| + TP6) | 0.0052 |
| HIF621 | 2.0648 | HIF621/HOI | 0.4130 | SGI621 | 0.3128 | \| SGI621 \|/(\| SGI621 \| + TP6) | 0.1213 |

Third Embodiment

Figure 3A:
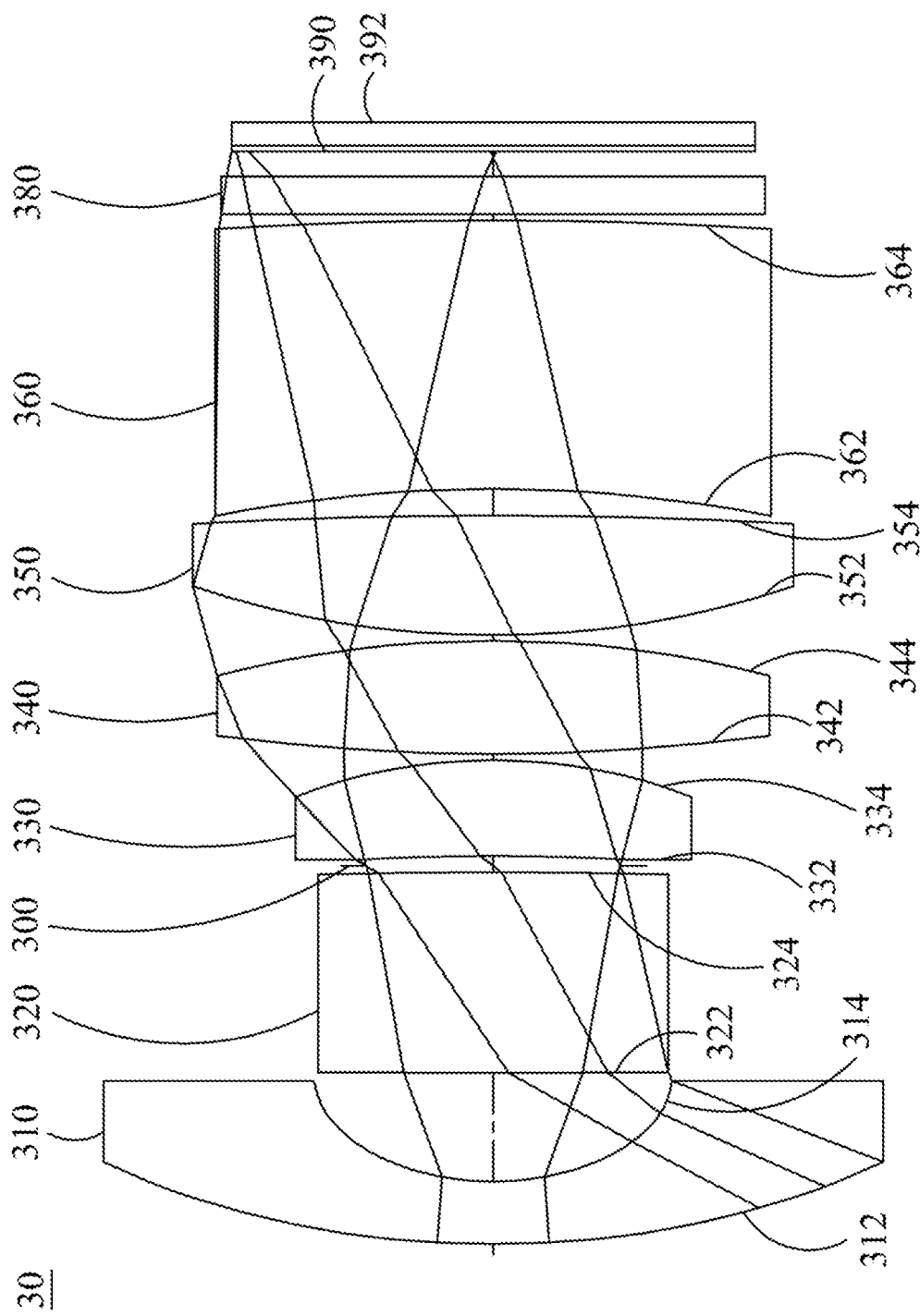
FIG. 3A is a schematic view of the optical image capturing system according to the third embodiment of the present invention.
Figure 3B:
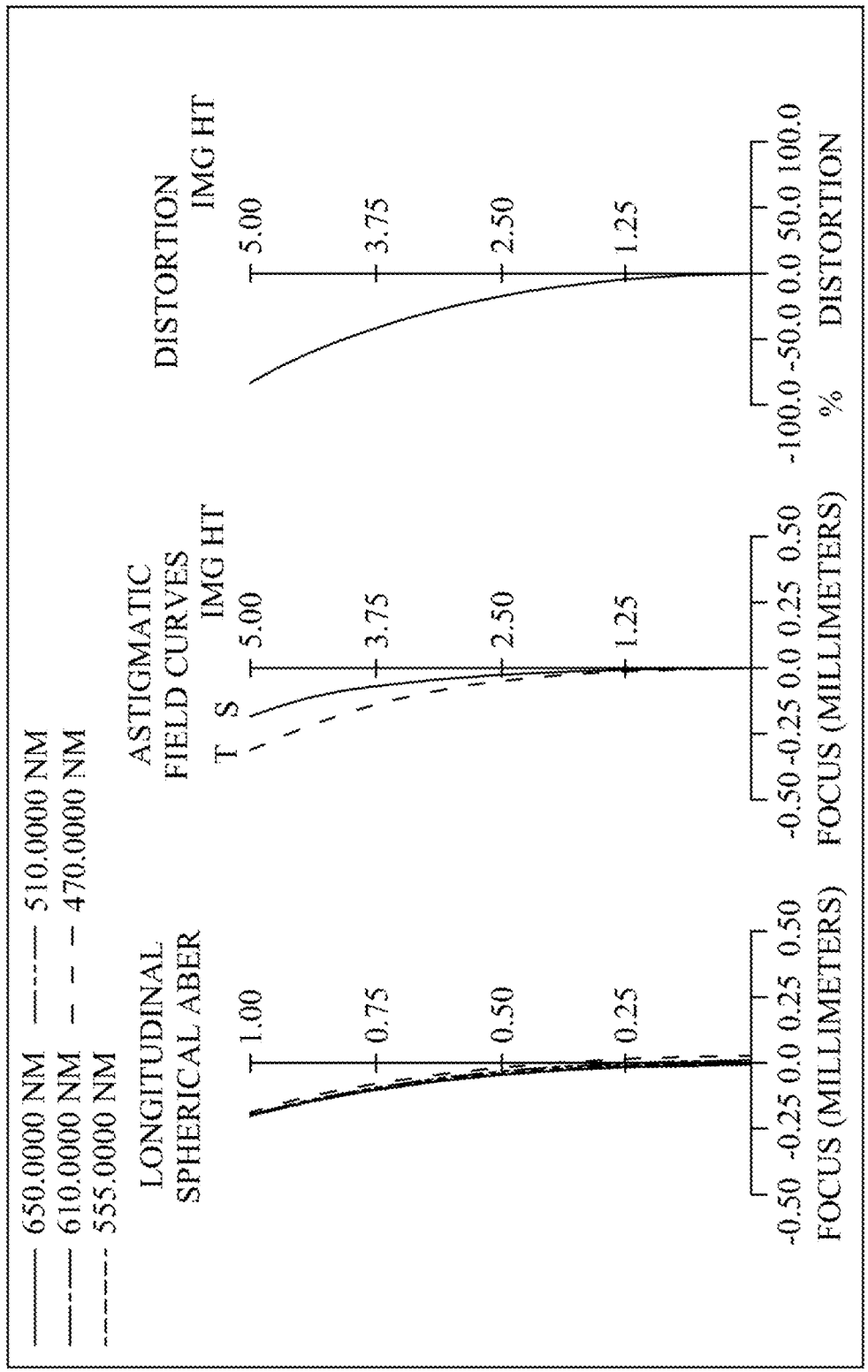
FIG. 3B shows the longitudinal spherical aberration curves, astigmatic field curves, and optical distortion curve of the optical image capturing system in the order from left to right according to the third embodiment of the present invention.
Figure 3C:
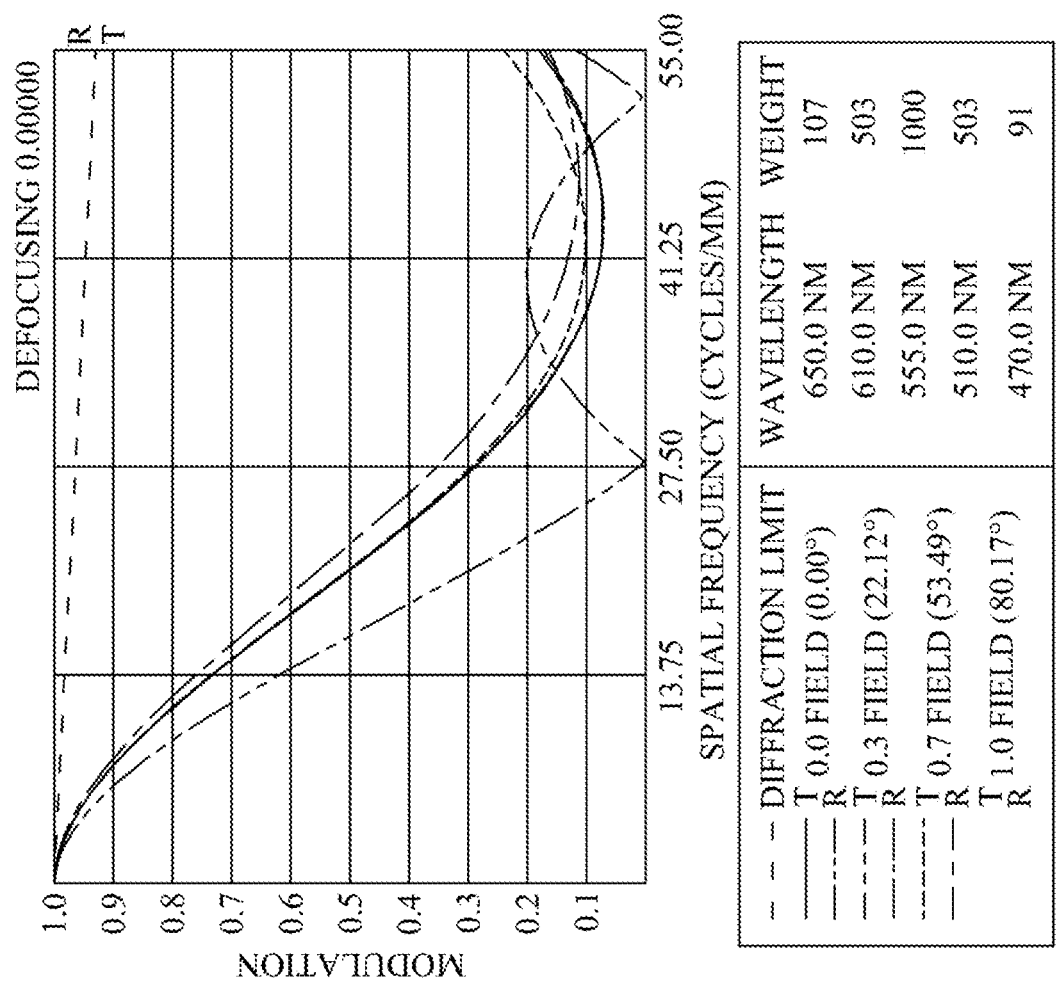
FIG. 3C is a characteristic diagram of modulation transfer of the visible light spectrum according to the third embodiment of the present invention.
Figure 3D:
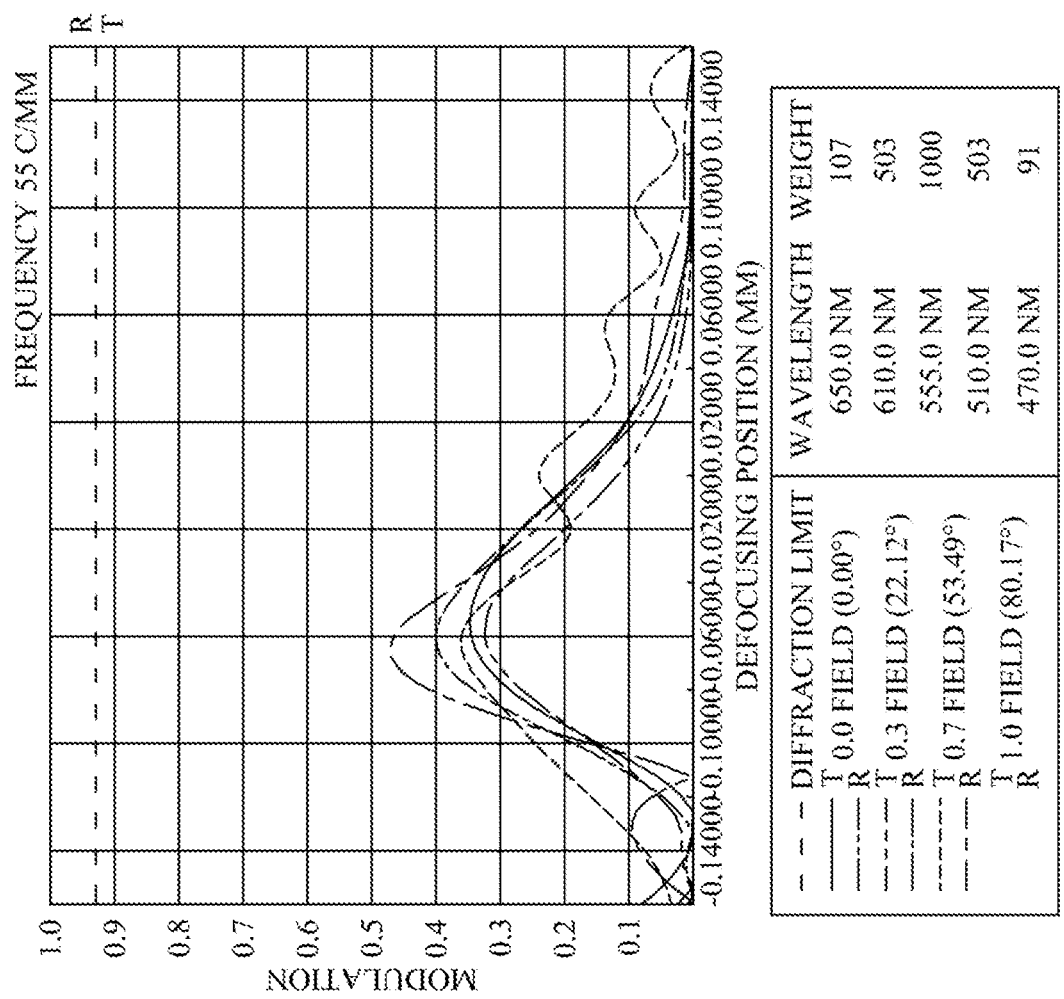
FIG. 3D is a diagram showing the through focus MTF values (Through Focus MTF) of the visible light spectrum at the central field of view, 0.3 field of view, and 0.7 field of view of the third embodiment of the present invention.
Figure 3E:
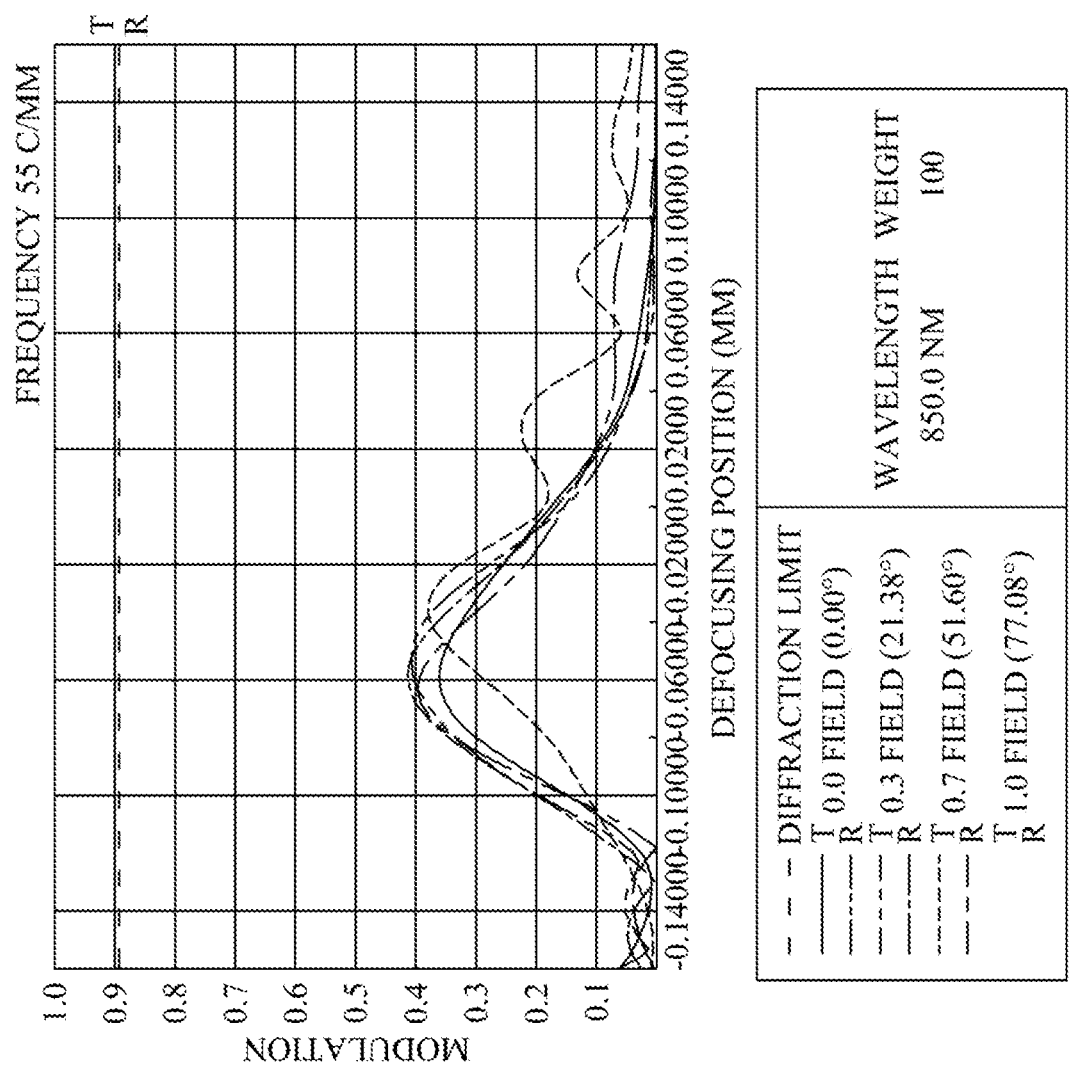
FIG. 3E is a diagram showing the through focus MTF values of the infrared light spectrum at the central field of view, 0.3 field of view, and 0.7 field of view of the third embodiment of the present invention.

Please refer to FIG. 3A and FIG. 3B. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C is a characteristic diagram of modulation transfer of the visible light spectrum according to the third embodiment of the present invention. FIG. 3D is a diagram showing the through focus MTF values (Through Focus MTF) of the visible light spectrum at the central field of view, 0.3 field of view, and 0.7 field of view of the third embodiment of the present invention. FIG. 3E is a diagram showing the through focus MTF values of the infrared light spectrum at the central field of view, 0.3 field of view, and 0.7 field of view of the third embodiment of the present invention.

As shown in FIG. 3A, in the order from the object side to the image side, the optical image capturing system includes a first lens 310, a second lens 320, an aperture 300, a third lens 330, a fourth lens 340, a fifth lens 350, a sixth lens 360, an IR-bandstop filter 380, a first image plane 390, a second image plane and an image sensing device 392. In the third embodiment of the present invention, the rays of any field of view can be further divided into sagittal ray and tangential ray, and the spatial frequency of 55 cycles/mm serves as the benchmark for evaluating the focus shifts and the MTF values. The third embodiment of the present invention takes 850 nm as the infrared light wavelength.

The first lens 310 has negative refractive power and is made of glass. The object side 312 of the first lens 310 is a convex surface and the image side 314 of the first lens 310 is a concave surface, and the object side 312 and the image side 314 of the first lens 310 are both spherical.

The second lens 320 has positive refractive power and is made of glass. The object side 322 of the second lens 320 is a convex surface and the image side 324 of the second lens 320 is a convex surface, and the object side 322 and the image side 324 of the second lens 320 are both spherical.

The third lens 330 has positive refractive power and is made of glass. The object side 332 of the third lens 330 is a concave surface and the image side 334 of the third lens 330 is a convex surface, and the object side 332 and the image side 334 of the third lens 330 are both spherical.

The fourth lens 340 has positive refractive power and is made of glass. The object side 342 of the fourth lens 340 is a convex surface and the image side 344 of the fourth lens 340 is a convex surface, and the object side 342 and the image side 344 of the fourth lens 340 are both spherical.

The fifth lens 350 has positive refractive power and is made of glass. The object side 352 of the fifth lens 350 is a convex surface and the image side 354 of the fifth lens 350 is a convex surface, and the object side 352 and the image side 354 of the fifth lens 350 are both spherical.

The sixth lens 360 has negative refractive power and is made of glass. The object side 362 of the sixth lens 360 is a concave surface and the image side 364 of the sixth lens 360 is a convex surface, and the object side 362 and the image side 364 of the sixth lens 360 are both spherical. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 380 is made of glass and is disposed between the sixth lens 360 and the first image plane 390, without affecting the focal length of the optical image capturing system.

Table 5 and Table 6 below should be incorporated into the reference of the present embodiment.

TABLE 5

Lens Parameters for the Third Embodiment
f(focal length) = 3.97731 mm; f/HEP = 1.8; HAF(half angle of view) = 80 deg

| Surface No | | Curavature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 12.18357163 | 2.000 | Glass | 2.002 | 19.32 | −5.82118 |
| 2 | | 3.484707507 | 3.494 | | | | |
| 3 | Second Lens | 708.6396095 | 6.421 | Glass | 2.002 | 19.32 | 434.857 |
| 4 | | −85.99235034 | 0.200 | | | | |
| 5 | Aperture | 1E+18 | 0.316 | | | | |
| 6 | Third Lens | −30.86236047 | 3.070 | Glass | 1.497 | 81.56 | 8.15151 |
| 7 | | −6.871888888 | 0.200 | | | | |
| 8 | Fourth Lens | 24.4653824 | 3.623 | Glass | 1.497 | 81.56 | 20.8239 |
| 9 | | −13.47371476 | 0.200 | | | | |
| 10 | Fifth Lens | 11.67742237 | 3.812 | Glass | 1.806 | 33.27 | 9.10834 |
| 11 | | −67.22912907 | 0.855 | | | | |
| 12 | Sixth Lens | −17.27056372 | 8.610 | Glass | 2.002 | 19.32 | −7.15458 |
| 13 | | −50.79940648 | 0.200 | | | | |
| 14 | IR-bandstop Filter | 1E+18 | 1.200 | BK_7 | 1.517 | 64.13 | |
| 15 | | 1E+18 | 0.803 | | | | |
| 16 | First Image Plane | 1E+18 | −0.001 | | | | |

Reference Wavelength = 555 nm; the third embodiment doesn't have any shield position.

TABLE 6

The Aspheric Coefficients of the Third Embodiment
Table 6: Aspheric Coefficients

| Surface No | 1 | 2 | 3 | 4 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | |
|---|---|---|
| MTFE0 | MTFE3 | MTFE7 |
| 0.18 | 0.12 | 0.23 |

-continued

| Third Embodiment (Primary Reference Wavelength = 555 nm) | | | | | |
|---|---|---|---|---|---|
| ETP1 | ETP2 | ETP3 | ETP4 | ETP5 | ETP6 |
| 2.134 | 6.413 | 2.998 | 3.551 | 3.748 | 8.634 |
| ETP1/TP1 | ETP2/TP2 | ETP3/TP3 | ETP4/TP4 | ETP5/TP5 | ETP6/TP6 |
| 1.067 | 0.999 | 0.977 | 0.980 | 0.983 | 1.003 |
| ETL | EBL | EIN | EIR | PIR | EIN/ETL |
| 34.951 | 2.214 | 32.737 | 0.212 | 0.200 | 0.937 |
| SETP/EIN | EIR/PIR | SETP | STP | SETP/STP | BL |
| 0.839 | 1.062 | 27.478 | 27.536 | 0.998 | 2.201 |
| ED12 | ED23 | ED34 | ED45 | ED56 | EBL/BL |
| 3.309 | 0.503 | 0.318 | 0.301 | 0.828 | 0.9941 |
| SED | SIN | SED/SIN | ED12/ED23 | ED23/ED34 | ED34/ED45 |
| 5.259 | 5.265 | 0.999 | 6.577 | 1.580 | 1.057 |
| ED12/IN12 | ED23/IN23 | ED34/IN34 | ED45/IN45 | ED56/IN56 | ED45/ED56 |
| 0.947 | 0.975 | 1.592 | 1.506 | 0.968 | 0.364 |
| \| f/f1 \| | \| f/f2 \| | \| f/f3 \| | \| f/f4 \| | \| f/f5 \| | \| f/f6 \| |
| 0.71328 | 0.05105 | 0.23230 | 0.21957 | 0.31278 | 0.13104 |
| ΣPPR | ΣNPR | ΣPPR/\|ΣNPR\| | IN12/f | IN56/f | TP4/(IN34 + TP4 + IN45) |
| 0.45187 | 1.12766 | 0.40071 | 0.87850 | 0.21496 | 0.90058 |
| \| f1/f2 \| | \| f2/f3 \| | (TP1 + IN12)/TP2 | | (TP6 + IN56)/TP5 | |
| 0.07157 | 4.55064 | 0.85564 | | 2.48292 | |
| HOS | InTL | HOS/HOI | InS/HOS | ODT % | TDT % |
| 35.00270 | 32.80130 | 7.00054 | 0.65388 | −74.81920 | 51.42000 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \| InRS61 \|/TP6 | \| InRS62 \|/TP6 |
| 2.09149 | 0.84729 | −0.86978 | −0.28126 | 0.10102 | 0.03267 |
| VSFS0 | VSFS3 | VSFS7 | VTFS0 | VTFS3 | VTFS7 |
| −0.055 | −0.060 | −0.065 | −0.055 | −0.060 | −0.060 |
| VSMTF0 | VSMTF3 | VSMTF7 | VTMTF0 | VTMTF3 | VTMTF7 |
| 0.347 | 0.401 | 0.473 | 0.347 | 0.324 | 0.361 |
| ISFS0 | ISFS3 | ISFS7 | ITFS0 | ITFS3 | ITFS7 |
| −0.055 | −0.060 | −0.065 | −0.060 | −0.055 | −0.035 |
| ISMTF0 | ISMTF3 | ISMTF7 | ITMTF0 | ITMTF3 | ITMTF7 |
| 0.361 | 0.414 | 0.397 | 0.361 | 0.407 | 0.380 |
| FS | AIFS | | AVFS | | AFS |
| 0.000 | −0.056 | | −0.059 | | 0.003 |

Values Related to Inflection Point of Third Embodiment
(Primary Reference Wavelength = 555 nm)

| HIF311 | 0 | HIF311/HOI | 0 | SGI311 | 0 | \| SGI311 \|/(\| SGI311 \| + TP3) | 0 |

Fourth Embodiment

Figure 4A:
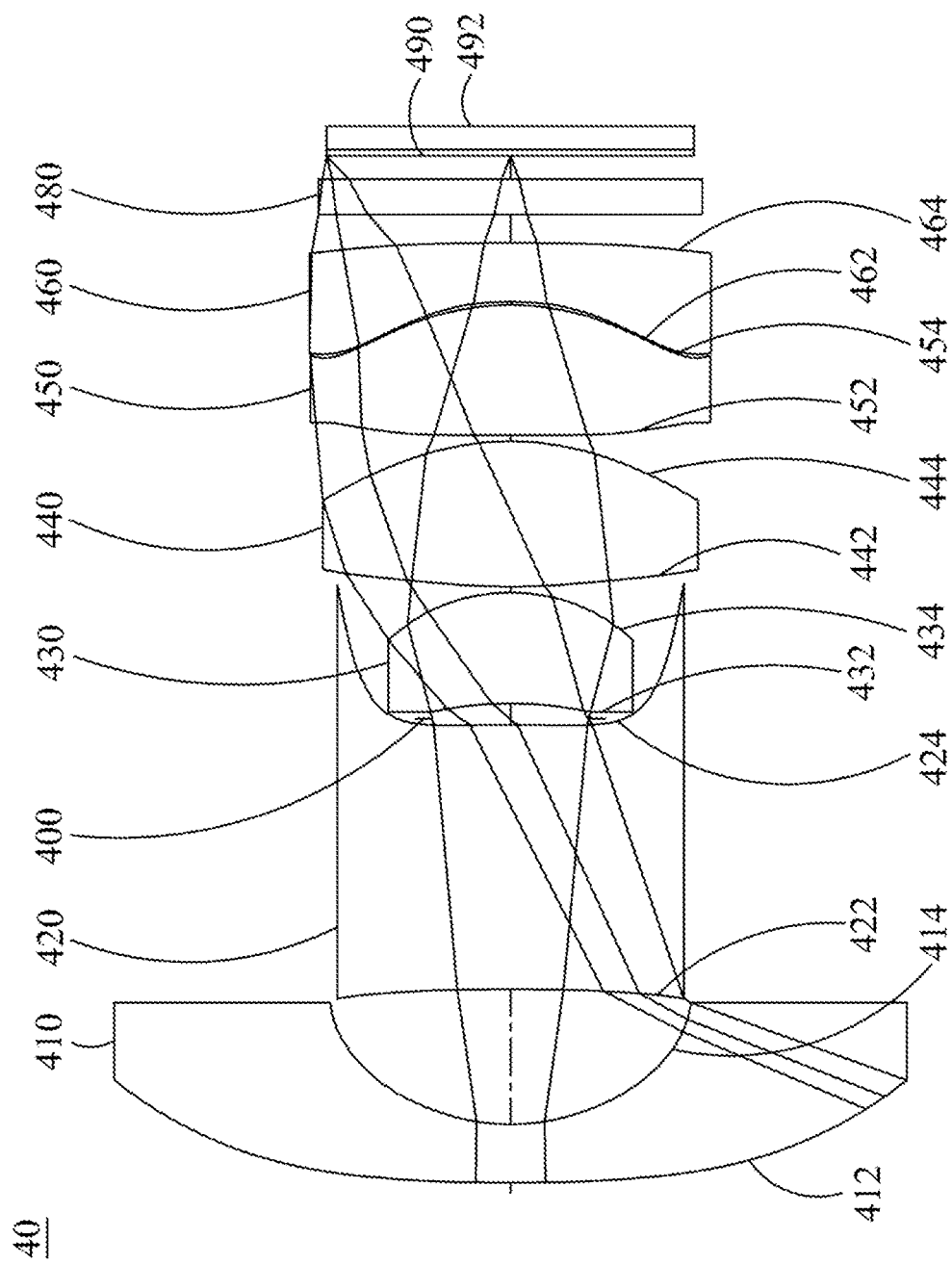
FIG. 4A is a schematic view of the optical image capturing system according to the fourth embodiment of the present invention.
Figure 4B:
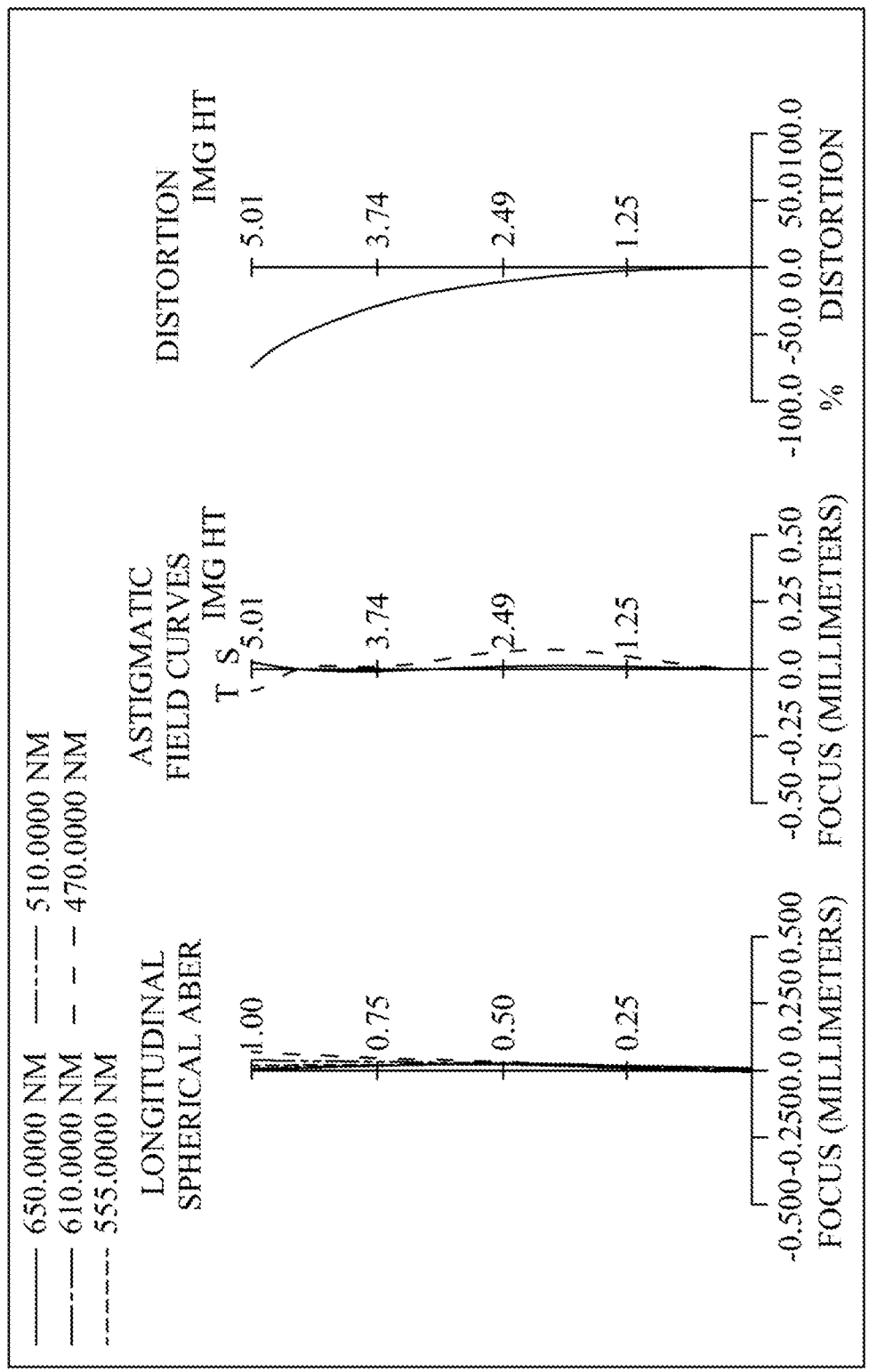
FIG. 4B shows the longitudinal spherical aberration curves, astigmatic field curves, and optical distortion curve of the optical image capturing system in the order from left to right according to the fourth embodiment of the present invention.
Figure 4C:
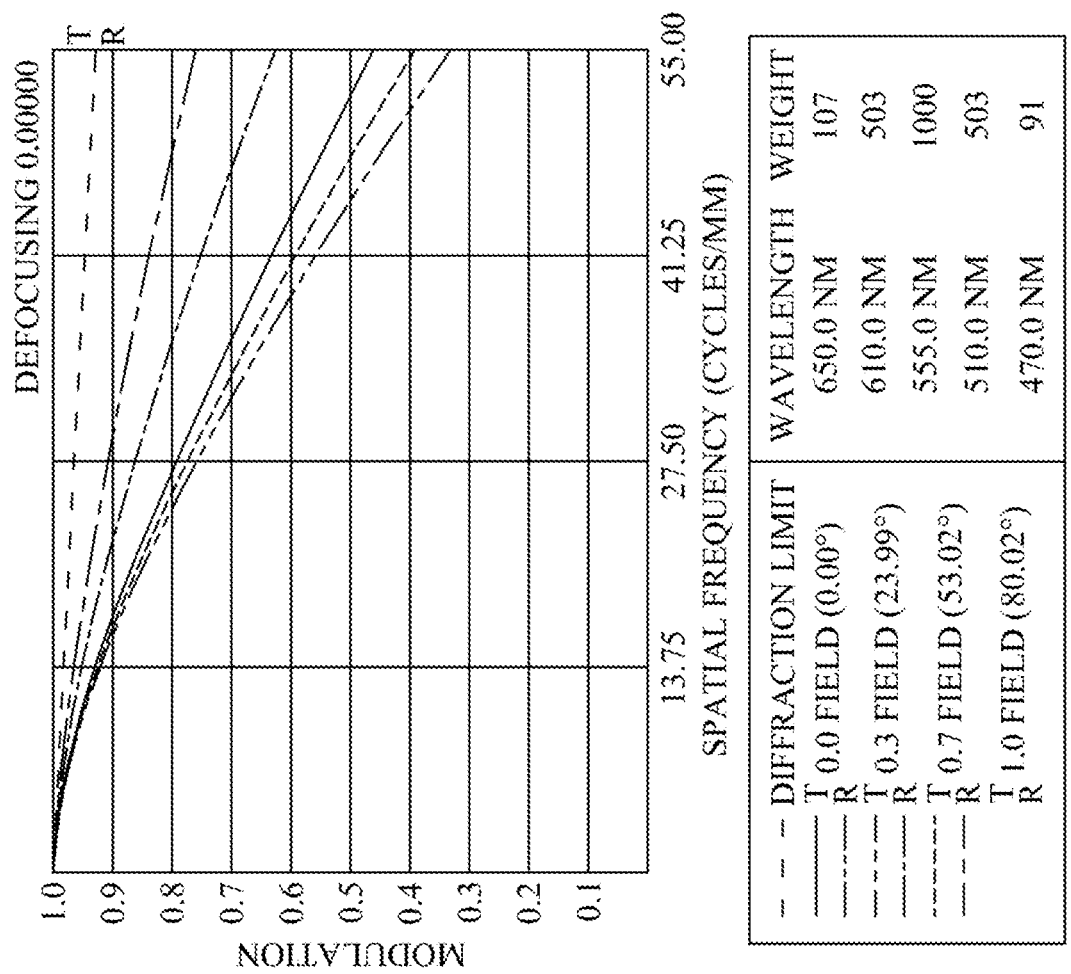
FIG. 4C is a characteristic diagram of modulation transfer of the visible light spectrum according to the fourth embodiment of the present invention.
Figure 4D:
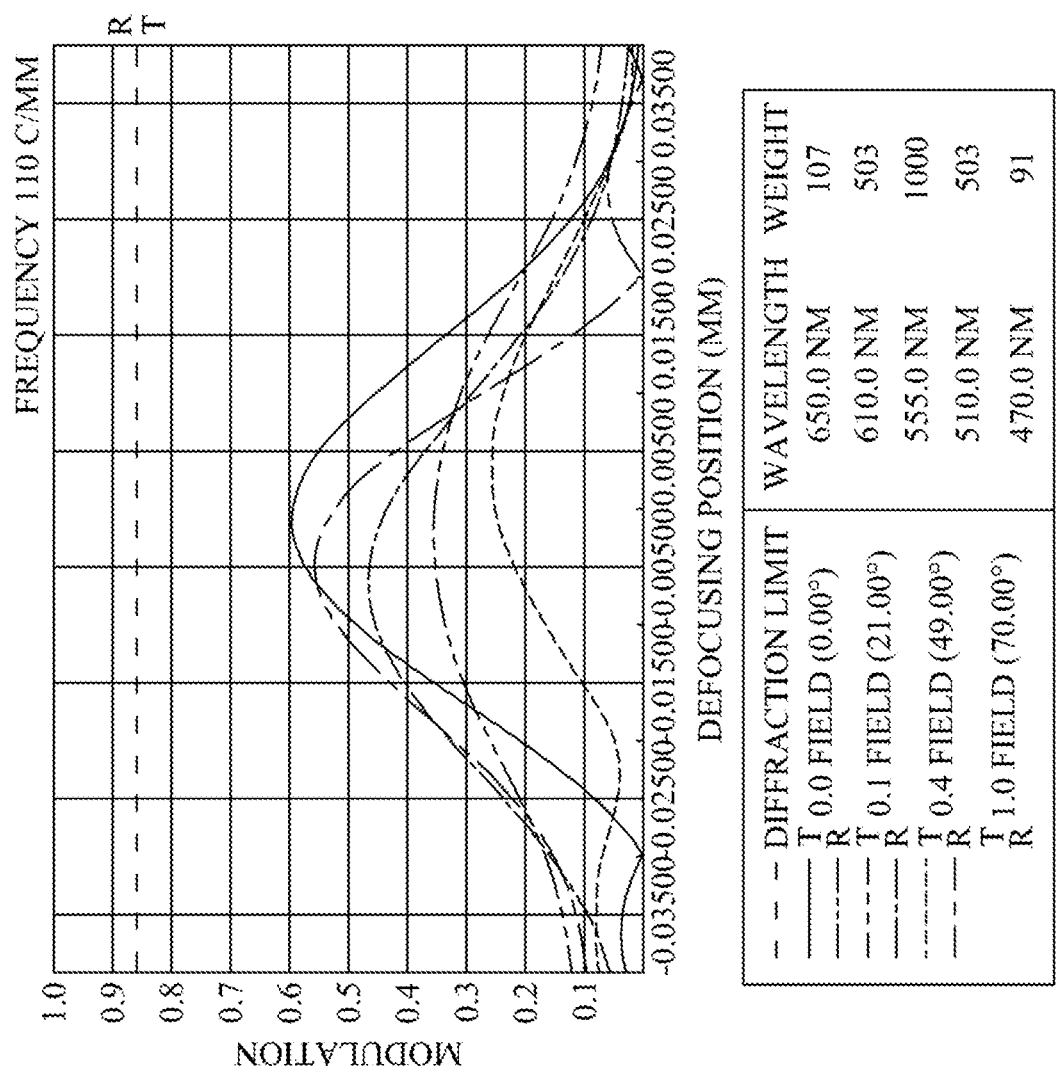
FIG. 4D is a diagram showing the through focus MTF values (Through Focus MTF) of the visible light spectrum at the central field of view, 0.3 field of view, and 0.7 field of view of the fourth embodiment of the present invention.
Figure 4E:
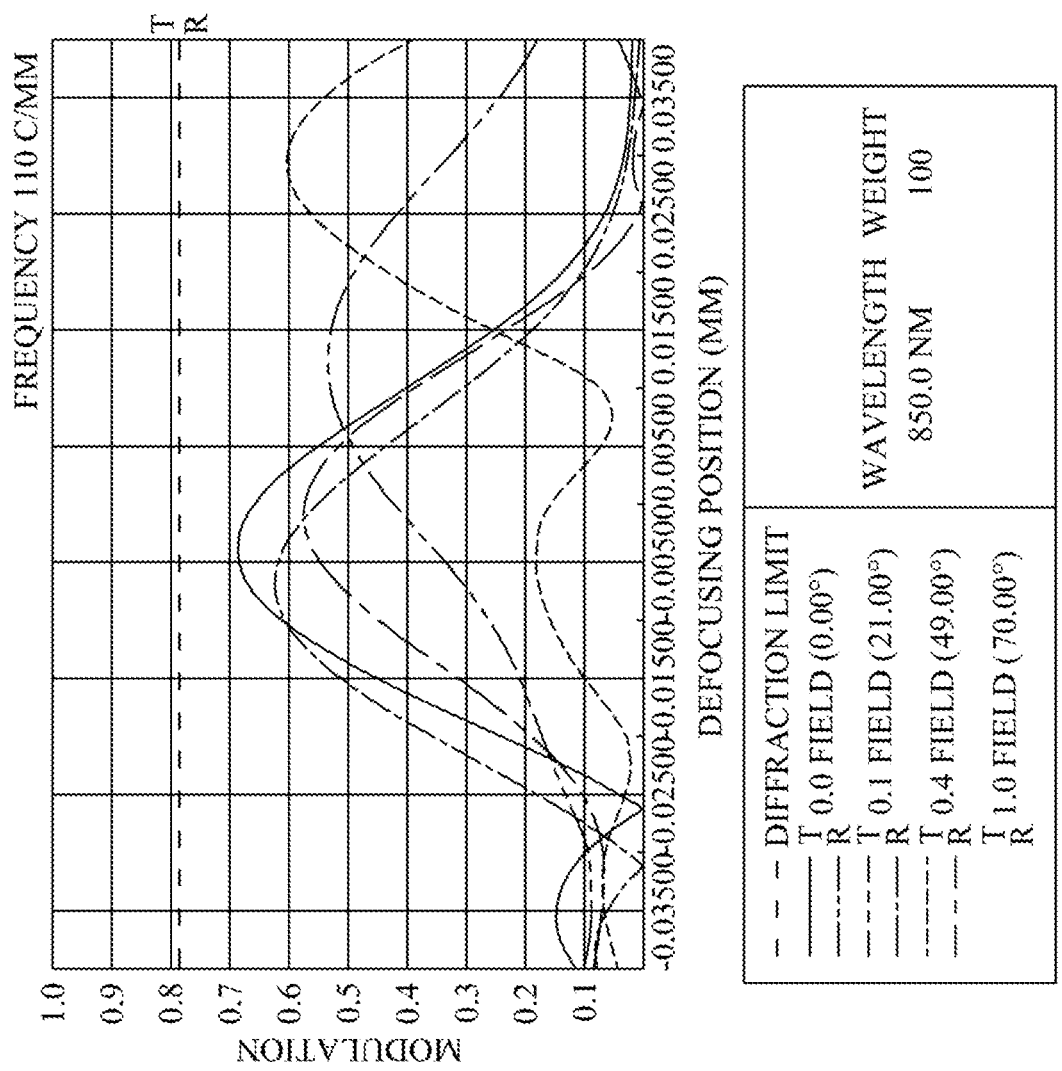
FIG. 4E is a diagram showing the through focus MTF values of the infrared light spectrum at the central field of view, 0.3 field of view, and 0.7 field of view of the fourth embodiment of the present invention.

Please refer to FIG. 4A and FIG. 4B. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C is a characteristic diagram of modulation transfer of the visible light spectrum according to the fourth embodiment of the present invention. FIG. 4D is a diagram showing the through focus MTF values (Through Focus MTF) of the visible light spectrum at the central field of view, 0.3 field of view, and 0.7 field of view of the fourth embodiment of the present invention. FIG. 4E is a diagram showing the through focus MTF values of the infrared light spectrum at the central field of view, 0.3 field of view, and 0.7 field of view of the fourth embodiment of the present invention.

As shown in FIG. 4A, in the order from the object side to the image side, the optical image capturing system includes a first lens 410, a second lens 420, an aperture 400, a third lens 430, a fourth lens 440, a fifth lens 450, a sixth lens 460, an IR-bandstop filter 480, a first image plane 490, a second image plane and an image sensing device 492. In the fourth embodiment of the present invention, the rays of any field of view can be further divided into sagittal ray and tangential ray, and the spatial frequency of 55 cycles/mm serves as the benchmark for evaluating the focus shifts and the MTF values. The fourth embodiment of the present invention takes 850 nm as the infrared light wavelength.

The first lens 410 has negative refractive power and is made of glass. The object side 412 of the first lens 410 is a convex surface and the image side 414 of the first lens 410 is a concave surface, and the object side 412 and the image side 414 of the first lens 410 are both aspheric.

The second lens 420 has positive refractive power and is made of glass. The object side 422 of the second lens 420 is a concave surface and the image side 424 of the second lens 420 is a convex surface, and the object side 422 and an image side 424 of the second lens 420 are both aspheric. The image side 424 of the second lens 420 has one inflection point.

The third lens 430 has positive refractive power and is made of glass. The object side 432 of the third lens 430 is a concave surface and the image side 434 of the third lens 430 is a convex surface, and the object side 432 and the image side 434 of the third lens 430 are both aspheric.

The fourth lens 440 has positive refractive power and is made of glass. The object side 442 of the fourth lens 440 is a convex surface and the image side 444 of the fourth lens 440 is a convex surface, and the object side 442 and an image side 444 of the fourth lens 440 are both aspheric. The image side 444 of the fourth lens 440 has one inflection point.

The fifth lens 450 has positive refractive power and is made of glass. The object side 452 of the fifth lens 450 is a concave surface and the image side 454 of the fifth lens 450 is a convex surface, and the object side 452 and the image side 454 of the fifth lens 450 are both aspheric. The object side 452 of the fifth lens 450 has two inflection points. The image side 454 of the fifth lens 450 has one inflection point.

The sixth lens 460 has negative refractive power and is made of glass. The object side 462 of the sixth lens 460 is a concave surface and the image side 464 of the sixth lens 460 is a convex surface, and the object side 462 and the image side 464 of the sixth lens 460 are both aspheric. The object side 462 and the image side 464 of the sixth lens 460 all have one inflection point. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 480 is made of glass and is disposed between the sixth lens 460 and the first image plane 490. The IR-bandstop filter 480 does not affect the focal length of the optical image capturing system.

Table 7 and Table 8 below should be incorporated into the reference of the present embodiment.

TABLE 7

Lens Parameters for the Fourth Embodiment
f(focal length) = 3.494 mm; f/HEP = 1.8; HAF(half angle of view) = 80 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 47.83874974 | 2.000 | Glass | 1.702 | 41.15 | −8.33029 |
| 2 | | 5.093998161 | 4.604 | | | | |
| 3 | Second Lens | −62.47132045 | 9.008 | Glass | 2.002 | 19.32 | 210.063 |
| 4 | | −51.49724991 | 0.200 | | | | |
| 5 | Aperture | 1E+18 | 0.525 | | | | |
| 6 | Third Lens | −8.49338434 | 3.782 | Glass | 1.497 | 81.56 | 13.0829 |

TABLE 7-continued

Lens Parameters for the Fourth Embodiment
f(focal length) = 3.494 mm; f/HEP = 1.8; HAF(half angle of view) = 80 deg

| Surface No | | Curvature Radius | Thickness (mm) | Material | Refractive Index | Coefficient of Dispersion | Focal Length |
|---|---|---|---|---|---|---|---|
| 7 | | −4.219891859 | 0.200 | | | | |
| 8 | Fourth Lens | 14.73946027 | 4.956 | Glass | 1.497 | 81.56 | 9.79205 |
| 9 | | −6.43052881 | 0.200 | | | | |
| 10 | Fifth Lens | −80.76094682 | 4.449 | Glass | 1.497 | 81.56 | 12.9782 |
| 11 | | −6.067266679 | 0.101 | | | | |
| 12 | Sixth Lens | −6.432499639 | 2.000 | Glass | 2.002 | 19.32 | −6.80461 |
| 13 | | −161.8418547 | 0.975 | | | | |
| 14 | IR-bandstop Filter | 1E+18 | 1.200 | BK_7 | 1.517 | 64.13 | |
| 15 | | 1E+18 | 0.800 | | | | |
| 16 | First Image Plane | 1E+18 | 0.000 | | | | |

Reference Wavelength = 555 nm; Shield Position: The 9th surface with effective aperture radius = 5.250 mm

TABLE 8

The Aspheric Coefficients of the Fourth Embodiment
Table 8: Aspheric Coefficients

| Surface No | 1 | 2 | 3 | 4 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 1.631296E−04 | −5.562694E−04 | −4.171670E−04 | 1.620696E−04 | 1.021772E−03 | 5.798220E−04 | −1.141554E−03 |
| A6 | −1.544068E−07 | −9.346227E−10 | 1.821172E−05 | −1.242134E−05 | −1.492844E−04 | 2.459098E−05 | 2.801288E−05 |
| A8 | 0.000000E+00 | −3.849725E−17 | −4.532436E−07 | 1.397579E−05 | 1.119642E−05 | 5.600989E−07 | −2.012977E−07 |
| A10 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| A4 | 7.890995E−04 | 1.764937E−03 | 5.240971E−04 | −1.594470E−03 | −5.248986E−04 |
| A6 | −1.653208E−05 | −2.579581E−05 | −2.630670E−05 | 1.114888E−04 | 8.623637E−06 |
| A8 | 7.993127E−07 | −3.217421E−07 | 2.372252E−06 | −3.654260E−07 | 0.000000E+00 |
| A10 | 0.000000E+00 | 0.000000E+00 | 0.000000E+00 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| MTFE0 | | MTFE3 | | MTFE7 | |
| 0.46 | | 0.33 | | 0.39 | |

| ETP1 | ETP2 | ETP3 | ETP4 | ETP5 | ETP6 |
|---|---|---|---|---|---|
| 2.084 | 9.009 | 3.723 | 4.851 | 4.375 | 2.072 |

| ETP1/TP1 | ETP2/TP2 | ETP3/TP3 | ETP4/TP4 | ETP5/TP5 | ETP6/TP6 |
|---|---|---|---|---|---|
| 1.042 | 1.000 | 0.985 | 0.979 | 0.983 | 1.036 |

| ETL | EBL | EIN | EIR | PIR | EIN/ETL |
|---|---|---|---|---|---|

-continued

| Fourth Embodiment (Primary Reference Wavelength = 555 nm) | | | | | |
|---|---|---|---|---|---|
| 34.990 | 2.979 | 32.011 | 0.979 | 0.975 | 0.915 |
| SETP/EIN | EIR/PIR | SETP | STP | SETP/STP | BL |
| 0.816 | 1.003 | 26.113 | 26.195 | 0.997 | 2.975 |
| ED12 | ED23 | ED34 | ED45 | ED56 | EBL/BL |
| 4.502 | 0.677 | 0.345 | 0.269 | 0.104 | 0.9987 |
| SED | SIN | SED/SIN | ED12/ED23 | ED23/ED34 | ED34/ED45 |
| 5.898 | 5.830 | 1.012 | 6.650 | 1.961 | 1.281 |
| ED12/IN12 | ED23/IN23 | ED34/IN34 | ED45/IN45 | ED56/IN56 | ED45/ED56 |
| 0.978 | 0.934 | 1.726 | 1.347 | 1.027 | 2.586 |
| \| f/f1 \| | \| f/f2 \| | \| f/f3 \| | \| f/f4 \| | \| f/f5 \| | \| f/f6 \| |
| 0.41945 | 0.01663 | 0.26708 | 0.35684 | 0.26923 | 0.51350 |
| ΣPPR | ΣNPR | ΣPPR/\|ΣNPR\| | IN12/f | IN56/f | TP4/(IN34 + TP4 + IN45) |
| 0.98941 | 0.43609 | 2.26882 | 1.31755 | 0.02904 | 0.92531 |
| \| f1/f2 \| | \| f2/f3 \| | (TP1 + IN12)/TP2 | | (TP6 + IN56)/TP5 | |
| 0.03966 | 16.05630 | 0.73307 | | 0.47234 | |
| HOS | InTL | HOS/HOI | InS/HOS | ODT % | TDT % |
| 35.00000 | 32.02460 | 7.00000 | 0.54823 | −75.15850 | 58.76930 |
| HVT51 | HVT52 | HVT61 | HVT62 | HVT62/HOI | HVT62/HOS |
| 1.35268 | 5.21748 | 5.23567 | 0.00000 | 0.00000 | 0.00000 |
| TP2/TP3 | TP3/TP4 | InRS61 | InRS62 | \| InRS61 \|/TP6 | \| InRS62 \|/TP6 |
| 2.38211 | 0.76309 | −1.77989 | −0.32977 | 0.88995 | 0.16488 |
| VSFS0 | VSFS3 | VSFS7 | VTFS0 | VTFS3 | VTFS7 |
| 0.025 | 0.015 | −0.010 | 0.025 | 0.020 | 0.005 |
| VSMTF0 | VSMTF3 | VSMTF7 | VTMTF0 | VTMTF3 | VTMTF7 |
| 0.864 | 0.782 | 0.842 | 0.864 | 0.558 | 0.408 |
| ISFS0 | ISFS3 | ISFS7 | ITFS0 | ITFS3 | ITFS7 |
| 0.025 | 0.015 | −0.010 | 0.025 | 0.025 | 0.030 |
| ISMTF0 | ISMTF3 | ISMTF7 | ITMTF0 | ITMTF3 | ITMTF7 |
| 0.787 | 0.643 | 0.777 | 0.787 | 0.473 | 0.819 |
| FS | AIFS | | AVFS | | AFS |
| 0.000 | 0.018 | | 0.013 | | 0.005 |

The following values for the conditional expressions can be obtained from the data in Table 7 and Table 8.

| Values Related to Inflection Point of Fourth Embodiment (Primary Reference Wavelength = 555 nm) | | | | | | |
|---|---|---|---|---|---|---|
| HIF221 | 0.9897 | HIF221/HOI | 0.1979 | SGI221 | −0.0080 | \| SGI221 \|/(\| SGI221 \| + TP2) | 0.0009 |
| HIF421 | 4.9933 | HIF421/HOI | 0.9987 | SGI421 | −1.8354 | \| SGI421 \|/(\| SGI421 \| + TP4) | 0.2703 |
| HIF511 | 0.7735 | HIF511/HOI | 0.1547 | SGI511 | −0.0031 | \| SGI511 \|/(\| SGI511 \| + TP5) | 0.0007 |
| HIF512 | 4.3031 | HIF512/HOI | 0.8606 | SGI512 | 0.2888 | \| SGI512 \|/(\| SGI512 \| + TP5) | 0.0610 |
| HIF521 | 3.8629 | HIF521/HOI | 0.7726 | SGI521 | −1.2417 | \| SGI521 \|/(\| SGI521 \| + TP5) | 0.2182 |

-continued

Values Related to Inflection Point of Fourth Embodiment
(Primary Reference Wavelength = 555 nm)

| | | | | | | | |
|---|---|---|---|---|---|---|---|
| HIF611 | 3.6124 | HIF611/HOI | 0.7225 | SGI611 | −1.1445 | \| SGI611 \|/(\| SGI611 \| + TP6) | 0.3640 |
| HIF621 | 5.0294 | HIF621/HOI | 1.0059 | SGI621 | −0.2744 | \| SGI621 \|/(\| SGI621 \| + TP6) | 0.1207 |

Fifth Embodiment

Figure 5A:
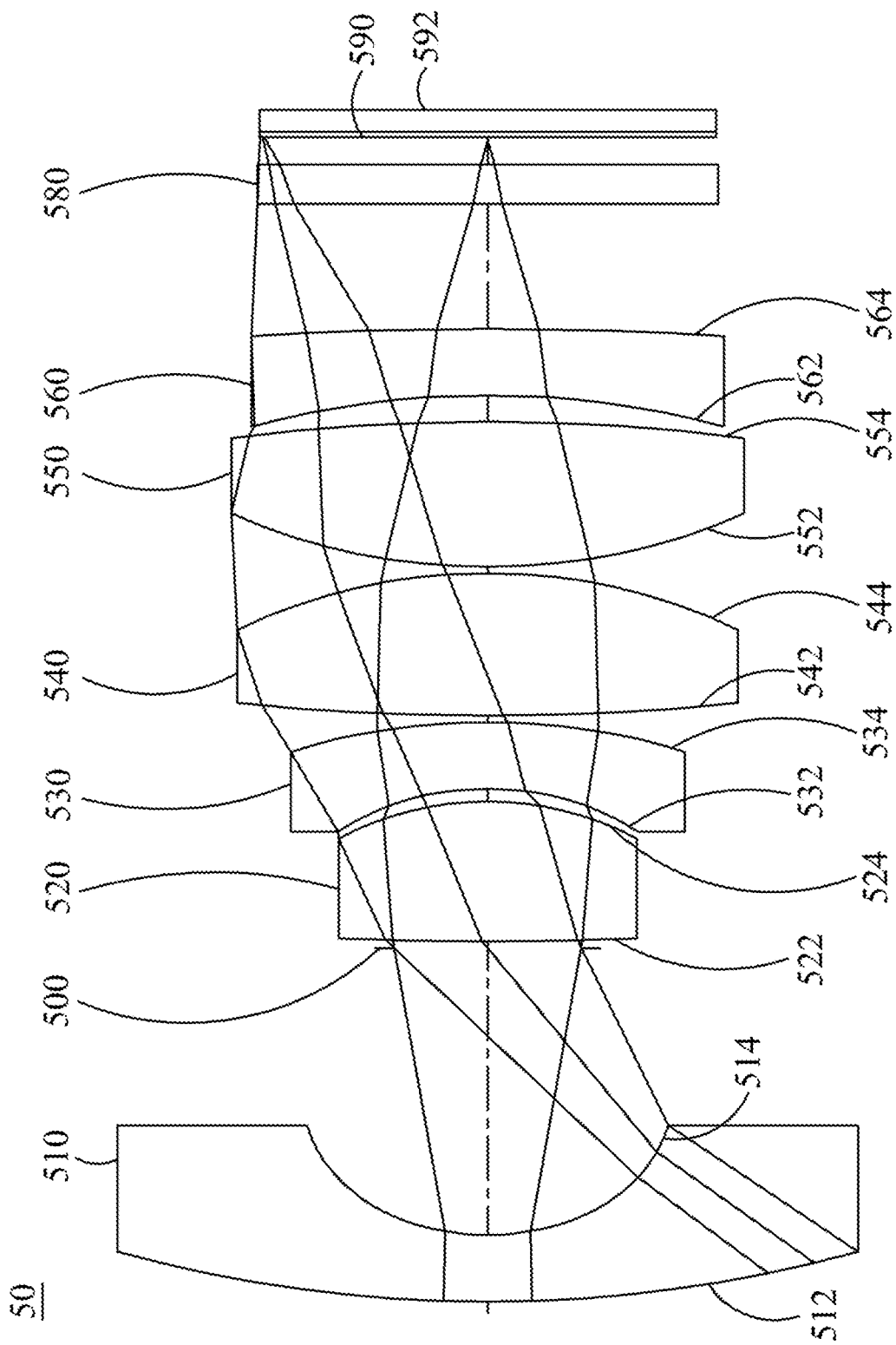
FIG. 5A is a schematic view of the optical image capturing system according to the fifth embodiment of the present invention.
Figure 5B:
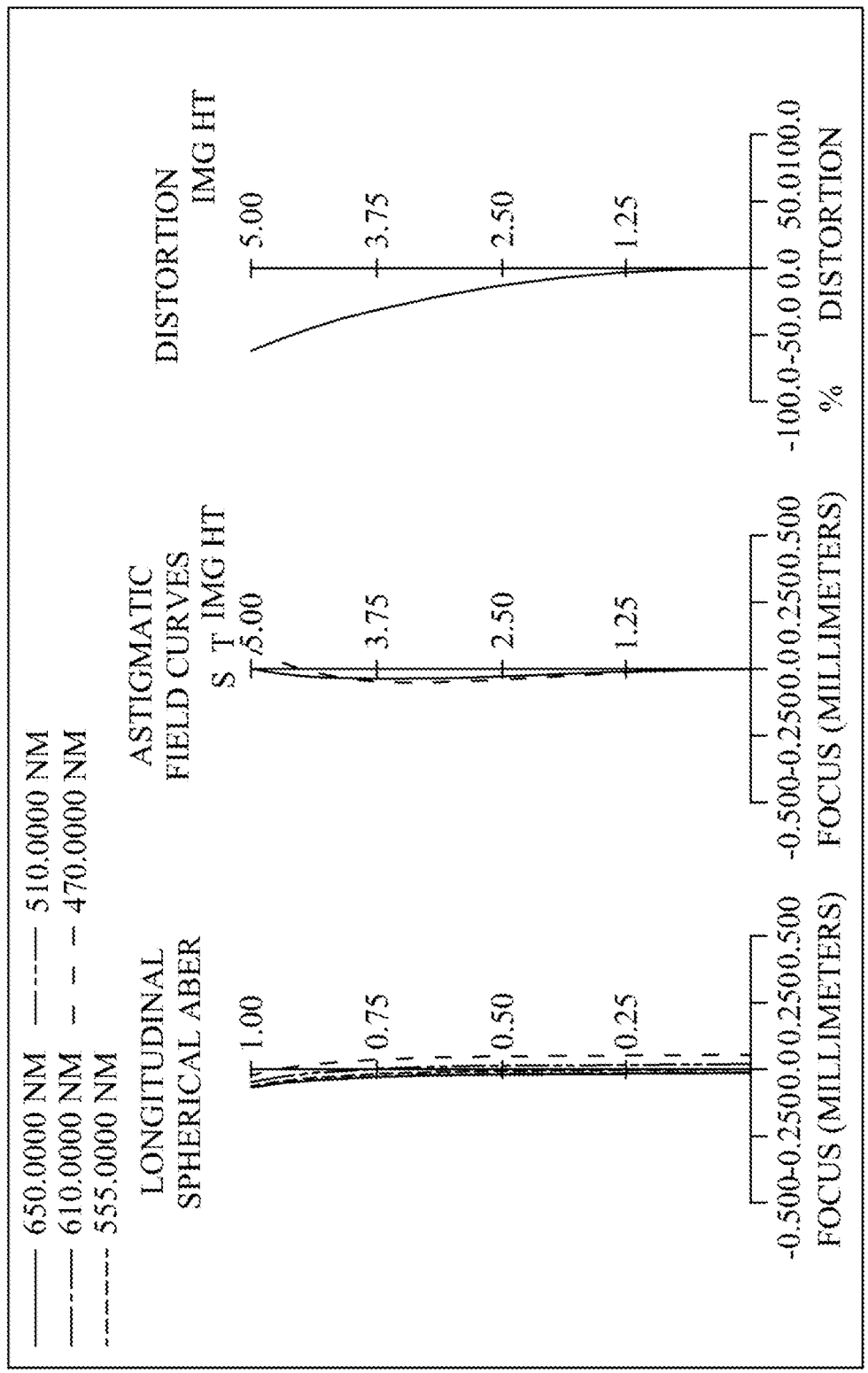
FIG. 5B shows the longitudinal spherical aberration curves, astigmatic field curves, and optical distortion curve of the optical image capturing system in the order from left to right according to the fifth embodiment of the present invention.
Figure 5C:
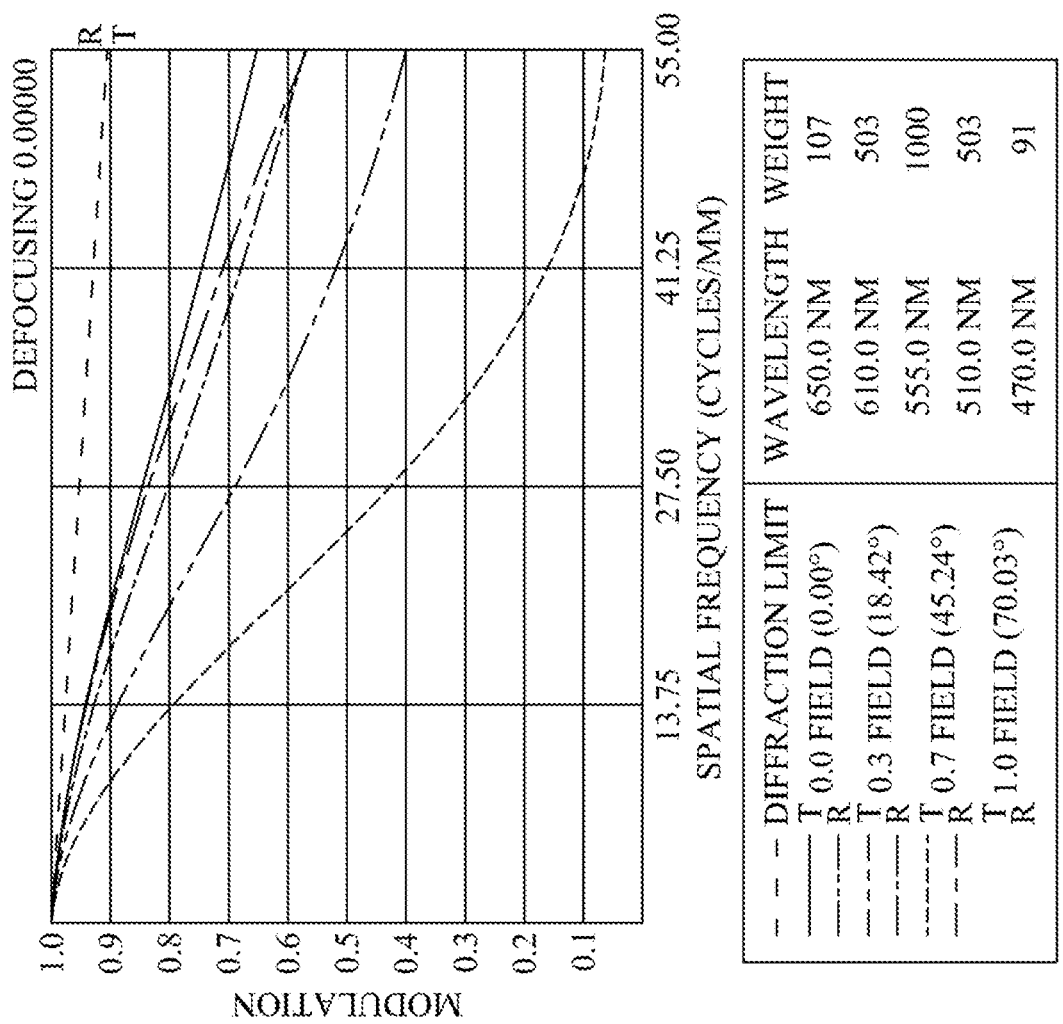
FIG. 5C is a characteristic diagram of modulation transfer of the visible light spectrum according to the fifth embodiment of the present invention.
Figure 5D:
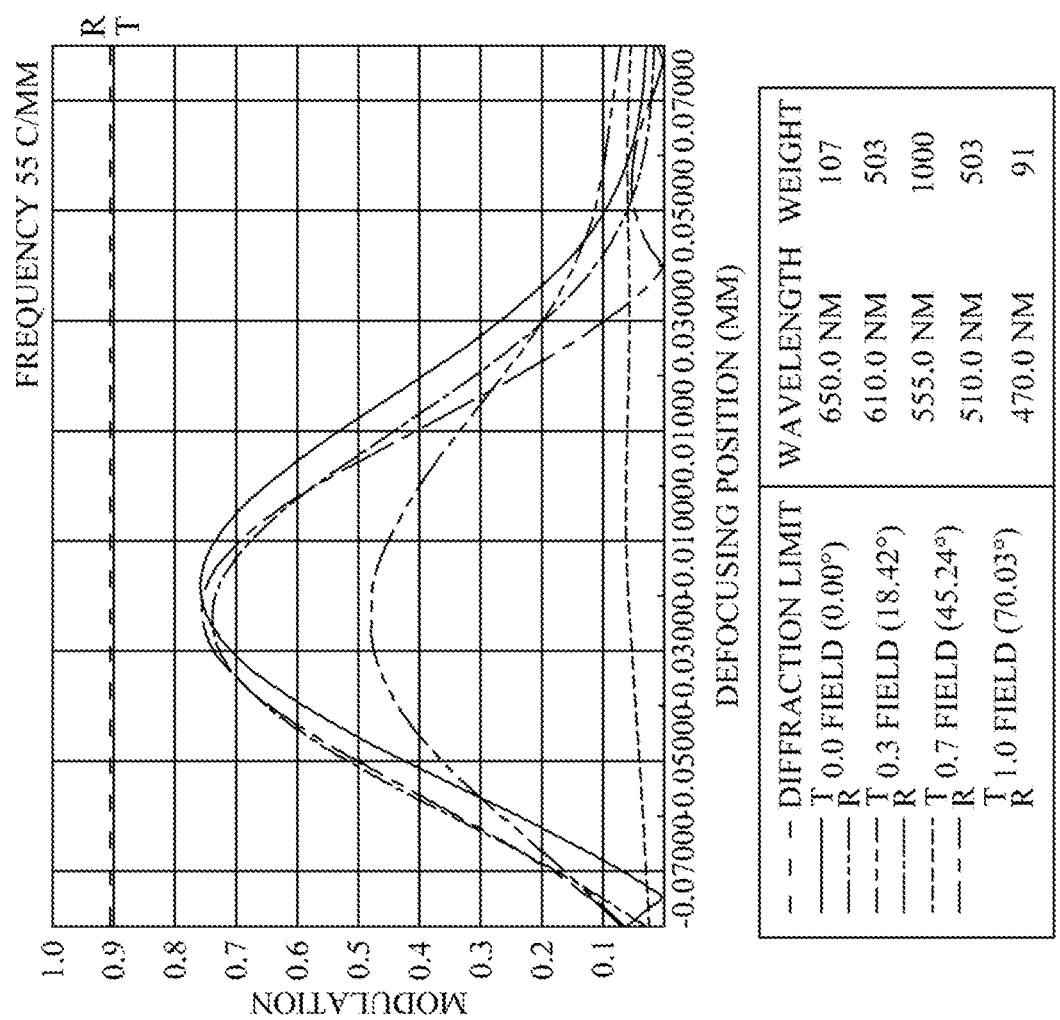
FIG. 5D is a diagram showing the through focus MTF values (Through Focus MTF) of the visible light spectrum at the central field of view, 0.3 field of view, and 0.7 field of view of the fifth embodiment of the present invention.
Figure 5E:
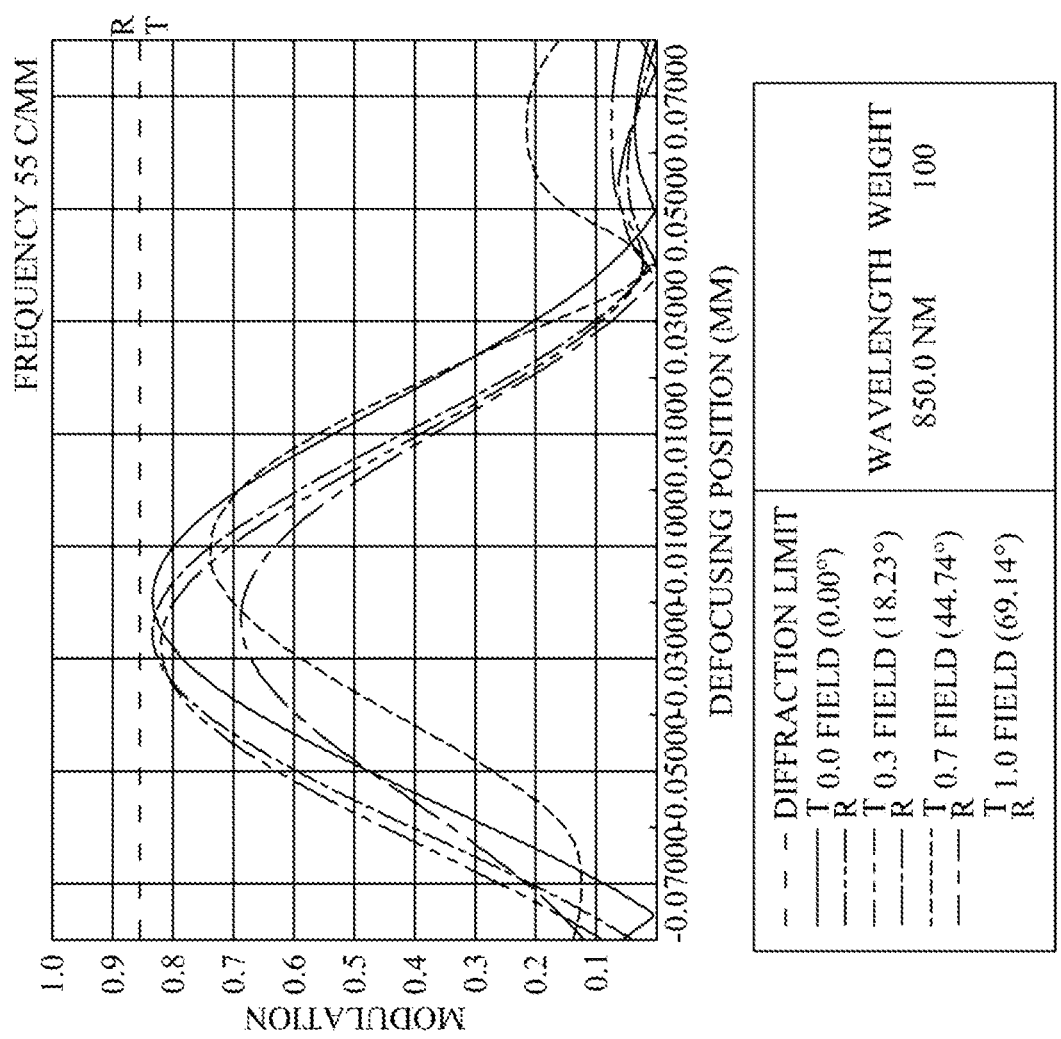
FIG. 5E is a diagram showing the through focus MTF values of the infrared light spectrum at the central field of view, 0.3 field of view, and 0.7 field of view of the fifth embodiment of the present invention.

Please refer to FIG. 5A and FIG. 5B. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C is a characteristic diagram of modulation transfer of the visible light spectrum according to the fifth embodiment of the present invention. FIG. 5D is a diagram showing the through focus MTF values (Through Focus MTF) of the visible light spectrum at the central field of view, 0.3 field of view, and 0.7 field of view of the fifth embodiment of the present invention. FIG. 5E is a diagram showing the through focus MTF values of the infrared light spectrum at the central field of view, 0.3 field of view, and 0.7 field of view of the fifth embodiment of the present invention.

As shown in FIG. 5A, in the order from an object side to an image side, the optical image capturing system includes a first lens 510, an aperture 500, a second lens 520, a third lens 530, a fourth lens 540, a fifth lens 550, a sixth lens 560, an IR-bandstop filter 580, a first image plane 590, a second image plane and an image sensing device 592. In the fifth embodiment of the present invention, the rays of any field of view can be further divided into sagittal ray and tangential ray, and the spatial frequency of 55 cycles/mm serves as the benchmark for evaluating the focus shifts and the MTF values. The fifth embodiment of the present invention takes 850 nm as the infrared light wavelength.

The first lens 510 has negative refractive power and is made of glass. The object side 512 of the first lens 510 is a convex surface and the image side 514 of the first lens 510 is a concave surface, and the object side 512 and the image, side 514 of the first lens 510 are both spherical.

The second lens 520 has positive refractive power and is made of glass. The object side 522 of the second lens 520 is a convex surface and the image side 524 of the second lens 520 is a convex surface, and the object side 522 and the image side 524 of the second lens 520 are both spherical.

The third lens 530 has negative refractive power and is made of glass. The object side 532 of the third lens 530 is a concave surface and the image side 534 of the third lens 530 is a convex surface, and object side 532 and image side 534 of the third lens 530 are both spherical.

The fourth lens 540 has positive refractive power and is made of glass. The object side 542 of the fourth lens 540 is a convex surface and the image side 544 of the fourth lens 540 is a convex surface, and object side 542 and image side 544 of the fourth lens 540 are both spherical.

The fifth lens 550 has positive refractive power and is made of glass. The object side 552 of the fifth lens 550 is a convex surface and the image side 554 of the fifth lens 550 is a convex surface, and object side 552 and image side 554 of the fifth lens 550 are both spherical.

The sixth lens 560 has negative refractive power and is made of glass. The object side 562 of the sixth lens 560 is a concave surface and the image side 564 of the sixth lens 560 is a convex surface, and object side 562 and image side 564 of the sixth lens 560 are both spherical. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 580 is made of glass and is disposed between the sixth lens 560 and the first image plane 590 without affecting the focal length of the optical image capturing system.

Table 9 and Table 10 below should be incorporated into the reference of the present embodiment.

TABLE 9

Lens Parameters for the Fifth Embodiment
f(focal length) = 4.714 mm; f/HEP = 2.4; HAF(half angle of view) = 70 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 23.10516481 | 2.000 | Glass | 1.658 | 50.85 | −7.836 |
| 2 | | 4.084495136 | 8.628 | | | | |
| 3 | Aperture | 1E+18 | 0.200 | | | | |
| 4 | Second Lens | 62.62001215 | 4.198 | Glass | 1.806 | 33.27 | 6.351 |
| 5 | | −5.44047608 | 0.394 | | | | |
| 6 | Third Lens | −4.893147528 | 2.000 | Glass | 2.002 | 19.32 | −10.253 |
| 7 | | −11.17259591 | 0.200 | | | | |
| 8 | Fourth Lens | 40.96588298 | 4.273 | Glass | 1.497 | 81.56 | 16.458 |
| 9 | | −9.89586665 | 0.200 | | | | |

TABLE 9-continued

Lens Parameters for the Fifth Embodiment
f(focal length) = 4.714 mm; f/HEP = 2.4; HAF(half angle of view) = 70 deg

| Surface No | | Curvature Radius | Thickness (mm) | Material | Refractive Index | Coefficient of Dispersion | Focal Length |
|---|---|---|---|---|---|---|---|
| 10 | Fifth Lens | 10.87373192 | 4.359 | Glass | 1.497 | 81.56 | 16.939 |
| 11 | | −32.669358 | 0.795 | | | | |
| 12 | Sixth Lens | −14.99959297 | 2.000 | Glass | 2.002 | 19.32 | −19.980 |
| 13 | | −62.18124811 | 3.754 | | | | |
| 14 | IR-bandstop Filter | 1E+18 | 1.192 | BK_7 | 1.517 | 64.13 | |
| 15 | | 1E+18 | 0.808 | | | | |
| 16 | First Image Plane | 1E+18 | 0.000 | | | | |

Reference Wavelength = 555 nm

TABLE 10

The Aspheric Coefficients of the Fifth Embodiment
Table 10: Aspheric Coefficients

| Surface No | 1 | 2 | 4 | 5 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| MTFE0 | | MTFE3 | | MTFE7 | |
| 0.65 | | 0.4 | | 0.06 | |
| ETP1 | ETP2 | ETP3 | ETP4 | ETP5 | ETP6 |
| 2.101 | 4.099 | 2.057 | 4.211 | 4.298 | 2.025 |
| ETP1/TP1 | ETP2/TP2 | ETP3/TP3 | ETP4/TP4 | ETP5/TP5 | ETP6/TP6 |
| 1.051 | 0.976 | 1.029 | 0.986 | 0.986 | 1.012 |
| ETL | EBL | EIN | EIR | PIR | EIN/ETL |
| 34.979 | 5.762 | 29.217 | 3.762 | 3.754 | 0.835 |
| SETP/EIN | EIR/PIR | SETP | STP | SETP/STP | BL |

-continued

| Fifth Embodiment (Primary Reference Wavelength = 555 nm) | | | | | |
|---|---|---|---|---|---|
| 0.643 | 1.002 | 18.791 | 18.829 | 0.998 | 5.754 |
| ED12 | ED23 | ED34 | ED45 | ED56 | EBL/BL |
| 8.713 | 0.383 | 0.256 | 0.295 | 0.777 | 0.9986 |
| SED | SIN | SED/SIN | ED12/ED23 | ED23/ED34 | ED34/ED45 |
| 10.425 | 10.417 | 1.001 | 22.726 | 1.497 | 0.868 |
| ED12/IN12 | ED23/IN23 | ED34/IN34 | ED45/IN45 | ED56/IN56 | ED45/ED56 |
| 0.987 | 0.974 | 1.281 | 1.476 | 0.978 | 0.380 |
| \| f/f1 \| | \| f/f2 \| | \| f/f3 \| | \| f/f4 \| | \| f/f5 \| | \| f/f6 \| |
| 0.60153 | 0.74216 | 0.45974 | 0.28642 | 0.27829 | 0.23593 |
| ΣPPR | ΣNPR | ΣPPR/\|ΣNPR\| | IN12/f | IN56/f | TP4/(IN34 + TP4 + IN45) |
| 0.98209 | 1.62198 | 0.60549 | 1.87271 | 0.16870 | 0.91440 |
| \| f1/f2 \| | | \| f2/f3 \| | | (TP1 + IN12)/TP2 | (TP6 + IN56)/TP5 |
| 1.23379 | | 0.61945 | | 2.57928 | 0.64129 |
| HOS | InTL | HOS/HOI | InS/HOS | ODT % | TDT % |
| 35.00000 | 29.24600 | 7.00000 | 0.69635 | −61.45710 | 42.61570 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \| InRS61 \|/TP6 | \| InRS62 \|/TP6 |
| 2.09896 | 0.46809 | −0.92057 | −0.22141 | 0.46028 | 0.11070 |
| VSFS0 | VSFS3 | VSFS7 | VTFS0 | VTFS3 | VTFS7 |
| −0.020 | −0.025 | −0.025 | −0.020 | −0.025 | −0.005 |
| VSMTF0 | VSMTF3 | VSMTF7 | VTMTF0 | VTMTF3 | VTMTF7 |
| 0.757 | 0.739 | 0.755 | 0.757 | 0.481 | 0.064 |
| ISFS0 | ISFS3 | ISFS7 | ITFS0 | ITFS3 | ITFS7 |
| −0.020 | −0.025 | −0.025 | −0.020 | −0.030 | −0.010 |
| ISMTF0 | ISMTF3 | ISMTF7 | ITMTF0 | ITMTF3 | ITMTF7 |
| 0.833 | 0.834 | 0.686 | 0.833 | 0.818 | 0.739 |
| FS | | AIFS | | AVFS | AFS |
| 0.000 | | −0.021 | | −0.021 | 0.000 |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF411 | 0 | HIF411/HOI | 0 | SGI411 | 0 | \| SGI411 \|/(\| SGI411 \| + TP4) | 0 |

Sixth Embodiment

Figure 6A:
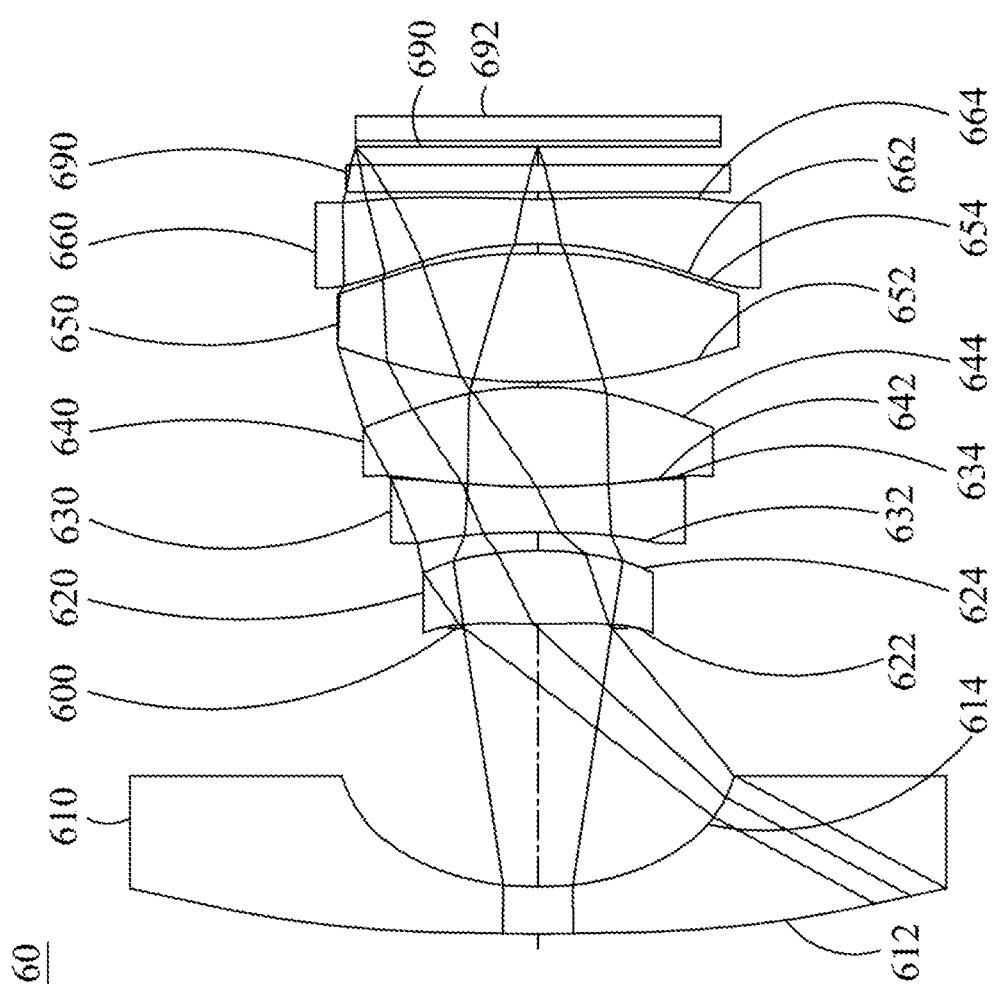
FIG. 6A is a schematic view of the optical image capturing system according to the sixth embodiment of the present invention.
Figure 6B:
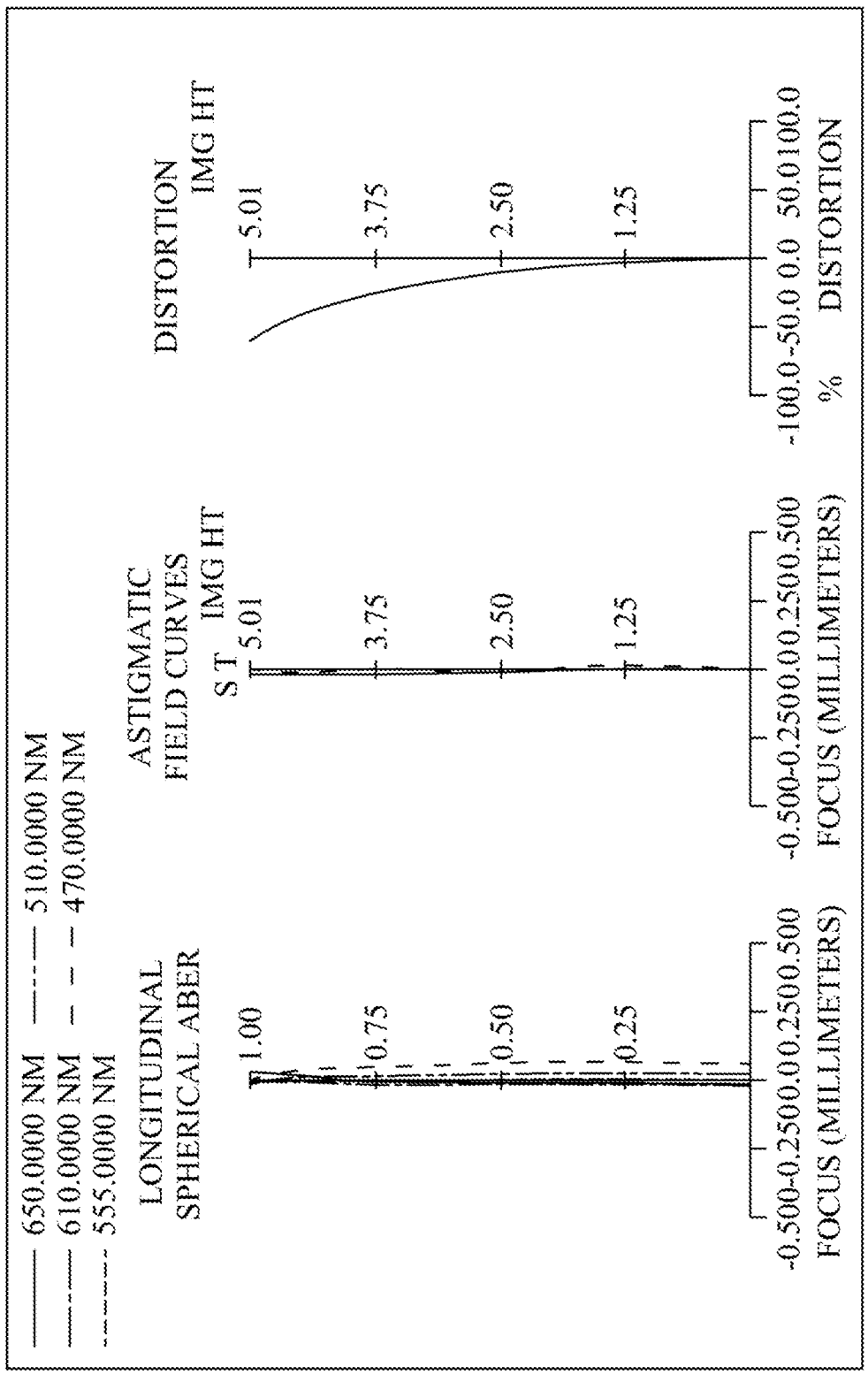
FIG. 6B shows the longitudinal spherical aberration curves, astigmatic field curves, and optical distortion curve of the optical image capturing system in the order from left to right according to the sixth embodiment of the present invention.
Figure 6C:
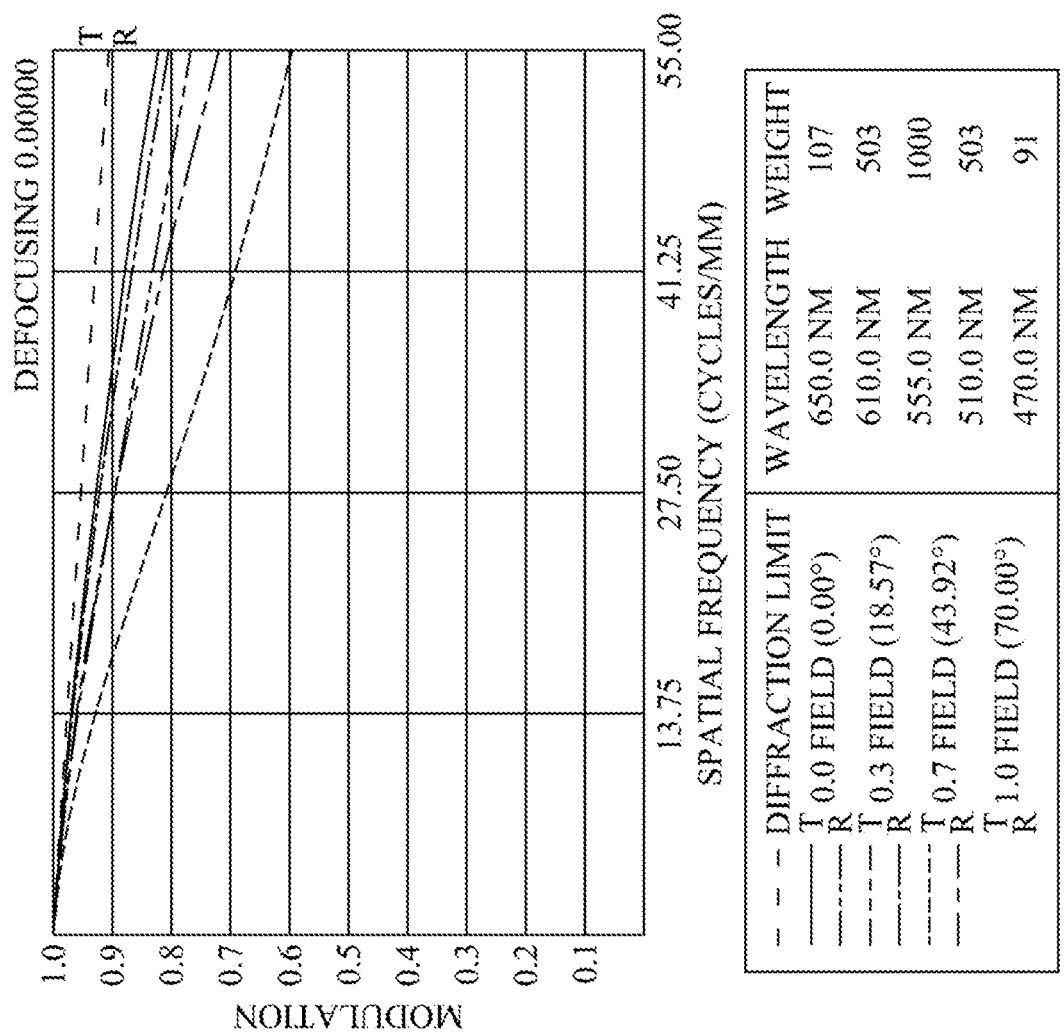
FIG. 6C is a characteristic diagram of modulation transfer of the visible light spectrum according to the sixth embodiment of the present invention.
Figure 6D:
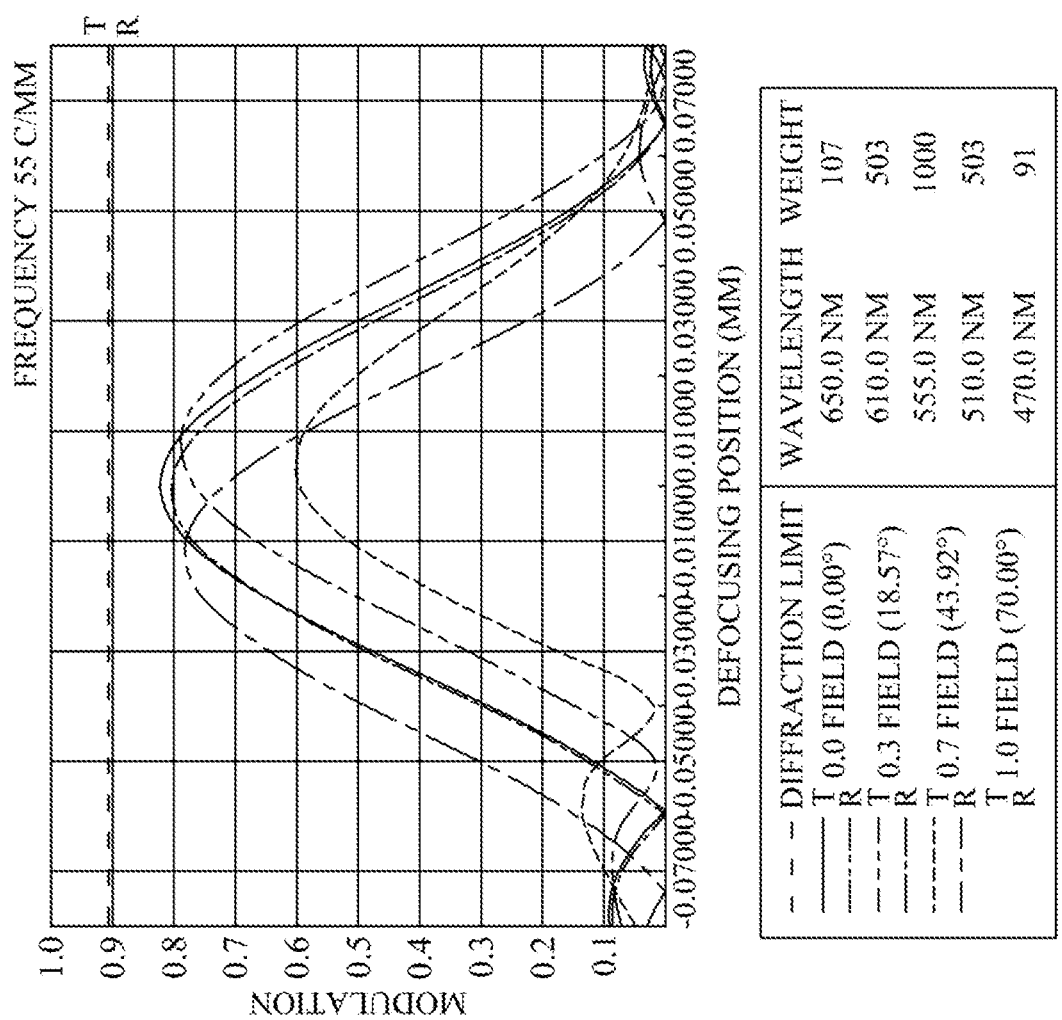
FIG. 6D is a diagram showing the through focus MTF values (Through Focus MTF) of the visible light spectrum at the central field of view, 0.3 field of view, and 0.7 field of view of the sixth embodiment of the present invention.
Figure 6E:
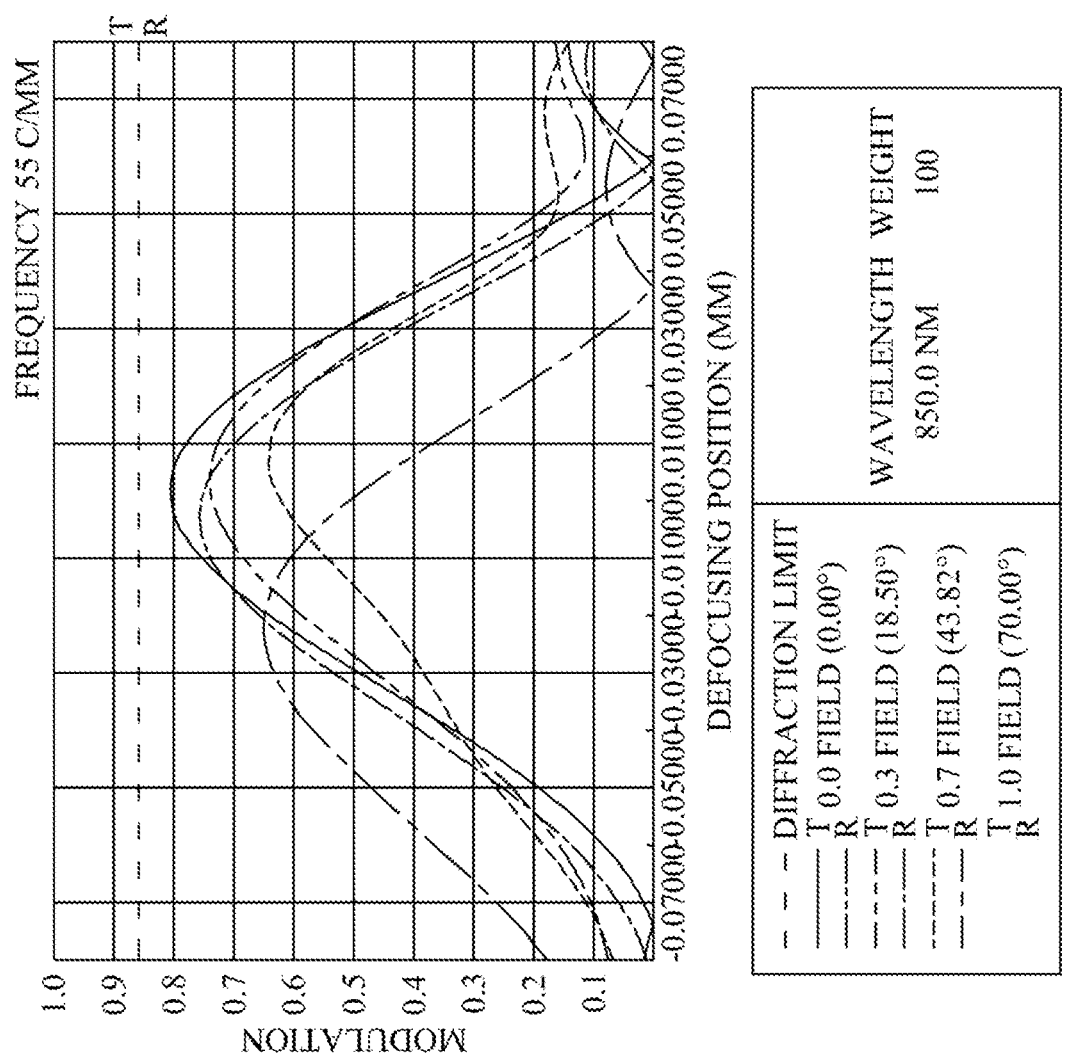
FIG. 6E is a diagram showing the through focus MTF values of the infrared light spectrum at the central field of view, 0.3 field of view, and 0.7 field of view of the sixth embodiment of the present invention.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C is a characteristic diagram of modulation transfer of the visible light spectrum according to the sixth embodiment of the present invention. FIG. 6D is a diagram showing the through focus MIT values (Through Focus MIT) of the visible light spectrum at the central field of view, 0.3 field of view, and 0.7 field of view of the sixth embodiment of the present invention. FIG. 6E is a diagram showing the through focus MTF values of the infrared light spectrum at the central field of view, 0.3 field of view, and 0.7 field of view of the sixth embodiment of the present invention. In the sixth embodiment of the present invention, the rays of any field of view can be further divided into sagittal ray and tangential ray, and the spatial frequency of 55 cycles/mm serves as the benchmark for evaluating the focus shifts and the MTF values. The sixth embodiment of the present invention takes 850 nm as the infrared light wavelength.

As shown in FIG. 6A, in the order from an object side to an image side, the optical image capturing system includes a first lens 610, an aperture 600, a second lens 620, a third lens 630, a fourth lens 640, a fifth lens 650, a sixth lens 660, an IR-bandstop filter 680, a first image plane 690, a second image plane and an image sensing device 692. In the sixth embodiment of the present invention, the rays of any field of view can be further divided into sagittal ray and tangential ray, and the spatial frequency of 55 cycles/mm serves as the benchmark for evaluating the focus shifts and the MTF values. The sixth embodiment of the present invention takes 850 nm as the infrared light wavelength.

The first lens 610 has negative refractive power and is made of glass. The object side 612 of the first lens 610 is a convex surface and the image side 614 of the first lens 610 is a concave surface, and the object side 612 and the image side 614 of the first lens 610 are both aspheric. The object side 612 of the first lens 610 has one inflection point.

The second lens 620 has positive refractive power and is made of glass. The object side 622 of the second lens 620 is a convex surface and the image side 624 of the second lens 620 is a convex surface, and the object side 622 and the image side 624 of the second lens 620 are both aspheric.

The third lens 630 has negative refractive power and is made of glass. The object side 632 of the third lens 630 is a concave surface and the image side 634 of the third lens 630 is a concave surface, and object side 632 and image side 634 of the third lens 630 are both aspheric. The image side 634 of the third lens 630 has one inflection point.

The fourth lens 640 has positive refractive power and is made of glass. The object side 642 of the fourth lens 640 is a convex surface and the image side 644 of the fourth lens 640 is a convex surface, and the object side 642 and the image side 644 of the fourth lens 640 are both aspheric. The object side 642 and the image side 644 of the fourth lens 640 all have one inflection point.

The fifth lens 650 has positive refractive power and is made of glass. The object side 652 of the fifth lens 650 is a convex surface and the image side 654 of the fifth lens 650 is a convex surface, and the object side 652 and the image side 654 of the fifth lens 650 are both aspheric. The object side 652 and the image side 654 of the fifth lens 650 has one inflection point.

The sixth lens 660 has negative refractive power and is made of glass. The object side 662 of the sixth lens 660 is a concave surface and the image side 664 of the sixth lens 660 is a concave surface, and the object side 662 and the image side 664 of the sixth lens 660 are both aspheric. The image side 664 the object side 662 of the sixth lens 660 all have one inflection point. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 680 is made of glass and is disposed between the sixth lens 660 and the first image plane 690, without affecting the focal length of the optical image capturing system.

Table 11 and Table 12 below should be incorporated into the reference of the present embodiment.

TABLE 11

Lens Parameters for the Sixth Embodiment
f(focal length) = 4.633 mm; f/HEP = 2.4; HAF(half angle of view) = 70 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 76.22024782 | 2.094 | Glass | 1.569 | 56.04 | −10.563 |
| 2 | | 5.493555726 | 11.498 | | | | |
| 3 | Aperture | 1E+18 | 0.200 | | | | |
| 4 | Second Lens | 233.7424655 | 3.249 | Glass | 1.904 | 31.32 | 7.548 |
| 5 | | −6.930187522 | 0.819 | | | | |
| 6 | Third Lens | −25.60651117 | 2.000 | Glass | 2.002 | 19.32 | −7.883 |
| 7 | | 11.67403806 | 0.019 | | | | |
| 8 | Fourth Lens | 13.10878197 | 4.442 | Glass | 1.517 | 64.20 | 8.721 |
| 9 | | −6.045001257 | 0.208 | | | | |
| 10 | Fifth Lens | 11.107377 | 5.728 | Glass | 1.517 | 64.20 | 11.538 |
| 11 | | −10.53708859 | 0.407 | | | | |
| 12 | Sixth Lens | −7.187644648 | 2.006 | Glass | 2.002 | 19.32 | −6.022 |
| 13 | | 39.985766 | 0.331 | | | | |
| 14 | IR-bandstop filter | 1E+18 | 1.192 | BK_7 | 1.517 | 64.13 | |
| 15 | | 1E+18 | 0.808 | | | | |
| 16 | First Image Plane | 1E+18 | 0.000 | | | | |

Reference Wavelength = 555 nm; Shield Position: The 12th surface with effective aperture radius = 6.108 mm

TABLE 12

The Aspheric Coefficients of the Sixth Embodiment
Table 12: Aspheric Coefficients

| Surface No | 1 | 2 | 4 | 5 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 1.981357E−04 | 2.761147E−04 | −2.060557E−03 | −2.885247E−03 | −3.808936E−03 | −1.473213E−03 | −7.430699E−04 |
| A6 | −1.340481E−06 | −6.527141E−06 | −5.808618E−05 | 1.238428E−04 | 1.507847E−04 | 3.642650E−05 | 3.759547E−05 |
| A8 | 2.877980E−09 | 6.215075E−07 | −1.898289E−05 | −7.844835E−06 | −1.544533E−06 | −1.156921E−06 | −1.738054E−06 |
| A10 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| A4 | 1.146367E−04 | 1.844509E−04 | −1.371738E−03 | −8.251547E−04 | −4.585916E−04 |
| A6 | 3.206730E−05 | 1.923476E−05 | 3.985607E−05 | 5.645082E−05 | −2.543423E−05 |
| A8 | 3.291454E−07 | −7.007774E−07 | −1.359166E−07 | −1.685789E−07 | 9.692976E−07 |
| A10 | 0.000000E+00 | 0.000000E+00 | 0.000000E+00 | 0.000000E+00 | −9.320470E−09 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | |
|---|---|---|
| MTFE0 | MTFE3 | MTFE7 |
| 0.82 | 0.77 | 0.59 |

| ETP1 | ETP2 | ETP3 | ETP4 | ETP5 | ETP6 |
|---|---|---|---|---|---|
| 2.174 | 3.178 | 2.061 | 4.328 | 5.640 | 2.084 |

| ETP1/TP1 | ETP2/TP2 | ETP3/TP3 | ETP4/TP4 | ETP5/TP5 | ETP6/TP6 |
|---|---|---|---|---|---|
| 1.038 | 0.978 | 1.030 | 0.974 | 0.985 | 1.039 |

| ETL | EBL | EIN | EIR | PIR | EIN/ETL |
|---|---|---|---|---|---|
| 34.994 | 2.319 | 32.674 | 0.319 | 0.331 | 0.934 |

| SETP/EIN | EIR/PIR | SETP | STP | SETP/STP | BL |
|---|---|---|---|---|---|
| 0.596 | 0.966 | 19.465 | 19.519 | 0.997 | 2.331 |

| ED12 | ED23 | ED34 | ED45 | ED56 | EBL/BL |
|---|---|---|---|---|---|
| 11.612 | 0.868 | 0.015 | 0.329 | 0.386 | 1.0052 |

| SED | SIN | SED/SIN | ED12/ED23 | ED23/ED34 | ED34/ED45 |
|---|---|---|---|---|---|
| 13.210 | 13.151 | 1.004 | 13.383 | 58.568 | 0.045 |

| ED12/IN12 | ED23/IN23 | ED34/IN34 | ED45/IN45 | ED56/IN56 | ED45/ED56 |
|---|---|---|---|---|---|
| 0.993 | 1.060 | 0.797 | 1.580 | 0.950 | 0.851 |

| \| f/f1 \| | \| f/f2 \| | \| f/f3 \| | \| f/f4 \| | \| f/f5 \| | \| f/f6 \| |
|---|---|---|---|---|---|
| 0.43863 | 0.61380 | 0.58777 | 0.53124 | 0.40154 | 0.76940 |

| ΣPPR | ΣNPR | ΣPPR/\|ΣNPR\| | IN12/f | IN56/f | TP4/(IN34 + TP4 + IN45) |
|---|---|---|---|---|---|
| 1.75648 | 1.05243 | 1.66899 | 2.52496 | 0.08781 | 0.95144 |

| \| f1/f2 \| | \| f2/f3 \| | (TP1 + IN12)/TP2 | (TP6 + IN56)/TP5 |
|---|---|---|---|
| 1.39936 | 0.95759 | 4.24516 | 0.42119 |

| Sixth Embodiment (Primary Reference Wavelength = 555 nm) | | | | | |
|---|---|---|---|---|---|
| HOS | InTL | HOS/HOI | InS/HOS | ODT % | TDT % |
| 35.00000 | 32.66950 | 7.00000 | 0.61165 | −60.99330 | 45.69950 |
| HVT51 | HVT52 | HVT61 | HVT62 | HVT62/HOI | HVT62/HOS |
| 0 | 0 | 0.00000 | 3.06977 | 0.61395 | 0.08771 |
| TP2/TP3 | TP3/TP4 | InRS61 | InRS62 | \| InRS61 \|/TP6 | \| InRS62 \|/TP6 |
| 1.62447 | 0.45027 | −1.83168 | −0.13462 | 0.91315 | 0.06711 |
| VSFS0 | VSFS3 | VSFS7 | VTFS0 | VTFS3 | VTFS7 |
| −0.000 | −0.000 | −0.010 | −0.000 | 0.005 | 0.005 |
| VSMTF0 | VSMTF3 | VSMTF7 | VTMTF0 | VTMTF3 | VTMTF7 |
| 0.822 | 0.805 | 0.780 | 0.822 | 0.788 | 0.602 |
| ISFS0 | ISFS3 | ISFS7 | ITFS0 | ITFS3 | ITFS7 |
| −0.000 | −0.005 | −0.025 | −0.000 | 0.005 | 0.005 |
| ISMTF0 | ISMTF3 | ISMTF7 | ITMTF0 | ITMTF3 | ITMTF7 |
| 0.804 | 0.755 | 0.648 | 0.804 | 0.740 | 0.640 |
| FS | | AIFS | | AVFS | AFS |
| 0.000 | | −0.003 | | −0.000 | 0.003 |

The following values for the conditional expressions can be obtained from the data in Table 11 and Table 12:

| Values Related to Inflection Point of Sixth Embodiment (Primary Reference Wavelength = 555 nm) | | | | | | | |
|---|---|---|---|---|---|---|---|
| HIF111 | 10.7461 | HIF111/HOI | 2.1492 | SGI111 | 1.8511 | \| SGI111 \|/(\| SGI111 \| + TP1) | 0.4692 |
| HIF211 | 0.4133 | HIF211/HOI | 0.0827 | SGI211 | 0.0003 | \| SGI211 \|/(\| SGI211 \| + TP2) | 0.0001 |
| HIF321 | 2.6507 | HIF321/HOI | 0.5301 | SGI321 | 0.2420 | \| SGI321 \|/(\| SGI321 \| + TP3) | 0.1079 |
| HIF411 | 3.2578 | HIF411/HOI | 0.6516 | SGI411 | 0.3505 | \| SGI411 \|/(\| SGI411 \| + TP4) | 0.0731 |
| HIF421 | 4.3404 | HIF421/HOI | 0.8681 | SGI421 | −1.5410 | \| SGI421 \|/(\| SGI421 \| + TP4) | 0.2576 |
| HIF511 | 4.8003 | HIF511/HOI | 0.9601 | SGI511 | 1.2265 | \| SGI511 \|/(\| SGI511 \| + TP5) | 0.1764 |
| HIF521 | 4.6748 | HIF521/HOI | 0.9350 | SGI521 | −1.3639 | \| SGI521 \|/(\| SGI521 \| + TP5) | 0.1923 |
| HIF611 | 4.0283 | HIF611/HOI | 0.8057 | SGI611 | −1.2226 | \| SGI611 \|/(\| SGI611 \| + TP6) | 0.3787 |
| HIF621 | 1.8312 | HIF621/HOI | 0.3662 | SGI621 | 0.0360 | \| SGI621 \|/(\| SGI621 \| + TP6) | 0.0176 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:
1. An optical image capturing system, from an object side to an image side, comprising:
   a first lens with refractive power;
   a second lens with refractive power;
   a third lens with refractive power;
   a fourth lens with refractive power;
   a fifth lens with refractive power;
   a sixth lens with refractive power;
   a first image plane, being an image plane specifically for visible light and perpendicular to an optical axis, and a through focus modulation transfer rate (MTF) of central field of view of the first image plane having a maximum value at a first spatial frequency; and
   a second image plane, being an image plane specifically for infrared light and perpendicular to the optical axis, and a through focus modulation transfer rate (MTF) of central field of view of the second image plane having a maximum value at the first spatial frequency;
   wherein the optical image capturing system has only six lenses with refractive powers, the optical image capturing system has a maximum image height HOI on the first image plane, there is at least one lens having positive refractive power among the first lens to the sixth lens, focal lengths of the six lenses are respec- tively f1, f2, f3, f4, f5 and f6, a focal length of the optical image capturing system is f, an entrance pupil diameter of the optical image capturing system is HEP, there is a distance HOS on the optical axis from an object side of the first lens to the first image plane, there is a distance InTL on the optical axis from the object side of the first lens to the image side of the sixth lens, a half maximum angle of view of the optical image capturing system is HAF, a distance on the optical axis between the first image plane and the second image plane is FS, thicknesses of the first lens through sixth lens at a height of ½ HEP and in parallel with the optical axis are respectively ETP1, ETP2, ETP3, ETP4, ETP5 and ETP6, a sum of ETP1 to ETP6 is SETP, thicknesses of the first lens through sixth lens on the optical axis are respectively TP1, TP2, TP3, TP4, TP5 and TP6, a sum of TP1 to TP6 is STP, the optical image capturing system meets the following conditions: $1.0 \leq f/HEP \leq 10.0$; 0 deg$<HAF \leq 150$ deg; $0.2 \leq SETP/STP<1$ |FS|; $\leq 60$ μm and $1 \leq HOS/HOI\ 15$.

2. The optical image capturing system of claim 1, wherein a wavelength of the infrared light ranges from 700 nm to 1300 nm, and the first spatial frequency is expressed as SP1, the following condition is satisfied: SP1≤440 cycles/mm.

3. The optical image capturing system of claim 1, wherein the optical image capturing system meets the following condition: 1≤HOS/HOI≤10.

4. The optical image capturing system of claim 1, wherein at least one lens among the first lens to the sixth lens is made of glass.

5. The optical image capturing system of claim 1, wherein the optical image capturing system meets the following condition: |FS|≤10 μm.

6. The optical image capturing system of claim 1, wherein a distance parallel to the optical axis between a first coordinate point at a height of ½ HEP on the object side of the first lens and the first image plane is ETL, and a distance parallel to the optical axis between a second coordinate point at a height of ½ HEP on the image side of the sixth lens and the first coordinate point at a height of ½ HEP on the object side of the first lens is EIN, the following condition is satisfied: 0.2≤EIN/ETL<1.

7. The optical image capturing system of claim 6, wherein thicknesses of the first lens through sixth lens at a height of ½ HEP and in parallel with the optical axis are respectively ETP1, ETP2, ETP3, ETP4, ETP5 and ETP6, a sum of ETP1 to ETP6 is SETP, the following condition is satisfied: 0.2≤SETP/EIN<1.

8. The optical image capturing system of claim 1, wherein a horizontal distance parallel to the optical axis between a second coordinate point at a height of ½ HEP on the image side of the sixth lens and the first image plane is EBL, a horizontal distance parallel to the optical axis between an intersection point on the image side of the sixth lens crossing the optical axis and the first image plane is BL, the following condition is satisfied: 0.1≤EBL/BL≤1.1.

9. The optical image capturing system of claim 1, further comprising an aperture, wherein a distance from the aperture to the first image plane on the optical axis is InS, a wavelength of the infrared light ranges from 700 nm to 1300 nm, and the first spatial frequency is expressed as SP1, the following conditions are satisfied: 0.2≤InS/HOS≤1.1 and SP1≤55 cycles/mm.

10. An optical image capturing system, from an object side to an image side, comprising:
a first lens with refractive power;
a second lens with refractive power;
a third lens with refractive power;
a fourth lens with refractive power;
a fifth lens with refractive power;
a sixth lens with refractive power;
a first image plane, which is an image plane specifically for visible light and perpendicular to an optical axis, and a through focus modulation transfer rate (MTF) of central field of view of the first image plane having a maximum value at a first spatial frequency of 55 cycles/mm; and
a second image plane, which is an image plane specifically for infrared light and perpendicular to the optical axis, and the through focus modulation transfer rate (MTF) of central field of view of the second image plane having a maximum value at the first spatial frequency of 55 cycles/mm;
wherein the optical image capturing system has only six lenses with refractive powers, the optical image capturing system has a maximum image height HOI on the first image plane that is perpendicular to the optical axis, there is at least one lens made of glass among the first lens to the sixth lens, there is at least one lens having positive refractive power among the first lens to the sixth lens, focal lengths of the six lenses are respectively f1, f2, f3, f4, f5 and f6, a focal length of the optical image capturing system is f, an entrance pupil diameter of the optical image capturing system is HEP, there is a distance HOS on the optical axis from the object side of the first lens to the first image plane, there is a distance InTL on the optical axis from the object side of the first lens to the image side of the sixth lens, a half maximum angle of view of the optical image capturing system is HAF, a distance on the optical axis between the first image plane and the second image plane is FS, a distance parallel to the optical axis between a coordinate point at a height of ½ HEP on the object side of the first lens and the first image plane is ETL, a distance parallel to the optical axis between a first coordinate point at a height of ½ HEP on the image side of the sixth lens and the coordinate point at a height of ½ HEP on the object side of the first lens is EIN, the optical image capturing system meets the following conditions: 1≤f/HEP≤10; 0 deg<HAF≤150 deg; 0.2≤EIN/ETL<1; |FS|30 μm and 1≤HOS/HOI≤15.

11. The optical image capturing system of claim 10, wherein there is an air gap between each lens among the six lenses.

12. The optical image capturing system of claim 10, wherein the modulation transfer rate (value of MTF) of visible light at positions of the optical axis, 0.3HOI and 0.7HOI on the first image plane are respectively expressed as MTFE0, MTFE3 and MTFE7 at the spatial frequency of 55 cycles/mm, the following conditions are satisfied: MTFE0≥0.1; MTFE3≥0.01; and MTFE7≥0.01.

13. The optical image capturing system of claim 10, wherein at least one lens among the first lens to the sixth lens is made of glass and at least one surface of the said glass lens is an aspheric surface.

14. The optical image capturing system of claim 10, wherein the optical image capturing system meets the following condition: |FS|≤10 μm.

15. The optical image capturing system of claim 10, wherein the optical image capturing system meets the following condition: 1≤HOS/HOI≤10.

16. The optical image capturing system of claim 10, a distance on the optical axis between the third lens and the fourth lens is IN34, a distance on the optical axis between the fourth lens and the fifth lens is IN45, the thicknesses of the third lens, the fourth lens and the fifth lens on the optical axis are respectively TP3, TP4 and TP5, the following conditions are satisfied: (IN34+IN45)≤TP3;(IN34+IN45)≤TP4 and (IN34+IN45)≤TP5.

17. The optical image capturing system of claim 10, a distance parallel to the optical axis between a third coordinate point at a height of ½ HEP on the object side of the second lens and a second coordinate point at a height of ½ HEP on the image side of the first lens is ED12, a distance on the optical axis between the first lens and the second lens is IN12, the following conditions is satisfied: 0<ED12/IN12≤35.

18. The optical image capturing system of claim 10, wherein a distance on the optical axis between the fifth lens and the sixth lens is IN56, the following conditions is satisfied: 0<IN56/f≤5.0.

19. The optical image capturing system of claim 10, wherein at least one lens among the first lens, the second lens, the third lens, the fourth lens, the fifth lens and the sixth lens is a filtering element for light with wavelength of less than 500 nm.

20. An optical image capturing system, from an object side to an image side, comprising:
 a first lens with refractive power;
 a second lens with refractive power;
 a third lens with refractive power;
 a fourth lens with refractive power;
 a fifth lens with refractive power;
 a sixth lens with refractive power;
 a first average image plane, which is an image plane specifically for visible light and perpendicular to an optical axis, and the first average image plane is disposed at the average position of the defocusing positions, where through focus modulation transfer rates (values of MTF) of the visible light at central field of view, 0.3 field of view, and 0.7 field of view of the optical image capturing system are at their respective maximum at a first spatial frequency of 55 cycles/mm; and
 a second average image plane, which is an image plane specifically for infrared light and perpendicular to the optical axis and the second average image plane is disposed at the average position of the defocusing positions, where through focus modulation transfer rates of the infrared light (values of MTF) at central field of view, 0.3 field of view, and 0.7 field of view of the optical image capturing system are at their respective maximum at the first spatial frequency of 55 cycles/mm;
 wherein the optical image capturing system has only six lenses with refractive powers, at least one lens among the first lens to the six lens is made of glass, the optical image capturing system has a maximum image height HOI on the first image plane that is perpendicular to the optical axis, focal lengths of the six lenses are respectively f1, f2, f3, f4, f5 and f6, a focal length of the optical image capturing system is f, an entrance pupil diameter of the optical image capturing system is HEP, a half maximum angle of view of the optical image capturing system is HAF, there is a distance HOS on the optical axis from an object side of the first lens to the first image plane, there is a distance InTL on the optical axis from the object side of the first lens to the image side of the sixth lens, a distance on the optical axis between the first average image plane and the second average image plane is AFS, thicknesses of the first lens through the sixth lens at a height of ½ HEP and in parallel with the optical axis are respectively ETP1, ETP2, ETP3, ETP4, ETP5 and ETP6, a sum of ETP1 to ETP6 is SETP, thicknesses of the first lens through the sixth lens on the optical axis are respectively TP1, TP2, TP3, TP4, TP5 and TP6, a sum of TP1 to TP6 is STP, the optical image capturing system meets the following conditions: 1.0≤f/HEP≤10.0; 0 deg<HAF≤150 deg; 0.5≤SETP/STP<1; |AFS|≤30 μm and 1≤HOS/HOI≤10.

21. The optical image capturing system of claim 20, wherein a distance parallel to the optical axis between a first coordinate point at a height of ½ HEP on the object side of the first lens and the first image plane is ETL, a distance parallel to the optical axis between a second coordinate point at a height of ½ HEP on the image side of the sixth lens and the first coordinate point at a height of ½ HEP on the object side of the first lens is EIN, the following conditions is satisfied: 0.2≤EIN/ETL<1.

22. The optical image capturing system of claim 20, wherein the first lens to the sixth lens are all made of glass.

23. The optical image capturing system of claim 20, wherein at least one surface of at least one of the lenses is an aspheric surface.

24. The optical image capturing system of claim 20, wherein the optical image capturing system meets the following condition: |AFS|≤15 μm.

25. The optical image capturing system of claim 20, wherein the optical image capturing system further includes an aperture and an image sensing device, and the image sensing device is disposed on the first average image plane and is disposed with at least 100 thousand pixels, and there is a distance InS on the optical axis from the aperture to the first average image plane, the following condition is satisfied: 0.2≤InS/HOS≤1.1.

* * * * *